United States Patent [19]

Masaki et al.

[11] Patent Number: 5,732,055
[45] Date of Patent: Mar. 24, 1998

[54] OPTICAL STORAGE APPARATUS

[75] Inventors: Takashi Masaki; Shigenori Yanagi, both of Kawasaki, Japan

[73] Assignee: Fujitsu Limited, Kawasaki, Japan

[21] Appl. No.: 763,621

[22] Filed: Dec. 4, 1996

[30] Foreign Application Priority Data

Apr. 26, 1996 [JP] Japan ............ 8-106752

[51] Int. Cl.⁶ ...................... G11B 7/00
[52] U.S. Cl. ...................... 369/54; 369/116
[58] Field of Search ............ 369/116, 54, 58, 369/47, 48, 53

[56] References Cited

U.S. PATENT DOCUMENTS

| | | | |
|---|---|---|---|
| 5,592,463 | 1/1997 | Muramatsu et al. | 369/54 X |
| 5,617,401 | 4/1997 | Hurst, Jr. | 369/54 X |
| 5,629,913 | 5/1997 | Kaku et al. | 369/54 X |
| 5,640,381 | 6/1997 | Call et al. | 369/54 X |

FOREIGN PATENT DOCUMENTS

| | | |
|---|---|---|
| 0223576 | 5/1987 | European Pat. Off. |
| 0467616A2 | 1/1992 | European Pat. Off. |
| 0532241A2 | 3/1993 | European Pat. Off. |
| 03158919 | 7/1991 | Japan |
| 03185689 | 8/1991 | Japan |
| 03256289 | 11/1991 | Japan |
| 04255925 | 9/1992 | Japan |
| 05159409 | 6/1993 | Japan |
| 07153196 | 6/1995 | Japan |
| 07200177 | 8/1995 | Japan |
| 07225635 | 8/1995 | Japan |
| 07225957 | 8/1995 | Japan |

*Primary Examiner*—Muhammad N. Edun
*Attorney, Agent, or Firm*—Greer, Burns & Crain, Ltd.

[57] ABSTRACT

A light emission adjustment processing unit of a laser diode sequentially instructs a D/A converter for light emission of a light emission by test powers at two predetermined two points, allows the laser diode to emit the light, instructs a D/A converter for subtraction of subtraction currents corresponding to the test powers at two points, and measures each power by an A/D converter for monitoring. From the measurement results, a relation of the instruction values to an arbitrary power in each D/A converter is obtained by a linear approximation and registered into a power table. When deciding an optimum writing power by a test write, a limit power on the lower limit side is detected while gradually decreasing the writing power from a starting power and a predetermined offset is added to the detected limit power, thereby obtaining the optimum writing power.

42 Claims, 57 Drawing Sheets

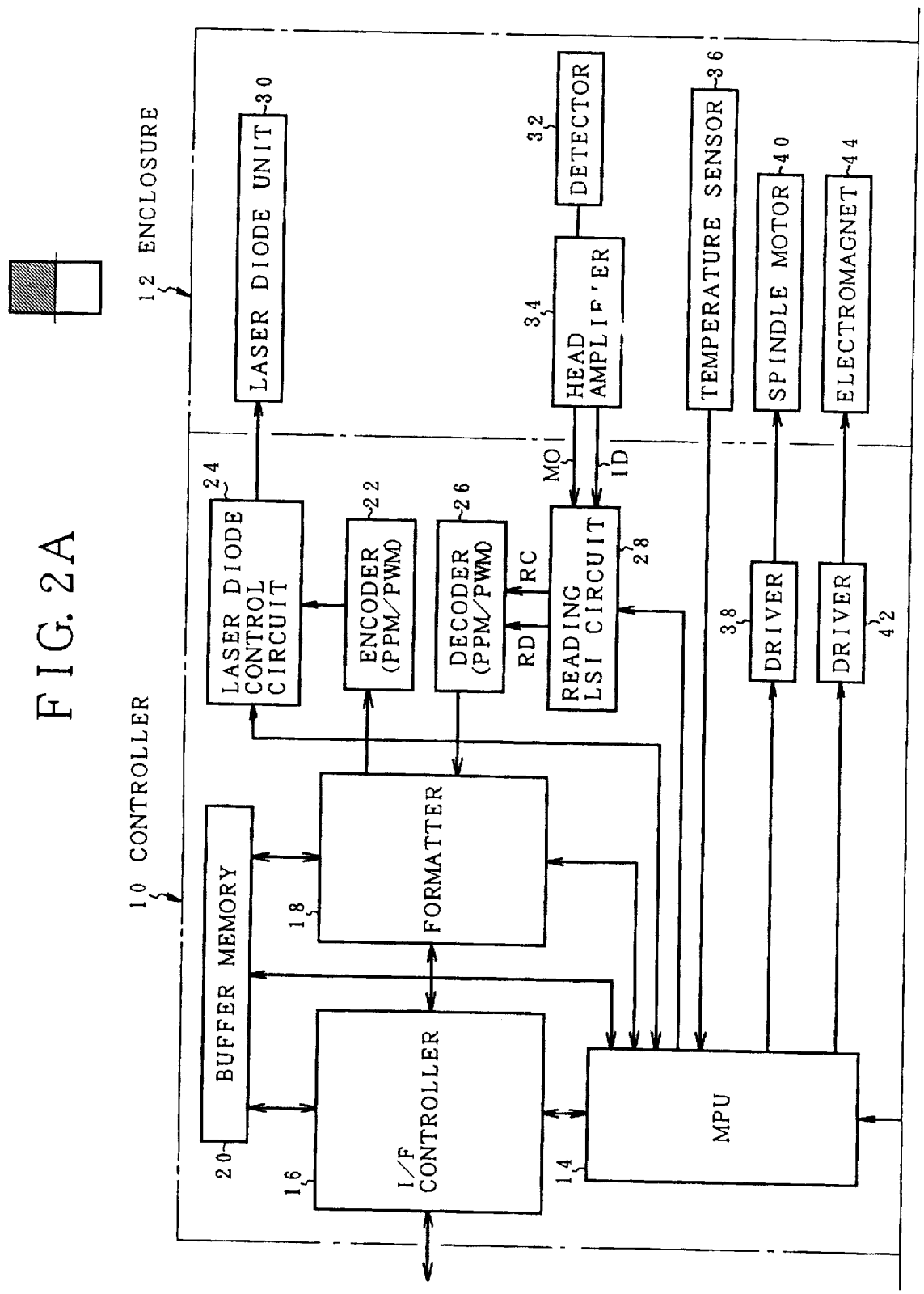

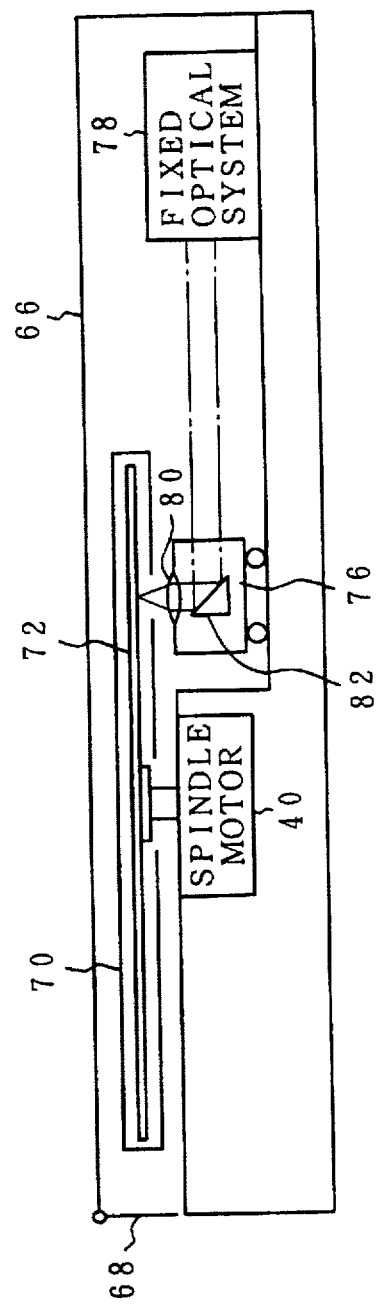

WRITE GATE

WRITE DATA

WRITE CLOCK

PULSE WIDTH DATA

ERASING PULSE

FIRST WRITING PULSE

SECOND WRITING PULSE

LIGHT EMISSION CURRENT /POWER

SUBTRACTION CURRENT

MONITOR CURRENT $i_m$ $(= i_0 - (i_1 + i_2 + i_3))$

FIG. 6A WRITE GATE 
FIG. 6B WRITE DATA 
FIG. 6C WRITE CLOCK 
FIG. 6D PULSE WIDTH DATA 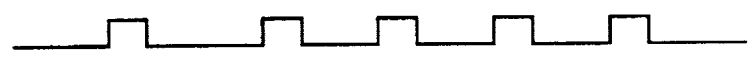
FIG. 6E ERASING PULSE 
FIG. 6F FIRST WRITING PULSE 
FIG. 6G SECOND WRITING PULSE 
FIG. 6H LIGHT EMISSION CURRENT 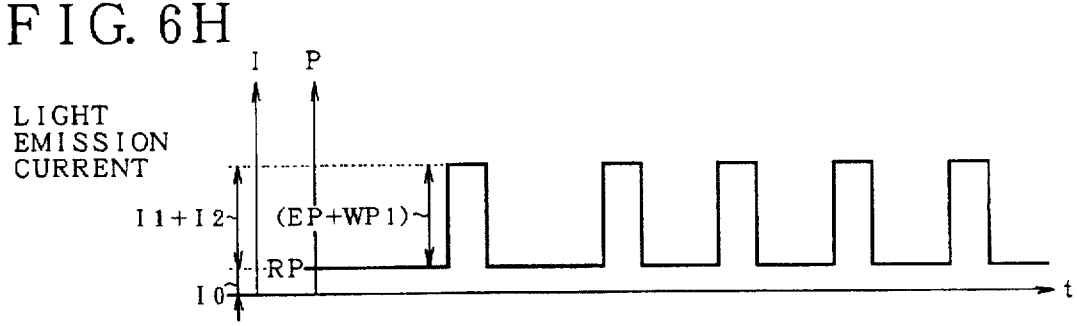
FIG. 6I SUBTRACTION CURRENT 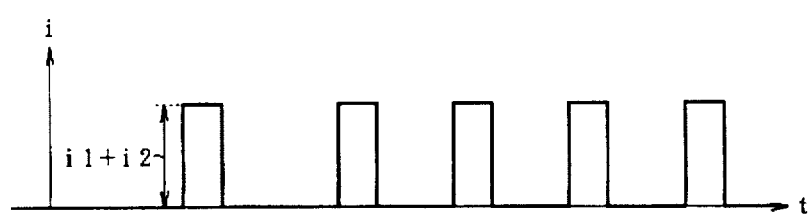
FIG. 6J MONITOR CURRENT im (=i0−(i1+i2)) 

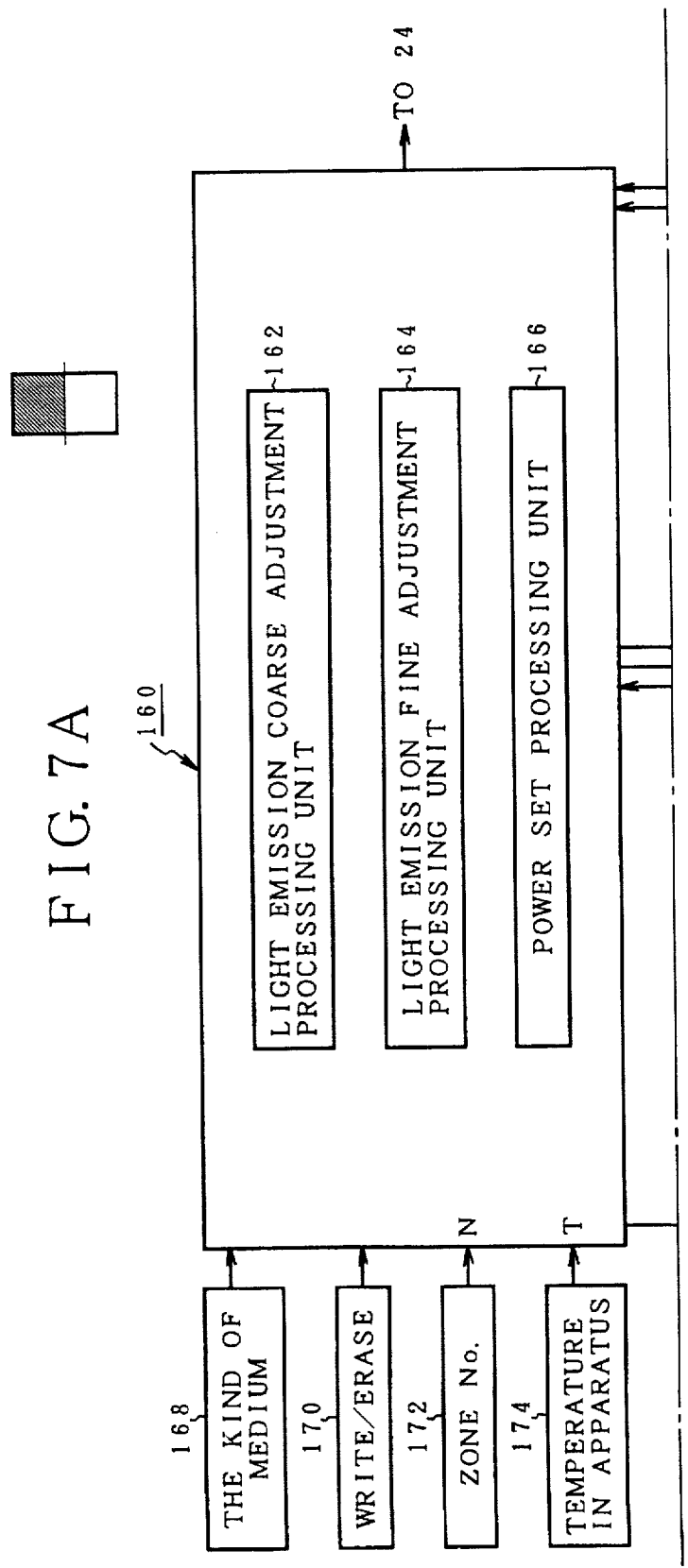

FIG. 15

```
┌─────────────────────────────────┐
│ LIGHT EMISSION COARSE ADJUSTMENT│
│ FOR FIRST WRITING POWER         │
└─────────────────────────────────┘
                 │
                 ▼
S1 ─ INCREASE WP1 CURRENT DAC REGISTER
     VALUE y SO AS TO OBTAIN x1=4mW
     WHILE READING MONITOR ADC REGISTER,
     AND OBTAIN (x1, y1)
                 │
                 ▼
S2 ─ INCREASE WP1 SUBTRACTION DAC
     REGISTER VALUE z SO AS TO OBTAIN
     READING POWER WHILE READING MONITOR
     ADC REGISTER, AND OBTAIN (x1, z1)
                 │
                 ▼
S3 ─ INCREASE WP1 CURRENT DAC REGISTER
     VALUE y SO AS TO OBTAIN x2=8mW
     WHILE READING MONITOR ADC REGISTER,
     AND OBTAIN (x2, y2)
                 │
                 ▼
S4 ─ INCREASE WP1 SUBTRACTION DAC
     REGISTER VALUE z SO AS TO OBTAIN
     READING POWER WHILE READING MONITOR
     ADC REGISTER, AND OBTAIN (x2, z2)
```

S5 — CALCULATE INCLINATION a2 AND y-AXIS INTERSECTION b2 AS COEFFICIENTS OF RELATIONAL EQUATION $y = a2 \cdot x + b2$ OF LINEAR APPROXIMATION OF WP1 CURRENT DAC REGISTER VALUE y FOR POWER x FROM
$$\begin{cases} y1 = a2 \cdot x1 + b2 \\ y2 = a2 \cdot x2 + b2 \end{cases}$$

S6 — CALCULATE INCLINATION c2 AND y-AXIS INTERSECTION d2 AS COEFFICIENTS OF RELATIONAL EQUATION $z = c2 \cdot x + d2$ OF LINEAR APPROXIMATION OF WP1 SUBTRACTION CURRENT DAC REGISTER VALUE z FOR POWER x FROM
$$\begin{cases} z1 = c2 \cdot x1 + d2 \\ z2 = c2 \cdot x2 + d2 \end{cases}$$

( END )

FIG.17

| NAME OF DAC | INCLINATION | y-AXIS INTERSECTION |
|---|---|---|
| ADC FOR APC | a0 | b0 |
| ADC FOR ERASING | a1 | b1 |
| ADC FOR ERASING-SUBTRACTION | c1 | d1 |
| ADC FOR RECORDING | a2 | a2 |
| ADC FOR RECORDING-SUBTRACTION | c2 | d2 |
| ADC FOR HIGH-POWER RECORDING | a3 | b2 |
| ADC FOR HIGH-POWER RECORDING-SUBTRACTION | c3 | d3 |

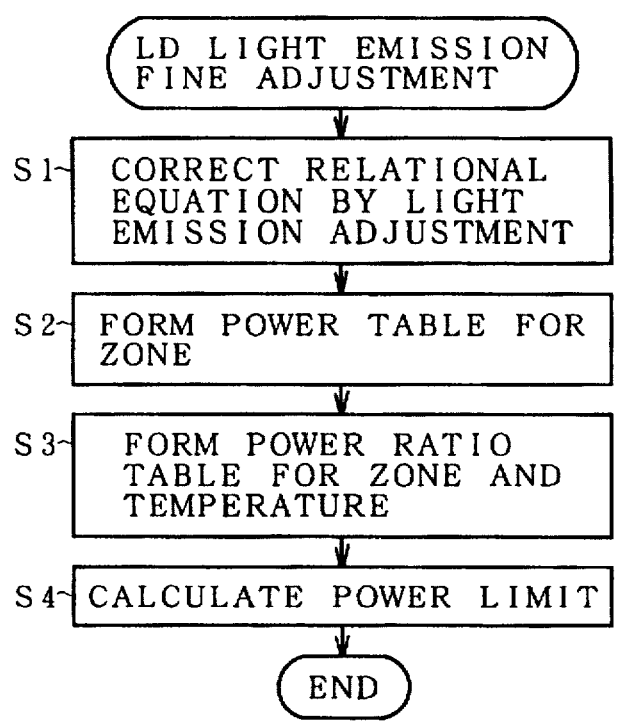

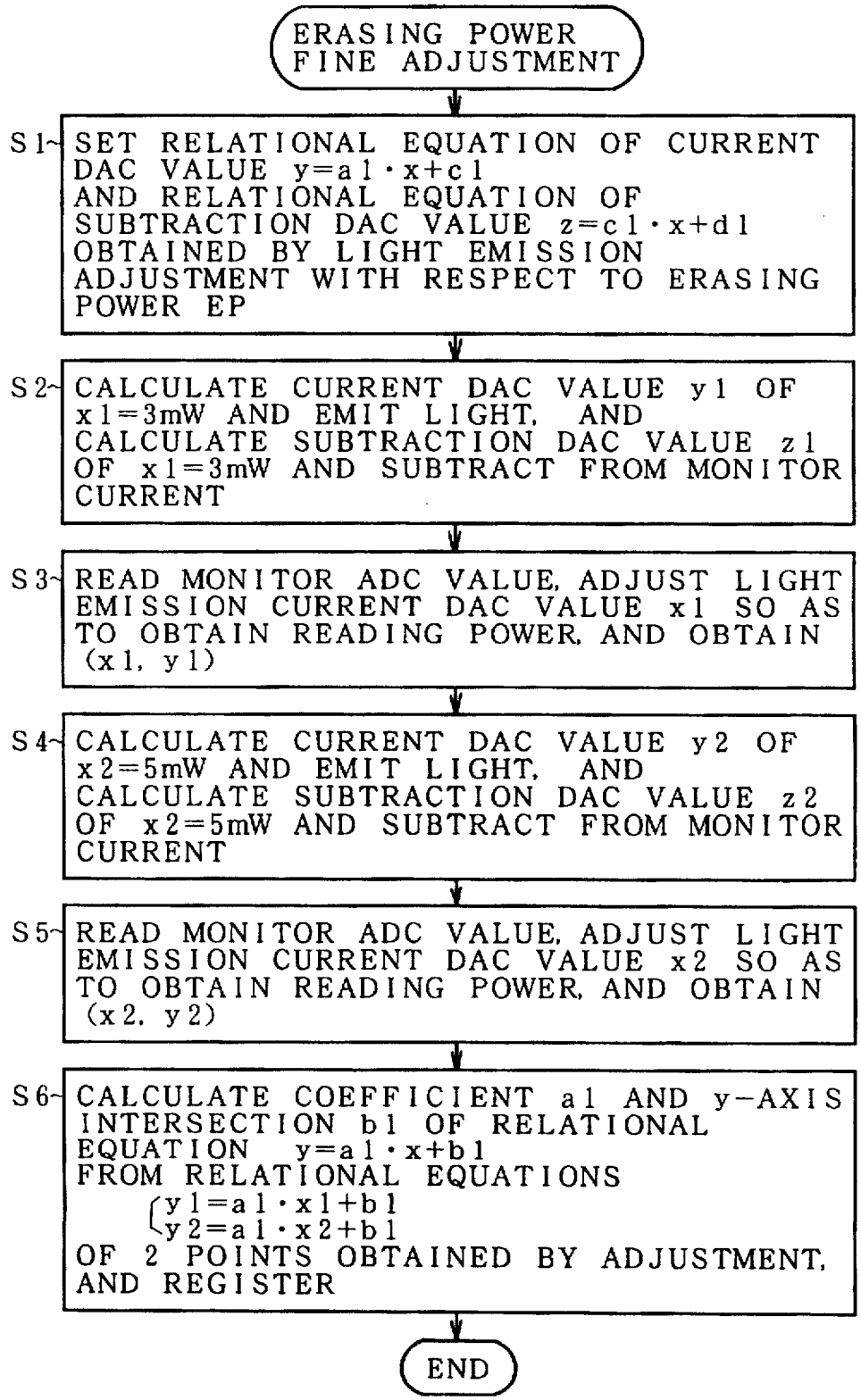

FIG. 20

(FIRST WRITING POWER FINE ADJUSTMENT)

S1 — ① SET RELATIONAL EQUATION OF CURRENT DAC VALUE $y = a_1 \cdot x + b_1$, AND RELATIONAL EQUATION OF SUBTRACTION DAC VALUE $z = c_1 \cdot x + d_1$, OBTAINED BY FINE ADJUSTMENT WITH RESPECT TO ERASING POWER EP
② SET RELATIONAL EQUATION OF CURRENT DAC VALUE $y = a_2 \cdot x + b_2$, AND RELATIONAL EQUATION OF SUBTRACTION DAC VALUE $z = c_2 \cdot x + d_2$ OBTAINED BY COARSE ADJUSTMENT WITH RESPECT TO FIRST WRITING POWER WP1

S2 — CALCULATE
① WP1 CURRENT DAC VALUE AND SUBTRACTION DAC VALUE
② EP CURRENT DAC VALUE AND SUBTRACTION DAC VALUE
IN WHICH WP1+EP=3mW+2mW=5mW, AND CONTROL LIGHT EMISSION

S3 — READ MONITOR ADC VALUE, ADJUST LIGHT EMISSION CURRENT DAC VALUE $x_1$ OF WP1 SERVING AS READING POWER, AND OBTAIN $(x_1, y_1)$

S4 — CALCULATE
① WP1 CURRENT DAC VALUE AND SUBTRACTION DAC VALUE
② EP CURRENT DAC VALUE AND SUBTRACTION DAC VALUE
IN WHICH WP1+EP=7mW+2mW=9mW, AND CONTROL LIGHT EMISSION

S5 — READ MONITOR ADC VALUE, ADJUST LIGHT EMISSION CURRENT DAC VALUE $x_2$ OF WP1 SERVING AS READING POWER, AND OBTAIN $(x_2, y_2)$

S6 — CALCULATE COEFFICIENT $a_2$ AND y-AXIS INTERSECTION $b_2$ OF RELATIONAL EQUATION $y = a_2 \cdot x + b_2$ FROM RELATIONAL EQUATIONS
$$\begin{cases} y_1 = a_2 \cdot x_1 + b_2 \\ y_2 = a_2 \cdot x_2 + b_2 \end{cases}$$
OF 2 POINTS OBTAINED BY ADJUSTMENT, AND REGISTER (END)

FIG. 21

```
( SECOND WRITING POWER
  FINE ADJUSTMENT )
```

S1 — ① SET RELATIONAL EQUATION OF CURRENT DAC VALUE $y = a_1 \cdot x + b_1$, AND RELATIONAL EQUATION OF SUBTRACTION DAC VALUE $z = c_1 \cdot x + d_1$, OBTAINED BY FINE ADJUSTMENT WITH RESPECT TO ERASING POWER EP
② SET RELATIONAL EQUATION OF CURRENT DAC VALUE $y = a_3 \cdot x + b_3$, AND RELATIONAL EQUATION OF SUBTRACTION DAC VALUE $z = c_3 \cdot x + d_3$ OBTAINED BY COARSE ADJUSTMENT WITH RESPECT TO SECOND WRITING POWER WP2

S2 — CALCULATE
① WP2 CURRENT DAC VALUE AND SUBTRACTION DAC VALUE
② EP CURRENT DAC VALUE AND SUBTRACTION DAC VALUE
IN WHICH WP2 + EP = 3mW + 2mW = 5mW, AND CONTROL LIGHT EMISSION

S3 — READ MONITOR ADC VALUE, ADJUST LIGHT EMISSION CURRENT DAC VALUE x1 OF WP2 SERVING AS READING POWER, AND OBTAIN (x1, y1)

S4 — CALCULATE
① WP2 CURRENT DAC VALUE AND SUBTRACTION DAC VALUE
② EP CURRENT DAC VALUE AND SUBTRACTION DAC VALUE
IN WHICH WP2 + EP = 7mW + 2mW = 9mW, AND CONTROL LIGHT EMISSION

S5 — READ MONITOR ADC VALUE, ADJUST LIGHT EMISSION CURRENT DAC VALUE x2 OF WP2 SERVING AS READING POWER, AND OBTAIN (x2, y2)

S6 — CALCULATE COEFFICIENT $a_3$ AND y-AXIS INTERSECTION $b_3$ OF RELATIONAL EQUATION $y = a_3 \cdot x + b_3$ FROM RELATIONAL EQUATIONS
$$\begin{cases} y_1 = a_3 \cdot x_1 + b_3 \\ y_2 = a_3 \cdot x_2 + b_3 \end{cases}$$
OF 2 POINTS OBTAINED BY ADJUSTMENT, AND REGISTER ( END )

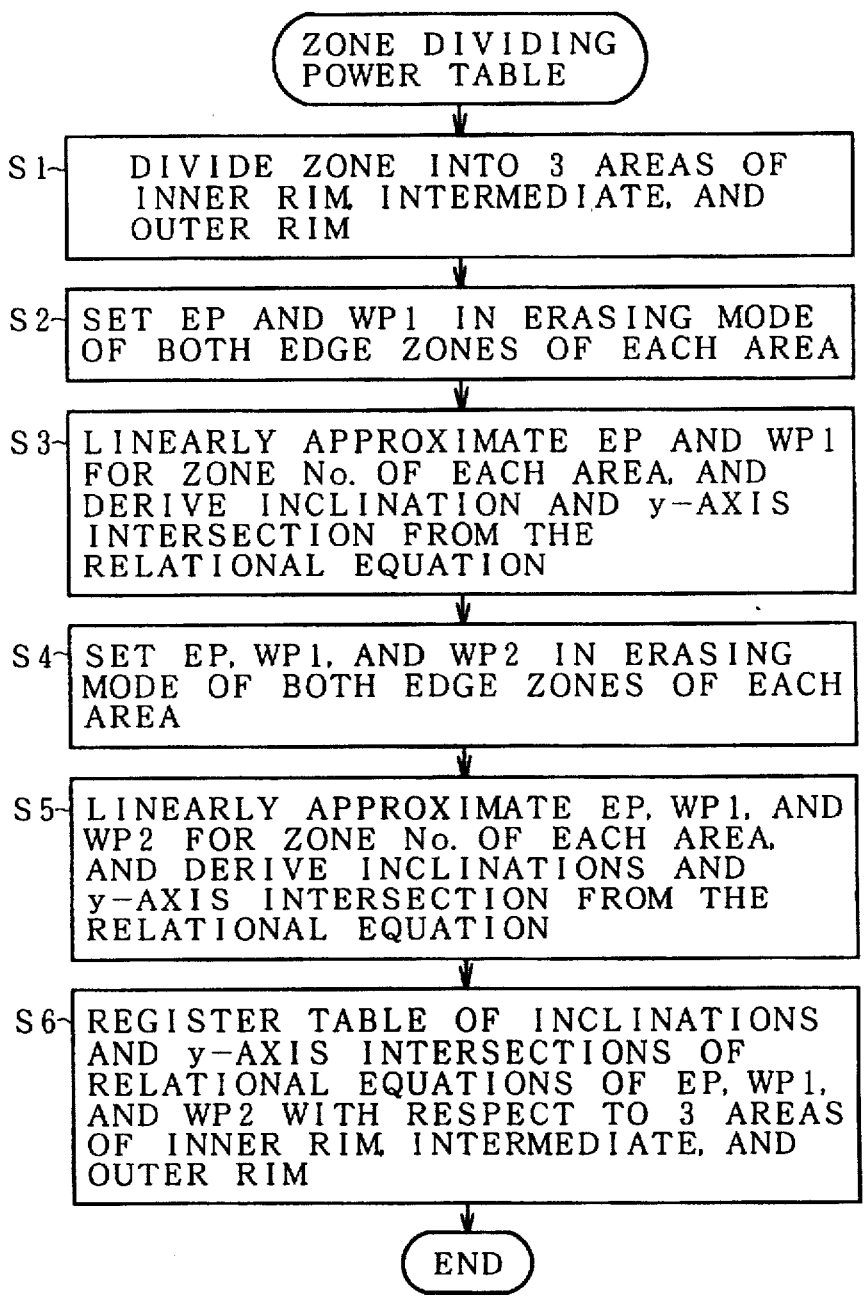

FIG. 24

| MODE | ZONE AREA | ERASING POWER EP | | FIRST WRITING POWER PW1 | | SECOND WRITING POWER PW2 | |
|---|---|---|---|---|---|---|---|
| | | INCLI-NATION | INTER-SECTION | INCLI-NATION | INTER-SECTION | INCLI-NATION | INTER-SECTION |
| ERASING MODE | INNER RIM AREA | a11 | b11 | a12 | b12 | a13 | b13 |
| | INTERMEDIATE AREA | a21 | b21 | a22 | b22 | a23 | b23 |
| | OUTER RIM AREA | a31 | b31 | a32 | b32 | a33 | b33 |
| WRITING MODE | INNER RIM AREA | a41 | b41 | a42 | b42 | a43 | b43 |
| | INTERMEDIATE AREA | a51 | b51 | a52 | b52 | a53 | b53 |
| | OUTER RIM AREA | a61 | b61 | a62 | b62 | a63 | b63 |

FIG. 25

(WRITING POWER RATIO TEMPERATURE CORRECTION)

S1: SET 4 POINTS OF EACH POWER RATIO (WP2/WP1) OF TEMPERATURES T1 AND T2 OF INNERMOST RIM ZONE (No. 1) AND EACH POWER RATIO (WP2/WP1) OF TEMPERATURES T1 AND T2 OF OUTERMOST RIM ZONE (No. 17)

S2: SUBSTITUTE INTO RELATIONAL EQUATION (WP2/WP1) = a1·T+b1 BY LINEAR APPROXIMATION OF EACH POWER RATIO (WP2/WP1) OF TEMPERATURES T1 AND T2 OF INNERMOST RIM ZONE (No. 1) AND CALCULATE INCLINATION a1 AND y-AXIS INTERSECTION b1

S3: SUBSTITUTE INTO RELATIONAL EQUATION (WP2/WP1) = a17·T+b17 BY LINEAR APPROXIMATION OF EACH POWER RATIO (WP2/WP1) OF TEMPERATURES T1 AND T2 OF OUTERMOST RIM ZONE (No. 17) AND CALCULATE INCLINATION a17 AND y-AXIS INTERSECTION b17

S4: SUBSTITUTE INCLINATION a1 OF INNERMOST RIM ZONE (No. 1) AND INCLINATION a17 OF OUTERMOST RIM ZONE (No. 17) INTO RELATIONAL EQUATION $a = \alpha \cdot N + \beta$ OF LINEAR APPROXIMATION FOR ZONE No. N, AND CALCULATE INCLINATION $\alpha$ AND y-AXIS INTERSECTION $\beta$

S5: SUBSTITUTE INCLINATION b1 OF INNERMOST RIM ZONE (No. 1) AND INCLINATION b17 OF OUTERMOST RIM ZONE (No. 17) INTO RELATIONAL EQUATION $b = \gamma \cdot N + \delta$ OF LINEAR APPROXIMATION TO ZONE No. N, AND CALCULATE INCLINATION $\gamma$ AND y-AXIS INTERSECTION $\delta$

S6: FORM REGISTRATION TABLE OF COEFFICIENTS ($\alpha$, $\beta$) AND COEFFICIENTS ($\gamma$, $\delta$) USING ZONE No. N AS INDEX (END)

FIG. 27

| ZONE No. N | POWER RATIO CALCULATING EQUATION $(WP2/WP1) = a \cdot T + b$ | | | |
|---|---|---|---|---|
| | INCLINATION CALCULATING EQUATION $a = \alpha \cdot N + \beta$ | | INTERSECTION CALCULATING EQUATION $b = \gamma \cdot N + \delta$ | |
| | $\alpha$ | $\beta$ | $\gamma$ | $\delta$ |
| 1 | $\alpha 01$ | $\beta 01$ | $\gamma 01$ | $\delta 01$ |
| 2 | $\alpha 02$ | $\beta 02$ | $\gamma 02$ | $\delta 02$ |
| 3 | $\alpha 03$ | $\beta 03$ | $\gamma 03$ | $\delta 03$ |
| 4 | $\alpha 04$ | $\beta 04$ | $\gamma 04$ | $\delta 04$ |
| 16 | $\alpha 16$ | $\beta 16$ | $\gamma 16$ | $\delta 16$ |
| 17 | $\alpha 17$ | $\beta 17$ | $\gamma 17$ | $\delta 17$ |

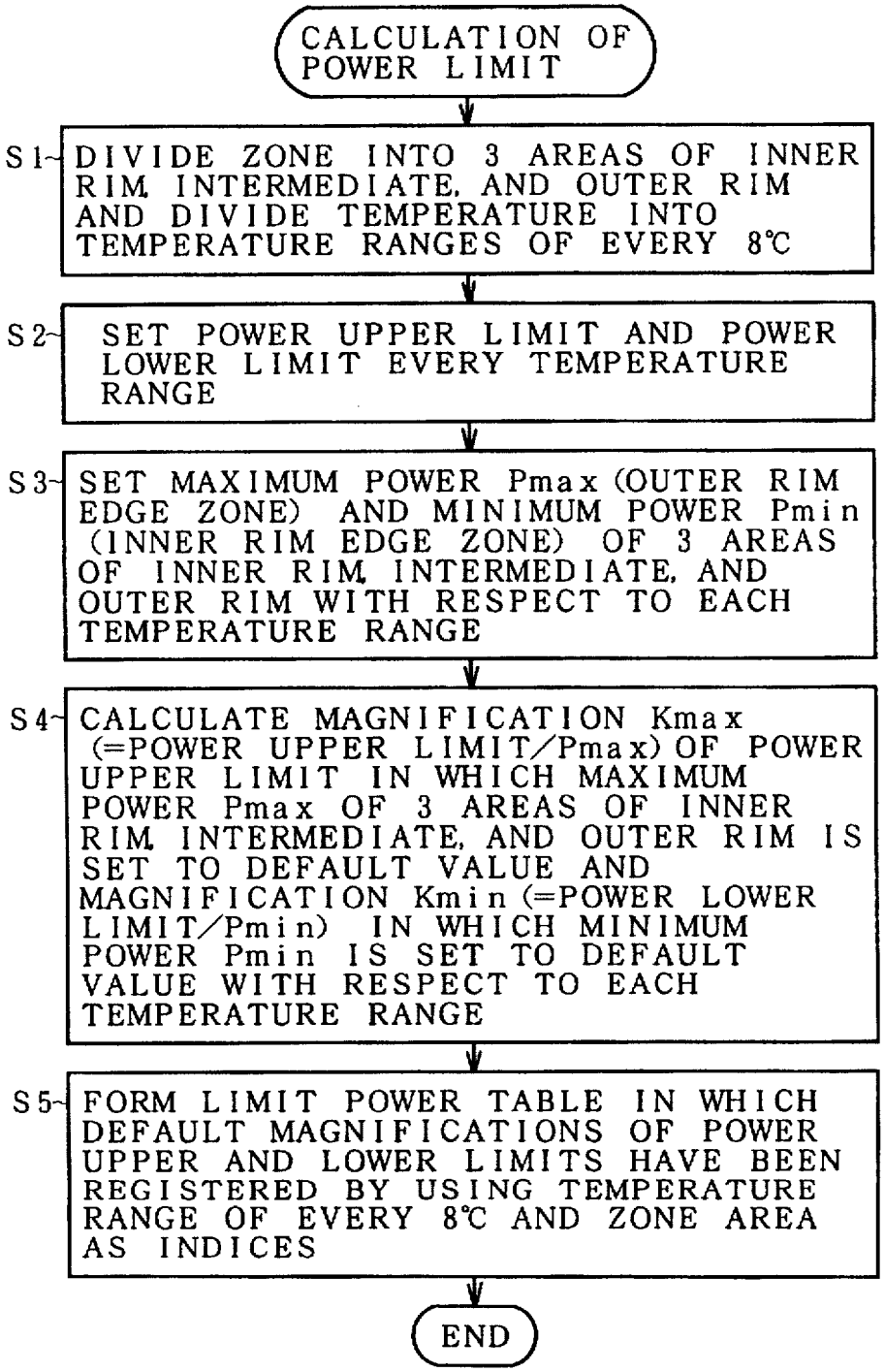

FIG. 30

| TEMPERATURE RANGE | INNER RIM AREA | | INTERMEDIATE AREA | | OUTER RIM AREA | |
|---|---|---|---|---|---|---|
| | Kmax | Kmin | Kmax | Kmin | Kmax | Kmin |
| 0~ 7℃ | K11 | K12 | K13 | K14 | K15 | K16 |
| 8~15℃ | K21 | K22 | K23 | K24 | K25 | K26 |
| 16~24℃ | K31 | K32 | K33 | K34 | K35 | K36 |
| 64~71℃ | K81 | K82 | K83 | K84 | K85 | K86 |

LIGHT EMITTING POWER

SUBTRACTION CURRENT

MONITOR CURRENT $i_m$

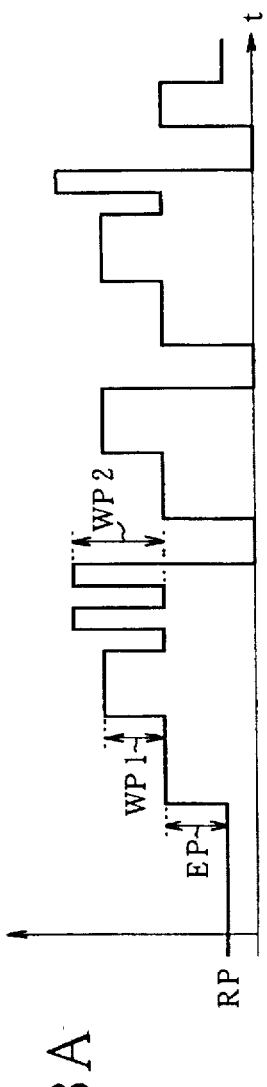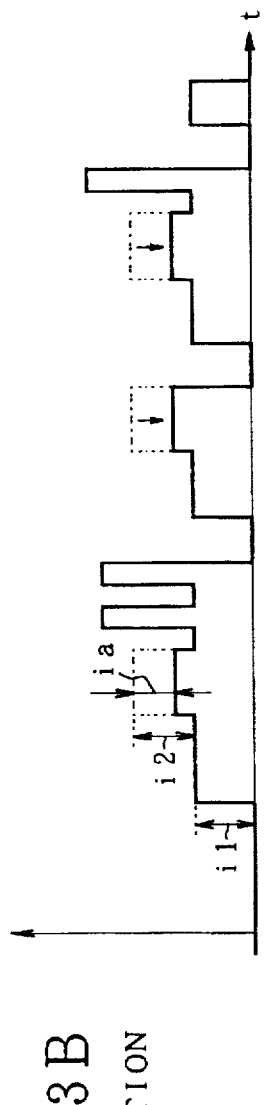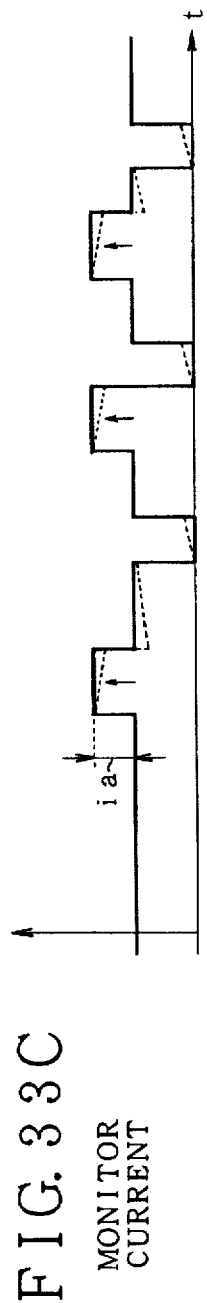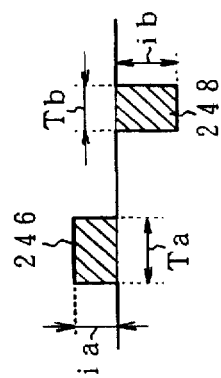
FIG. 33A LIGHT EMITTING POWER
FIG. 33B SUBTRACTION CURRENT
FIG. 33C MONITOR CURRENT
FIG. 33D

| ZONE No. i | DEPi |
|---|---|
| 1 | 3.0 mW |
| 2 | 3.2 mW |
| 3 | 3.3 mW |
| 4 | 3.4 mW |
| 5 | 3.7 mW |
| 6 | 3.8 mW |
| 7 | 3.9 mW |
| 8 | 4.1 mW |
| 9 | 4.2 mW |
| 10 | 4.4 mW |
| 11 | 4.5 mW |

| ZONE No. i | DWP i |
|---|---|
| 1 | 6.0 mW |
| 2 | 6.5 mW |
| 3 | 7.0 mW |
| 4 | 7.5 mW |
| 5 | 8.0 mW |
| 6 | 8.5 mW |
| 7 | 9.0 mW |
| 8 | 9.5 mW |
| 9 | 10.0 mW |
| 10 | 10.5 mW |
| 11 | 11.0 mW |

| ZONE No. i | Kt |
|---|---|
| 1 | −0.10 |
| 2 | −0.08 |
| 3 | −0.06 |
| 4 | −0.04 |
| 5 | −0.02 |
| 6 | 0.00 |
| 7 | 0.02 |
| 8 | 0.04 |
| 9 | 0.06 |
| 10 | 0.08 |
| 11 | 0.10 |

FIG. 42A
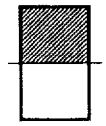
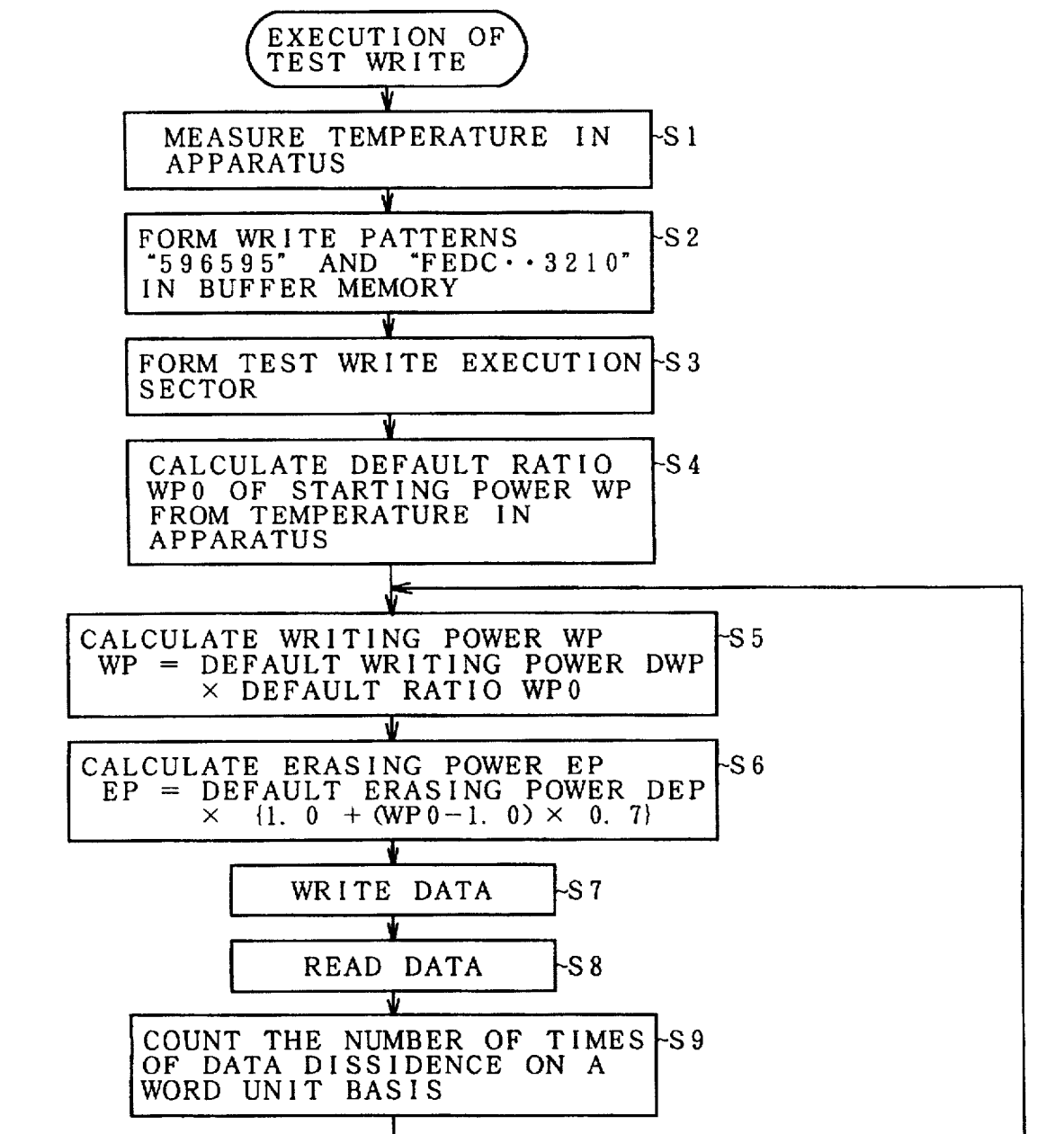

OPTICAL STORAGE APPARATUS

BACKGROUND OF THE INVENTION

The invention relates to an optical storage apparatus using a rewritable medium such as an MO cartridge or the like and, more particularly, to an optical storage apparatus for efficiently adjusting a light emitting power of a laser diode to an optimum power at the time of loading of a medium.

Attention is paid to an optical disk as a memory medium which is a main medium of multimedia that is rapidly developing in recent years. For example, when seeing an MO cartridge of 3.5 inches, in addition to the conventional MO cartridges of 128 MB and 230 MB, media of a high density recording of 540 MB and 640 MB are also being provided in recent years. Therefore, as an optical disk drive, it is desirable that the optical disk drive can use all of the media of 180 MB, 230 MB, 540 MB, and 640 MB which are available at present. In personal computers which have spread rapidly in recent years, a reproducing function of a compact disc (CD) known as a read only medium is indispensable. It is difficult to install an optical disk drive for an MO cartridge as a rewritable optical disk apparatus in addition to an optical disk drive for a CD from viewpoints of the space and costs. In recent years, therefore, an optical disk drive which can use both an MO cartridge and a CD has also been developed. In such an optical disk drive of the CD/MO common-use type, with respect to an optical system, a mechanical structure, and a controller circuit unit, they are commonly used for both of the CD and MO cartridge as much as possible.

In the MO cartridge that is used in the optical disk drive, a medium track is divided into zones and a ZCAV recording (zone constant angular velocity recording) in which the numbers of sectors of the zones are equalized is used. The number of zones of the MO medium is set to one zone in the conventional 128 MB medium and to ten zones in the 230 MB medium. On the other hand, in a high density PWM recording medium of 540 MB or 640 MB which has been put into practical use in recent years, in association with the improvement of a recording density, the track pitch of the medium is narrowed and the number of zones is increased. The number of zones in the 640 MB medium is set to 11 zones and the number of zones in the 540 MB medium is set to 18 zones. Ordinarily, in the case of the optical disk medium using the MO cartridge, since there is a difference of a light emitting power, namely, recording power of a laser diode for the optimum recording every medium, when the medium is loaded, a test write is executed in every zone and a light emission adjustment to adjust to the optimum recording power is executed. In the conventional 128 MB or 230 MB medium, the recording is performed by a pit position modulation (PPM) and it is sufficient that the light emitting power of the laser diode is changed to two levels of an erasing power and a recording power. On the other hand, in the PWM recording medium of 540 MB or 640 MB, a recording by a pulse train is used to raise a recording density. In the pulse train recording, it is necessary to change the light emitting power of the laser diode to three levels of an erasing power, a first writing power, and a second writing power. Therefore, with respect to the medium of 540 MB or 640 MB in which the number of zones is increased, if the light emission adjustment of the laser diode is performed in every zone, there is a problem such that in addition to an increase in number of kinds of light emitting powers due to the pulse train recording, it takes a long time for adjustment.

At the time of the adjustment of the light emission of the laser diode, as compared with an instantaneous light emission in the actual PPM recording or PWM recording, the light emission is driven by a default value that is designated by firmware for a relatively long time during which the adjustment is necessary. This substantially results in that the laser diode is DC light emitted (continuous light emission). If the light emission adjustment is performed by a high light emitting power, a damage is given to the laser diode and there is a fear such that a deterioration is hastened.

In the conventional optical disk drive, as a writing power which is used to write data onto a medium, an optimum power differs depending on the kind and temperature of the medium. Therefore, when the medium is loaded to the optical disk drive, a power adjusting process of the laser diode for deciding the optimum power is executed by performing a test write of a test pattern, namely, a test write to the medium. According to a conventional power adjusting process of the laser diode, as shown in FIG. 1, the writing power given as a default power is set to a power at a start point 401 and, for example, the writing and reading operations of a test pattern are repeated while decreasing the writing power step by step, thereby counting the number of times of dissidence of the data (the number of errors). When the writing power is reduced to a value near a limit power, the number of times of dissidence of data increases. For example, a limit power WPa at a limit point 404 exceeding 1000 data dissidence times is obtained. Subsequently, the writing and reading operations of the test pattern are repeated while increasing the writing power step by step from the start point 401, thereby counting the number of times of dissidence of data (the number of errors). When the writing power is increased to a value near a limit power, the number of times of dissidence of data increases. For example, a limit power WPb at a limit point 406 exceeding 1000 data dissidence times is obtained. When the upper and lower limit powers WPa and WPb can be detected as mentioned above, the intermediate writing power (WPb−WPa)/2 is determined as an optimum writing power WP-best. However, in the adjusting process of the writing power of the laser diode in association with the test write in such a conventional optical disk drive, two limit powers have to be detected while increasing and decreasing the writing power by setting a starting power to an initial point. Therefore, it takes a time to detect the limit powers and, there is a problem such that, it takes time, for example, until the apparatus enters a ready state after the medium was loaded. On the other hand, since it is necessary to perform the test write by driving the laser diode by a high power for the writing power adjustment, a large burden is exerted on the laser diode. Moreover, since the writing power adjustment is also frequently performed during the use of the apparatus, there are problems such that the deterioration of the laser diode is hastened and the durability of the apparatus is lost.

SUMMARY OF THE INVENTION

[Light emission adjustment]

According to the invention, there is provided an optical storage apparatus which can efficiently perform a light emission adjustment without exerting a burden on a laser diode even when the number of zones is large. An optical storage apparatus of the invention has a laser diode for emitting a laser beam which is used for recording and reproducing information to/from a medium. Upon recording of the medium, a drive current according to a combination of a plurality of different specified powers is supplied from a light emission current source to the laser diode. The light emission current source is constructed by a register, a D/A converter, and a current source circuit. A value of the current which is supplied from the light emission current source is instructed by a light emission current instructing unit using a register and a D/A converter. An automatic power control unit (APC) for controlling a light emitting power of the laser diode to a specified target power is provided. The automatic power control unit controls the light emitting power to, for example, a specified target reading power. A monitor photosensitive device for receiving a part of the laser beam and outputting a photosensitive current is provided for the laser diode. Upon recording of the medium, a specified subtraction current corresponding to a difference between the specified light emitting power and the target reading power is subtracted from the photosensitive current and the resultant current is set to a monitor current. The monitor current is fed back to the automatic power control unit. Therefore, even at the time of the light emission of the erasing power and writing power exceeding the target reading power, the monitor current corresponding to the reading power is returned to the APC. A subtraction current source is constructed by a register, a D/A converter, and a current source circuit. A subtraction current instructing unit using a D/A converter controls the current source circuit and the subtraction current of a register instructed value is supplied. A monitor current derived from the subtraction current source is read out by an A/D converter for monitor serving as a power measuring unit.

A light emission adjustment processing unit sequentially instructs the light emission by predetermined test powers at two points to the D/A converter of the light emission current upon setting of an adjusting mode and light emission drives the laser diode, instructs a specified subtraction current corresponding to the test powers at two points to the D/A converter for subtraction of the subtraction current source, and measures each test power from a monitor A/D converter of a measuring unit for monitor. On the basis of the measurement results, the relation between the current instructed value to an arbitrary power in the light emission current source and the subtraction current source is obtained by a linear approximation and registered into a power table.

Specifically, the light emission adjustment processing unit is constructed by a light emission coarse adjustment processing unit and a light emission fine adjustment processing unit. In a state in which an on-track control is released, the light emission coarse adjustment processing unit sequentially instructs the light emission by predetermined test powers at two points to the D/A converter of the light emission current source and light emission drives the laser diode, instructs a specified subtraction current corresponding to the test powers at two points to the D/A converter of the subtraction current source, and measures each test power from the A/D converter of the monitor measuring unit. On the basis of the measurement results at two points, I. Relation of the power measurement value for monitor to an arbitrary light emitting power II. Relation of current instructed value for light emission to an arbitrary light emitting power III. Relation of the current instructed value for subtraction to an arbitrary light emitting power are respectively obtained by the linear approximation and registered into a power table. In a state in which the on-track control is performed and the automatic power control is turned on, the light emission fine adjustment processing unit sequentially instructs the light emission by predetermined test powers at two points to the D/A converter of the light emission current source, light emission drives the laser diode, instructs a specified subtraction current corresponding to the test powers at two points to the D/A converter of the subtraction current source, and adjusts an instructed value of the D/A converter of the light emission current source so that the measured power by the A/D converter of the monitor measuring unit is set to the target reading power. On the basis of the adjustment results at two points, the relation of the current instructed value for light emission to an arbitrary light emitting power is obtained by the linear approximation and the power table is corrected. As mentioned above, in the light emission adjustment of the invention, for example, an inclination (a) and an intersection (b) with a y axis as coefficients of a relational equation (y=ax+b) in which the relation between a current instructed value (y) and a light emitting power (x) of the light emission current source is linearly approximated are obtained from the measured powers by the designation of the test powers at two points. Thus, the current instructed value to the light emission current source at an arbitrary light emitting power (x) can be calculated. Therefore, it is sufficient to obtain the test powers at the time of adjustment by the light emission at two points. Particularly, by setting the test powers at two points to values on the low power side, a burden on the laser diode can be reduced.

The current source for light emission has a reading power current source, an erasing power current source, a first writing power current source, and a second writing power current source. At the times of the light emission of a reading power, an erasing power P, a first writing power, and a second writing power by the laser diode, the reading power current source supplies a reading power current I0 to perform the light emission at the first power level, for example, reading power level to the laser diode. At the times of the light emission of an erasing power, a first writing power, and a second writing power by the laser diode, the erasing power current source adds an erasing power current I1 to perform the light emission of the laser diode by the erasing power to the reading power current I0 and supplies the resultant current to the laser diode. At the time of the light emission by the first writing power by the laser diode, the first writing power current source adds a first writing power current I2 to perform the light emission of the laser diode by the second power level, for example, the first writing power level to the reading power current I0 and erasing power current I1 and supplies the resultant current to the laser diode. Further, at the time of the light emission by the second writing power by the laser diode, the second writing power current source adds a second writing power current I3 to perform the light emission of the laser diode at the third power level, for example, the second writing power level to the reading power current I0 and erasing power current I1 and supplies the resultant current to the laser diode. The light emission current instructing unit individually has D/A converters for instructing current values of the reading power current source, first writing power current source, and second writing power current source. The subtraction current source has an erasing power subtraction current source, a first writing power subtraction current source, and a second writing power subtraction current source. The erasing power subtraction current source subtracts a photosensitive current i1 of the erasing power from a photosensitive current i0 of the photosensitive device at the times of the light emission by the erasing power, first writing power, and second writing power. The first writing power subtraction current source subtracts a photosensitive current i2 of the first writing power from the photosensitive current i0 of the photosensitive device at the time of the light emission of the first writing power. Further, the second writing power subtraction current source subtracts a photosensitive current i3 of the second writing power from the photosensitive current i0 of the photosensitive device at the time of the light emission of the second writing power. The subtraction current instructing unit individually has D/A converters for instructing current values of the reading power subtraction current source, first writing power subtraction current source, and second writing power subtraction current source.

When the medium loaded into the apparatus is a recording medium of the pit position modulation (PPM), the light emission coarse adjustment processing unit and the light emission fine adjustment processing unit adjust each of the erasing power and the first writing power. When the medium loaded into the apparatus is a recording medium of the pulse width modulation (PWM), the light emission coarse adjustment processing unit and the light emission fine adjustment processing unit adjust each of the erasing power, the first writing power, and the second writing power.

The light emission coarse adjustment processing unit and the light emission fine adjustment processing unit divide the zones of the medium in which the tracks are divided in the radial direction on a plural unit basis into a plurality of areas, for example, three areas of an inner rim area, an intermediate area, and an outer rim area. With respect to each of the innermost rim zone and the outermost rim zone of each area, the test power is instructed and the light emission is adjusted at two points while measuring the light emitting powers. An adjustment value of the zone between the innermost rim zone and the outer peripheral edge of the outermost rim zone is calculated and set from a relational equation of a linear approximation between the test powers and the measured powers at two points. Therefore, even if the zone number increases, it is sufficient that the light emission by the writing power for adjustment is executed in only two zones of the inner rim and the outer rim. The time necessary for the adjustment in association with the light emission by the writing power can be remarkably reduced. The light emission coarse adjustment processing unit and the light emission fine adjustment processing unit individually designate and adjust the erasing power and writing power as test powers. On the basis of the adjustment value (adjusted default value) of the power table adjusted by the light emission coarse adjustment processing unit, the light emission fine adjustment processing unit calculates and sets instruction values for the D/A converter of the light emission current instructing unit and the D/A converter of the subtraction current instructing unit corresponding to the test powers. When the optimum writing power determined by a test write of the medium is given as a correction coefficient (offset ratio) in which the writing power registered in the power table is expressed by a ratio using the adjustment value (default value) as a reference, the light emission fine adjustment processing unit multiplies the correction coefficient to the test power and corrects to the optimum test power. When the correction coefficient of the optimum power is given, the light emission fine adjustment processing unit compares such a correction coefficient with a predetermined coefficient limit range having an upper limit value and a lower limit value of the correction coefficient. When the correction coefficient exceeds the coefficient limit range, the power correction coefficient is limited to the upper limit value or lower limit value. With respect to the upper limit value and lower limit value of the power correction coefficient as well, the light emission fine adjustment processing unit divides the zones of the medium in which the tracks are divided in the radial direction on a plural unit basis into a plurality of areas, obtains a lower limit ratio to the lower limit value by setting the writing power of the innermost rim zone of each divided area to the minimum power, obtains the upper limit ratio to the upper limit value by setting the writing power of the outermost rim zone to the maximum power, calculates an arbitrary zone between the innermost rim zone and the outer peripheral edge of the outermost rim zone from a relational equation of a linear approximation of the lower limit ratio and the upper limit ratio, and sets the upper limit ratio and lower limit ratio. Therefore, there is no need to set the upper limit value and lower limit value every zone and the upper and lower limits can be easily set.

When the media loaded into the apparatus are a recording medium of the pit position modulation (PPM) and a recording medium of the pulse width modulation (PWM), in any case, the light emission coarse adjustment processing unit adjusts the erasing power and the first writing power and registers the adjusted values into the power table. On the other hand, when the loaded medium is a recording medium of the pulse width modulation (PWM), the light emission fine adjustment processing unit registers a power ratio of the second writing power using the first writing power as a reference in addition to the erasing power and the first writing power. The second writing power to be set is calculated by multiplying the power ratio to the designated first writing power. In this case, the light emission fine adjustment processing unit registers each power and the power ratio into the power table every zone number. The second writing power to be set is calculated by multiplying the power ratio of the same designated zone to the first writing power of the designated zone. The power ratio has a value which changes depending on the temperature.

To obtain the power ratio according to the temperature, the light emission fine adjustment processing unit obtains two relational equations (y=a1·T+b1) and (y=a2·T+b2) by a linear approximation of the power ratios for two temperatures T1 and T2 from four points of power ratios y1 and y2 at the temperatures T1 and t2 at two different points of the inner rim side zone and power ratios y3 and y4 at temperatures T1 and T2 at two different points of the outer rim side zone. Subsequently, with regard to two inclinations a1 and a2 of the two linear relational equations and intersections b1 and b2 with the y axis of the power ratio, two relational equations (a=α·N+β) and (b=γ·N+δ) by a linear approximation for two zone numbers N1 and N2 on the inner rim side and outer rim side are obtained. Inclinations α and γ and intersections β and δ with the y axis are registered into the power table. When a zone number N is designated, the light emission fine adjustment processing unit reads out the inclinations α and γ and the intersections β and δ with the y axis of the relational equations of the power ratio for the designated zone number N, calculates the inclinations a1 and a2 and the intersections b1 and b2 with the y axis of the relational equations for a temperature T, and finally calculates a power ratio of the designated zone from the measurement temperature T at that time.

When recording by the PWM such that the light is emitted by pulse trains of the second writing power of the number corresponding to the erasing power, the first writing power, and the pulse width and the power is reduced to a value lower than the target reading power of the automatic power control unit in response to the end of the light emitting pulse train and the pulse train is shifted to the next light emitting pulse train, the light emission fine adjustment processing unit reduces an instruction value of a subtraction current i1 to the D/A converter for subtraction of the first writing current so as to equalize the time product of an insufficient power for the target reading power and the time product of the first writing power exceeding the target power and to set off. Thus, there is executed a power reducing control such that by decreasing the writing power to zero or a value that is equal to or less than the reading power in response to the end of the pulse train of the PWM recording, even if a large feedback to compensate a surplus power amount is performed to the automatic power control, a control for a power reduction to compensate the insufficient amount and set off is executed before it. Therefore, the stable automatic power control of a writing power can be performed without causing a drift of the writing power due to the insufficient power.

[Optimum writing power adjustment]

According to the invention, an optical storage apparatus which can properly perform a process to decide the optimum writing power by the test write in a short time without exerting a burden on the laser diode is provided. Therefore, the optical storage apparatus of the invention has an optimum writing power adjusting unit comprising: an adjustment timing judging unit for judging a necessity of a writing power adjusting process to optimize the writing power for the medium; and a writing power adjusting unit which is activated in accordance with the judgment result of the adjustment timing judging unit and is used for writing a predetermined test pattern to the medium while gradually reducing the writing power step by step, subsequently reading out the predetermined test pattern and comparing with an original test pattern, counting the number of times of dissidence of the data, detecting a writing power at which the number of times of dissidence exceeds a predetermined threshold value as a limit writing power, adding a predetermined offset to the limit writing power, and determining the resultant value as an optimum writing power. Therefore, as an adjusting process to decide the optimum writing power, it is sufficient to gradually reduce the writing power from a starting power and to detect a limit power on the lower limit side. As compared with the conventional case where the limit powers at two points of the upper and lower limits are detected, the time which is required for the adjusting process can be reduced to the half. Since a high power is not needed for the test write, the laser diode is not damaged and the durability of the apparatus can be improved.

The writing power adjusting unit has at least two writing powers of the first power to erase recording pits of the medium and the second power to form recording pits and changes the first and second powers with a predetermined proportional relation when gradually reducing the writing power step by step. When the writing power is gradually reduced step by step, it is also possible to change the writing power so that a fluctuation ratio of the second power is smaller than a fluctuation ratio of the first power. Such a process is called a DOW (direct overwrite). Specifically speaking, in the PPM recording medium of the DOW, the first power is the erasing power and the second power is the first writing power. In the PWM medium, the first power is the erasing power and the second power is set to two powers of the first and second writing powers. The writing power adjusting unit designates a part of a user no-use area of the disk medium to a test area and writes and reads out the test pattern. Therefore, even if the test write is performed, no influence will be exerted on the medium performance of the user area. The writing power adjusting unit writes and reads out the test pattern by using continuous partial sectors of a specified track in a plurality of tracks constructing the test area. In this case, it is also possible to write and read out the test pattern by designating proper sectors in the plurality of tracks constructing the test area at random by generating random numbers. It is desirable to deviate the sectors every time without continuously using the sectors of the test area which have already been used. Upon reading of the test pattern, when a data sync pattern, namely, a sync byte just before the user area in the track format cannot be detected, the writing power adjusting unit counts the maximum number of times of dissidence. That is, the sync byte is very important information to detect the start of the data area. When the sync byte cannot be detected, it is immediately determined that the number of times of dissidence is maximum, and the processes are hastened without counting the number of times of dissidence of data. Upon reading of the test pattern, when the number of times of dissidence in a range from the head sector to a predetermined number of sectors is equal to or less than a predetermined threshold value, the writing power adjusting unit regards that all of the sectors are good quality sectors, interrupts the data comparison, and counts the predetermined minimum value, for example, zero as the number of times of dissidence. For example, when the number of times of dissidence is 1 or less at the head sector, the comparing process is not executed after that, the number of times of dissidence is set to zero, and the processing routine advances to the process of the next sector, thereby raising a processing speed. When the number of times of dissidence exceeds a predetermined threshold value indicative of a power limit by the writing and reading of the test pattern by the writing power which was first set, the writing power adjusting unit increases the test power to a predetermined value and again tries. Such a process is executed when the limit power exceeds the starting power and is high due to the temperature of the apparatus. The writing power adjusting unit determines the writing power to be initially set from the temperature of the apparatus. Namely, since there is a correlation such that when the apparatus temperature is high, the limit power decreases and when the apparatus temperature is low, the limit power is high, the starting power is set in consideration of the correlation with the temperature. The writing power adjusting unit increases an offset to be added to the recording limit power when the apparatus temperature is low and decreases the offset when the apparatus temperature is high, thereby deciding the optimum writing power according to the apparatus temperature. The writing power adjusting unit changes the offset to be added to the recording limit power in a manner such that when the apparatus temperature is low, the offset on the inner rim side is reduced and the offset on the outer rim side is increased. Further, when the apparatus temperature is high, the offset on the inner rim side is increased and the offset on the outer rim side is decreased. That is, the optimum writing power is determined in accordance with the apparatus temperature and the position in the radial direction of the medium. Since the zone CAV is used as a medium format, the outer rim side and inner rim side denote the inner rim side and outer rim side which are determined by the zone number.

An adjustment timing judging unit activates the adjustment of the writing power synchronously with the write command which is issued from an upper apparatus. Namely, after the apparatus was activated by loading the medium, when the first write command is generated from the upper apparatus, the adjustment timing judging unit activates the adjustment of the writing power. Since a temperature of the medium just after the medium was loaded differs from a temperature in the apparatus, unless the power adjustment is performed after the medium temperature was balanced to the temperature in the apparatus, the optimum writing power will be changed. Therefore, upon activation, the writing power is not adjusted but the first writing power adjustment is executed synchronously with the generation of the first write command at a timing when it is presumed that the medium temperature is balanced to the temperature in the apparatus. The adjustment timing judging unit determines a valid time when a validity of the writing power adjustment result is guaranteed from the elapsed time from a timing of the activation of the disk to a timing when the first writing power adjustment is performed synchronously with the write command generated from the upper apparatus. When the elapsed time is shorter than a predetermined threshold time (about two to three minutes), the valid time is reduced in accordance with the elapsed time. When the elapsed time exceeds the threshold time, the valid time is set to such a threshold time. That is, the valid time to guarantee the writing power adjustment result is set to a short time after the activation. After the medium temperature was balanced to the temperature in the apparatus, the valid time is set to a long time. When the elapsed time from the previous writing power adjustment exceeds the valid time, the adjustment timing judging unit activates the next writing power adjustment. Even if the elapsed time from the previous writing power adjustment doesn't reach the valid time, when the present temperature in the apparatus fluctuates in excess of a predetermined temperature range for the temperature in the apparatus at the time of the previous writing power adjustment, namely, when the temperature in the apparatus largely changes, the adjustment timing judging unit activates the writing power adjustment. In the writing power adjusting unit of the actual optical disk drive, when the test power is set, the writing power is changed by using a default ratio of the set writing power to a predetermined default writing power as a reference. When the optimum writing power is determined, a predetermined offset ratio is added to the default ratio of the limit power, thereby deciding a default ratio of the optimum writing power. Further, when the default writing power is adjusted, the adjustment timing judging unit activates the writing power adjustment. Ordinarily, the writing power is obtained by supplying a drive current corresponding to a plurality of kinds of power increase amounts to the laser diode. For example, in the PPM recording medium, by supplying the drive current of (reading power current)+(erasing power current)+(writing power current), the default writing power is derived. Therefore, when the drive current of the laser diode is adjusted, the default power itself changes and the default ratio to decide the optimum writing power so far cannot be used. Therefore, when the adjustment of the laser diode drive current, namely, the adjustment of the default writing power is performed, the writing power adjustment to determine the default ratio of the lowest writing power is certainly executed.

The above and other objects, features, and advantages of the present invention will become more apparent from the following detailed description with reference to the drawings.

BRIEF DESCRIPTION OF THE DRAWINGS

FIGS. 2A and 2B are block diagrams of an optical disk drive according to the invention;

FIG. 3 is an explanatory diagram of an internal structure of an apparatus in which an MO cartridge is loaded;

FIGS. 6A to 6J are time charts for signals, a light emission current, a subtraction current, and a monitor current in a PPM recording of the invention;

FIGS. 7A and 7B are functional block diagrams of an LD light emission processing unit which is realized by an MPU in FIG. 2;

FIG. 15 is a flowchart for a light emission coarse adjustment for a first writing power in FIG. 9;

FIG. 17 is an explanatory diagram of registration contents in a power table by the LD light emission coarse adjustment in FIG. 9;

FIG. 18 is a generic flowchart for an LD light emission fine adjusting process in FIG. 8;

FIG. 19 is a flowchart for an erasing power fine adjustment in FIG. 18;

FIG. 20 is a flowchart for a first writing power fine adjustment in FIG. 18;

FIG. 21 is a flowchart for a second writing power fine adjustment in FIG. 18;

FIG. 22 is a flowchart for a power table setting process by a zone area division based on a fine adjustment result;

FIG. 24 is an explanatory diagram of registration contents in the power table which are obtained by the setting process in FIG. 22;

FIG. 25 is a flowchart for a temperature correction in case of treating a second writing power as a power ratio;

FIG. 27 is an explanatory diagram of the registration contents in the power table obtained by the process in FIG. 25;

FIG. 28 is a flowchart for a power limit calculating process in FIG. 8;

FIG. 30 is an explanatory diagram of registration contents in the power table by the process in FIG. 28;

FIGS. 33A to 33D are time charts for a first writing power light emission coarse adjustment to realize the drift compensation in FIG. 32;

FIG. 36 is an explanatory diagram of a default erasing power table in FIG. 35;

FIG. 38 is an explanatory diagram of a temperature correction coefficient table in FIG. 35;

FIGS. 42A and 42B are flowcharts for the test writing process in FIG. 40;

DETAILED DESCRIPTION OF THE PREFERRED EMBODIMENT

[Construction of apparatus]

Figure 1:
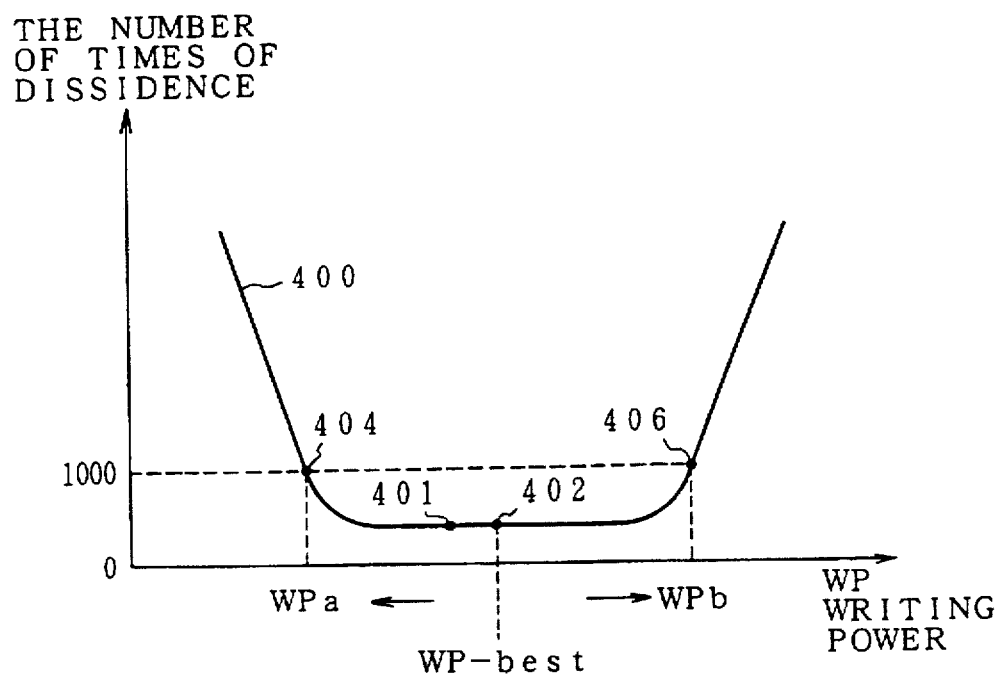
FIG. 1 is an explanatory diagram of a conventional optimum writing power adjusting process.
Figure 2B:
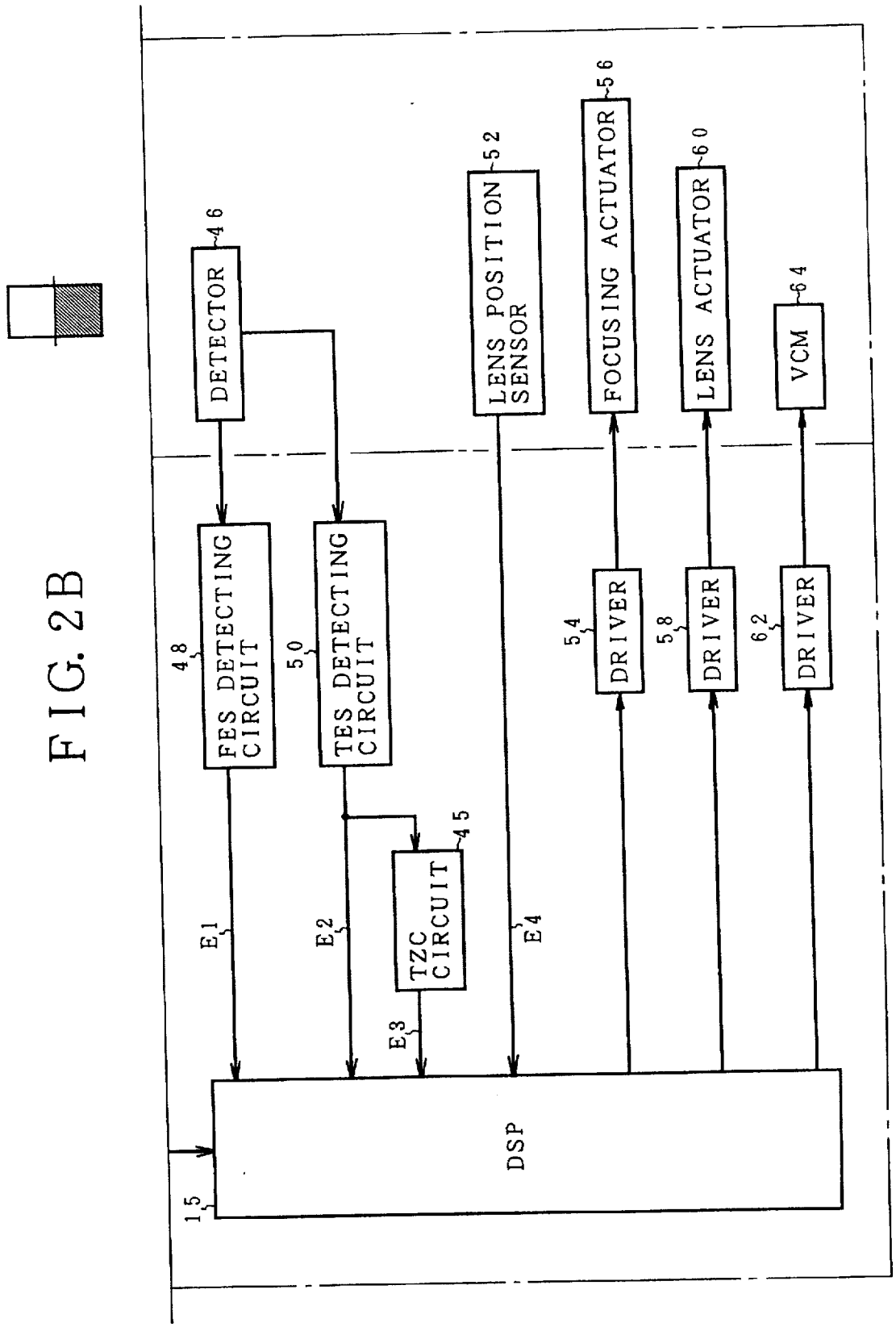

FIGS. 2A and 2B are circuit block diagrams of an optical disk drive as an optical storage apparatus of the invention. The optical disk drive of the invention is constructed by a controller 10 and an enclosure 12. The controller 10 has: an MPU 14 to control the whole optical disk drive; an interface controller 16 for transmitting and receiving commands and data to/from an upper apparatus; a formatter 18 for executing processes which are necessary to write and read data to/from an optical disk medium; and a buffer memory 20 which is commonly used by the MPU 14, interface controller 16, and formatter 18. An encoder 22 and a laser diode control circuit 24 are provided as a writing system for the formatter 18. A control output of the laser diode control circuit 24 is supplied to a laser diode 30 provided for an optical unit on the enclosure 12 side. The laser diode unit 30 integratedly has a laser diode and a photosensitive device to monitor. As an optical disk to record and reproduce by using the laser diode unit 30, namely, a rewritable MO cartridge medium, in the embodiment, any one of the media of 128 MB, 230 MB, 540 MB, and 640 MB can be used. Among them, with respect to the MO cartridge media of 128 MB and 230 MB, a pit position recording (PPM recording) in which data is recorded in correspondence to the presence or absence of a mark on the medium is used. A recording format of the medium is the ZCAV and is set to one zone for 128 MB and ten zones for 230 MB. As for the MO cartridge media of 540 MB and 640 MB in which the high density recording is performed, a pulse width recording (PWM recording) in which edges of a mark, namely, a front edge and a rear edge are made correspond to data is used. A difference of storage capacities between 640 MB and 540 MB is caused due to a difference between sector capacities. When the sector capacity is equal to 2 kbytes, the storage capacity is equal to 640 MB. When the sector capacity is equal to 512 bytes, the storage capacity is equal to 540 MB. The recording format of the medium corresponds to a zone CAV (ZCAV) and there are 11 zones for 640 MB and 18 zones for 540 MB. The optical disk drive of the invention as mentioned above can cope with the MO cartridge of the storage capacity of each of 128 MB, 230 MB, 540 MB, and 640 MB. Therefore, when the MO cartridge is loaded to the optical disk drive, an ID portion of the medium is first read, the kind of medium is recognized in the MPU 14 from a pit interval, and the result of the recognition about the kind is notified to the formatter 18. In case of the medium of 128 MB or 230 MB, a formatting process corresponding to the PPM recording is executed. In case of the medium of 540 MB or 640 MB, a formatting process according to the PWM recording is performed. As a reading system for the formatter 18, a decoder 26 and a reading LSI circuit 28 are provided. A photosensitive signal of a return light of a beam from the laser diode 30 by a detector 32 provided for the enclosure 12 is inputted to the reading LSI circuit 28 as an ID signal and an MO signal through a head amplifier 34. Circuit functions of an AGC circuit, a filter, a sector mark detecting circuit, a synthesizer, a PLL, and the like are provided for the reading LSI circuit 28. A read clock and read data are formed from the inputted ID signal and MO signal and are supplied to the decoder 26. Since the zone CAV is used as a recording system of the medium by a spindle motor 40, for the reading LSI circuit 28, a switching control of a clock frequency corresponding to the zone is performed by the MPU 14 for the built-in synthesizer. A modulating system of the encoder 22 and a demodulating system of the decoder 26 are switched to the modulating and demodulating systems of the PPM recording with regard to the media of 128 MB and 230 MB in accordance with the kind of medium by the formatter 18. On the other hand, with respect to the media of 540 MB and 640 MB, they are switched to the modulating and demodulating systems of the PWM recording. A detection signal of a temperature sensor 36 provided on the enclosure 12 side is supplied to the MPU 14. On the basis of an environment temperature in the apparatus detected by the temperature sensor 36, the MPU 14 controls each of the light emitting powers for reading, writing, and erasing in the laser diode control circuit 24 to the optimum value. The MPU controls the spindle motor 40 provided on the enclosure 12 side by a driver 38. Since the recording format of the MO cartridge is set to ZCAV, the spindle motor 40 is rotated at a constant speed of, for example, 3600 rpm. The MPU 14 controls an electromagnet 44 provided on the enclosure 12 side through a driver 42. The electromagnet 44 is arranged on the side opposite to a beam irradiating side of the MO cartridge loaded in the apparatus and applies an external magnetic field to the medium upon recording an erasing. A DSP 15 realizes a servo function to position the beam from the laser diode 30 for the medium. For this purpose, a 2-split detector 46 to receive the light in a beam mode from the medium is provided for the optical unit on the enclosure 12 side. An FES detecting circuit (focusing error signal detecting circuit) 48 forms a focusing error signal E1 from a photosensitive output of the 2-split detector 46 and supplies to the DSP 15. A TES detecting circuit (tracking error signal detecting circuit) 50 forms a tracking error signal E2 from the photosensitive output of the 2-split detector 46 and supplies to the DSP 15. The tracking error signal E2 is inputted to a TZC circuit (track zero-cross detecting circuit) 45, by which a track zero-cross pulse E3 is formed and inputted to the DSP 15. Further, a lens position sensor 52 to detect a position of an objective lens for irradiating the laser beam to the medium is provided on the enclosure 12 side. A lens position detection signal (LPOS) E4 of the sensor 52 is supplied to the DSP 15. For positioning the laser beam, the DSP 15 controls and drives a focusing actuator 56, a lens actuator 60, and a VCM 64 through drivers 54, 58, and 62, respectively.

FIG. 3 is a schematic diagram of the enclosure in the optical disk drive. The spindle motor 40 is provided in a housing 66. By inserting an MO cartridge 70 from an inlet door 68 side to a hub of a rotary shaft of the spindle motor 40, a loading such that an internal MO medium 72 is attached to the hub of the rotary shaft of the spindle motor 40 is executed. A carriage 76 which can be moved by the VCM 64 in the direction which traverses the medium tracks is provided on the lower side of the MO medium 72 of the loaded MO cartridge 70. An objective lens 80 is mounted on the carriage 76. The laser beam from a semiconductor laser provided for a fixed optical system 78 is inputted to the objective lens 80 through a prism 82 and a beam spot is formed as an image on the medium surface of the MO medium 72. The objective lens 80 is moved and controlled in the optical axial direction by the focusing actuator 56 of the enclosure 12 in FIG. 2B and can be moved by the lens actuator 60 in a range of, for example, tens of tracks in the radial direction which traverses the medium tracks. The position of the objective lens 80 mounted on the carriage 76 is detected by the lens position sensor 52 in FIG. 2B. The lens position sensor 52 sets a lens position detection signal to 0 at a neutral position where the optical axis of the objective lens 80 is directed right overhead and generates the lens position detection signal E4 according to movement amounts of different polarities for the movement to the outside and the movement to the inside.

[LD light emission adjustment]

Figure 4:
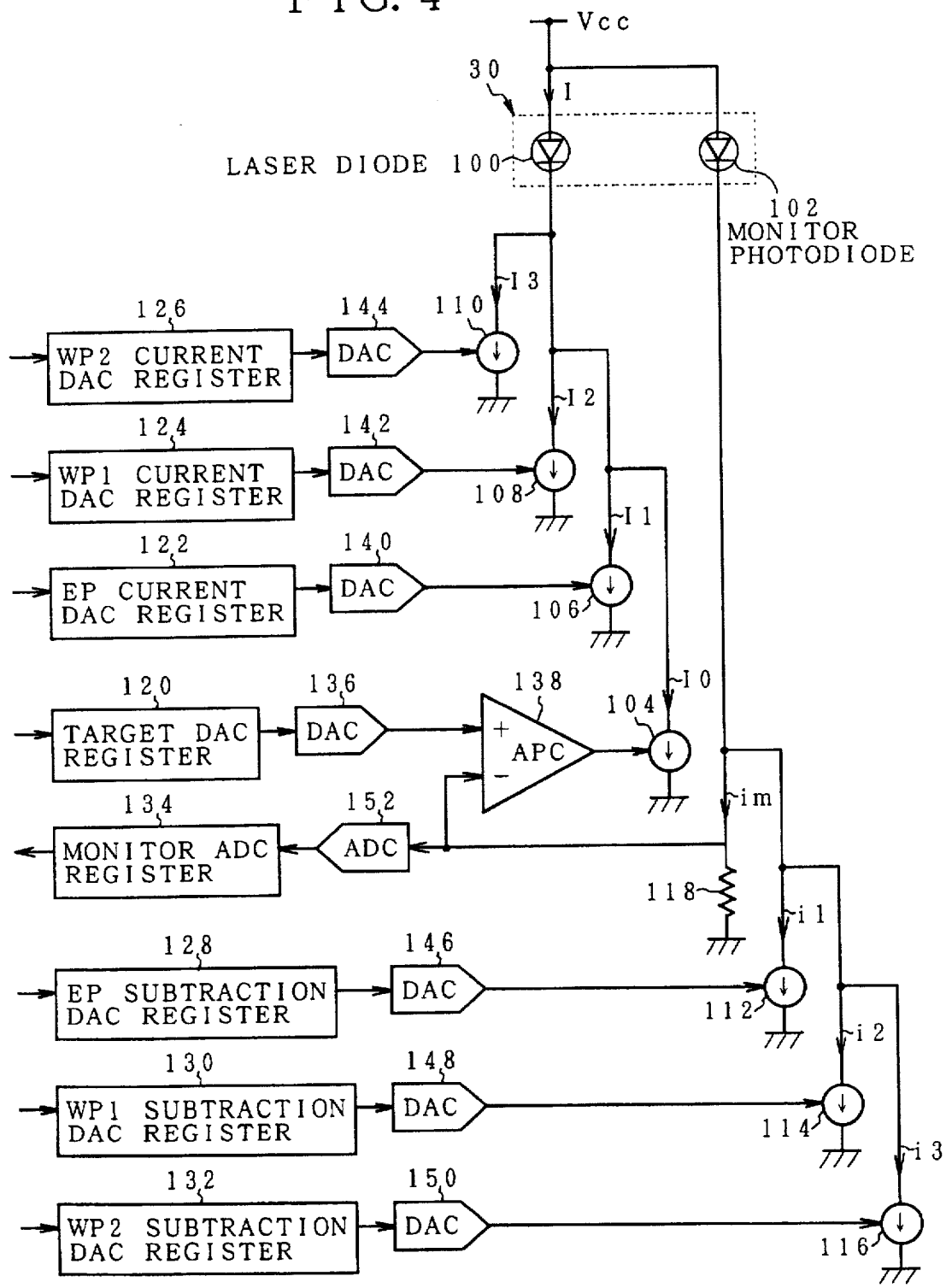
FIG. 4 is a block diagram of a laser diode control circuit of FIG. 2.

FIG. 4 is a circuit block diagram of the laser diode control circuit 24 provided for the controller 10 in FIG. 2A. A laser diode 100 and a monitor photodiode 102 are integratedly provided for the laser diode unit 30. The laser diode 100 receives a drive current I by a power source voltage Vcc, emits the light, forms a laser beam by an optical unit, and irradiates the laser beam onto the medium surface, thereby recording and reproducing. A part of the light from the laser diode 100 is inputted to the monitor photodiode 102, so that the monitor photodiode 102 generates a photosensitive current I0 which is proportional to the light emitting power of the laser diode 100. A reading power current source 104, an erasing power current source 106, a first writing power current source 108, and a second writing power current source 110 are connected in parallel with the laser diode 100, thereby supplying a reading power current I0, an erasing power current I1, a first writing power current I2, and a third writing power current I3 to the laser diode 100, respectively. Namely, at the time of the light emission by the reading power, the reading power current I0 flows. At the time of the light emission by the erasing power, the current (I0+I1) in which the erasing power current I1 is added to the reading power current I0 flows. At the time of the light emission by the first writing power, a current (I0+I1+I2) in which the first writing power current I2 is further added flows. At the time of the light emission by the second writing power, the current (I0+I1+I3) in which the second writing power current I3 is added to the reading power current I0 and erasing power current I1 flows. An automatic power control unit (hereinafter, abbreviated to an "APC") 138 is provided for the reading power current source 104. A specified target reading power is set as a target power for the APC 138 through a target DAC register 120 and a D/A converter (hereinafter, abbreviated to a "DAC") 136. An EP current DAC register 122 and a DAC 140 are provided as an EP current instructing unit for the erasing power current source 106. A WP1 current DAC register 124 and a DAC 142 are provided as a WP1 current instructing unit for the WP1 current source 108. Further, a WP2 current DAC register 126 and a DAC 144 are also provided as a WP2 current instructing unit for the second writing power current source 110. Therefore, the current from the current sources 104, 106, 108, and 110 can be properly changed by setting a DAC instruction value for the corresponding registers 120, 122, 124, and 126. A light emission current source circuit is constructed here by a register, a DAC, and a constant current source. As a control by the APC 138, a feedback control is executed so that a monitor current im derived from the photosensitive current i0 of the photodiode 102 coincides with a target voltage of the DAC 136 corresponding to a target reading power. Therefore, subtraction current sources 112, 114, and 116 are provided for the monitor photodiode 102 in order to subtract the photosensitive current when the light emission is performed by the erasing power and the first and second writing powers which exceed the reading power and to feed back the monitor current im corresponding to the reading power to the APC. The arbitrary subtraction current i1 can be set for the subtraction current source 112 for the erasing power by an EP subtraction DAC register 128 and a DAC 146 as an EP subtraction current instructing unit. An arbitrary subtraction current i2 can be set for the subtraction current source 114 for the first writing power by a WP1 subtraction DAC register 130 and a DAC 148 as a WP1 subtraction current instructing unit. Further, an arbitrary subtraction current i3 can be also set for the second writing power subtraction current source 116 by a WP2 subtraction DAC register 132 and a DAC 150 as a WP2 subtraction current instructing unit. The monitor currents im in the light emitting modes of those three subtraction current sources i1, i2, and i3 are as follows.

I. When light emitting by the reading power:

$$im=i0$$

II. When light emitting by the erasing power:

$$im=i0-i1$$

III. When light emitting by the first writing power:

$$im=i0-(i1+i2)$$

IV. When light emitting by the second writing power:

$$im=i0-(i1+i3)$$

Therefore, even when the light emission is performed by any one of the erasing power and the first or second writing power which exceed the target reading power, by subtracting the corresponding subtraction current from the photosensitive current i0, the monitor current im flows in a monitor voltage detecting resistor 118 as a current corresponding to the reading power and is fed back to the APC 138. Therefore, the APC 138 controls the reading power current source 104 so as to always maintain the target reading power irrespective of the value of the light emitting power, thereby realizing an automatic power control of the specified erasing power, first writing power, and second writing power. With respect to the subtraction currents as well, a subtraction current source circuit is constructed by a register, a DAC, and a constant current source. A monitor voltage by the monitor voltage detecting resistor 118 corresponding to the monitor current im is converted into digital data by an A/D converter (hereinafter, abbreviated to an "ADC") 152 and is inputted to a monitor ADC register 134. After that, the digital data is read out to the MPU 14 side. Therefore, the ADC 152 and monitor ADC register 134 construct a measuring unit of the monitor current im.

Figure 5A:
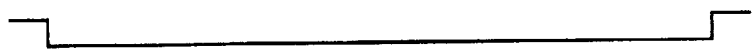
FIGS. 5A to 5J are time charts for signals, a light emission current, a subtraction current, and a monitor current in a pulse train recording of the PWM of the invention.
Figure 5B:
Figure 5C:
Figure 5D:
Figure 5E:
Figure 5F:
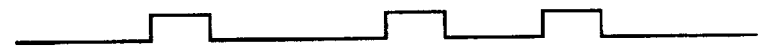
Figure 5G:
Figure 5H:
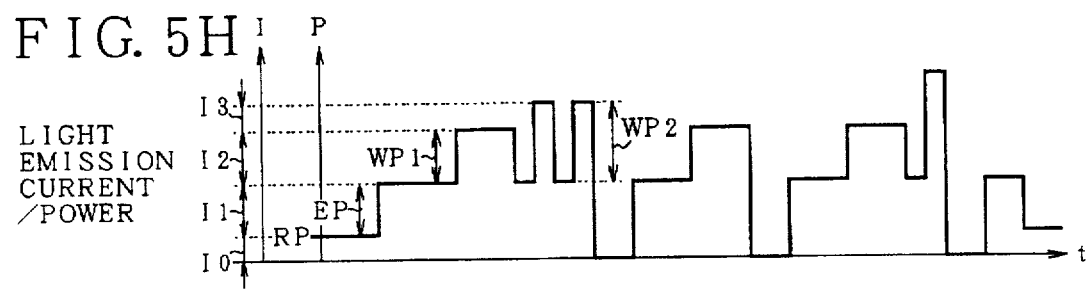
Figure 5I:
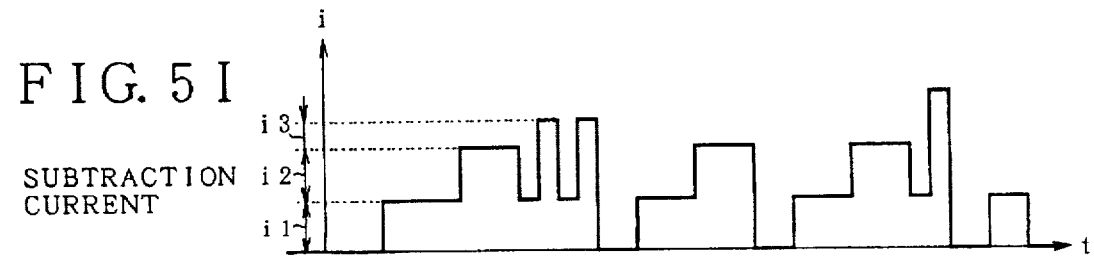
Figure 5J:
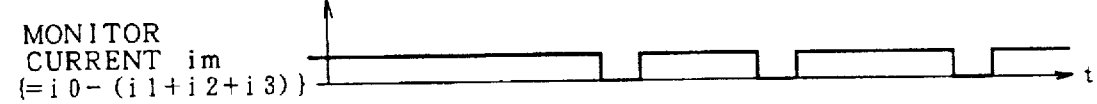

FIGS. 5A to 5J are time charts for signals, a light emission current, and a subtraction current of the pulse train recording of the PWM in the laser diode control circuit 24 in FIG. 4. Now, assuming that write data of FIG. 5B was given synchronously with a write gate of FIG. 5A, the write data is converted into pulse width data of FIG. 5D synchronously with a write clock of FIG. 5C. On the basis of the pulse width data, an erasing pulse is formed as shown in FIG. 5E and, further, a first writing pulse is formed as shown in FIG. 5F. A second writing pulse of FIG. 5G is further formed. The second writing pulse has the pulses of the number corresponding to a pulse width of the pulse width data of FIG. 5D. For example, with regard to the head pulse width data, it has a pulse width of four clocks, the next pulse width data has a pulse width of two clocks, and the further next pulse width data has a pulse width of three clocks. In correspondence to it, as a second writing pulse of FIG. 5G, two pulses are generated with regard to the width of four clocks of the head data subsequent to the first writing pulse of FIG. 5F, 0 pulse is generated as for the pulse width of the next two clocks, one pulse is generated with regard to the third pulse width of three clocks, and information indicative of the pulse width is recorded. FIG. 5H shows light emission currents and powers based on the erasing pulse, first writing pulse, and second writing pulse of FIGS. 5E, 5F, and 5G and relates to the PWM recording in overwrite media of 540 MB and 640 MB as an example. First, the reading current is always supplied and the DC light emission is performed by a reading power RP. Therefore, the light emission current (I0+I1) flows synchronously with the erasing pulse, so that the current is increased by an erasing power EP. The light emission current I2 is added at the timing of the first writing pulse and the current is increased by a first writing power WP1. Further, the light emission current I3 is added at the timing of the second writing pulse and the current is set to (I0+I1+I3), so that the current is increased by a second writing power WP2. A subtraction current shown in FIG. 5I is supplied to the subtraction current sources 112, 114, and 116 in FIG. 4 synchronously with the light emission current of FIG. 5H. Namely, the subtraction current i1 corresponding to the increase amount of the erasing power EP flows, the subtraction current i2 corresponding to the increase amount of the next first writing power WP1 is added, so that a subtraction current (i1+i2) flows. Further, the subtraction current i3 corresponding to the increase amount of the second writing power WP2 is added, so that a subtraction current (i1+i3) flows. Therefore, the monitor current im of FIG. 5J is set to a value obtained by subtracting the subtraction current of FIG. 5H from the photosensitive current i0 corresponding to the light emission current and light emitting power of FIG. 5H. Even during the light emission, the monitor current is always converted to the constant current corresponding to the reading power and is fed back to the APC 138. In the PWM recording of the overwrite media of 128 MB and 230 MB, (RP+EP+WP1) in FIG. 5H is set to the erasing power and (RP+EP+WP2) is set to the writing power. Further, (RP+EP) is applied as an assist power to perform the light emission synchronously with the erasing pulse of FIG. 5E, thereby enabling the power to be raised to the erasing power and the writing power at a high speed.

FIGS. 6A to 6J are timing charts for signals, a light emission current, a subtraction current, and a monitor current upon recording of the PPM medium. Now, assuming that write data of FIG. 6B is given synchronously with a write gate of FIG. 6A, a pit edge pulse of FIG. 6D is formed synchronously with a write clock of FIG. 6C. In response to the pit edge pulse, an erasing pulse of FIG. 6E and a first writing pulse of FIG. 6F are formed. In the PPM recording, a second writing pulse of FIG. 6G is not used. By supplying a light emission current of FIG. 6H by such erasing pulse and first writing pulse to the laser diode, a light emitting power P is derived. In the PPM recording, since the erasing power is the same as the reading power RP, even at a timing of the erasing pulse, the light emission by the reading power RP by the reading power current I0 is maintained. At the timing of the first writing pulse, the light emission current is increased to (I1+I2) and is set to the power obtained by adding the erasing power EP to the first writing power WP1. As a subtraction current of FIG. 6I, the subtraction current (i1+i2) is supplied at the light emission timing of the first writing pulse. Thus, the monitor current im of FIG. 6J is always maintained to the current corresponding to the photosensitive current of the reading power.

Figure 7B:
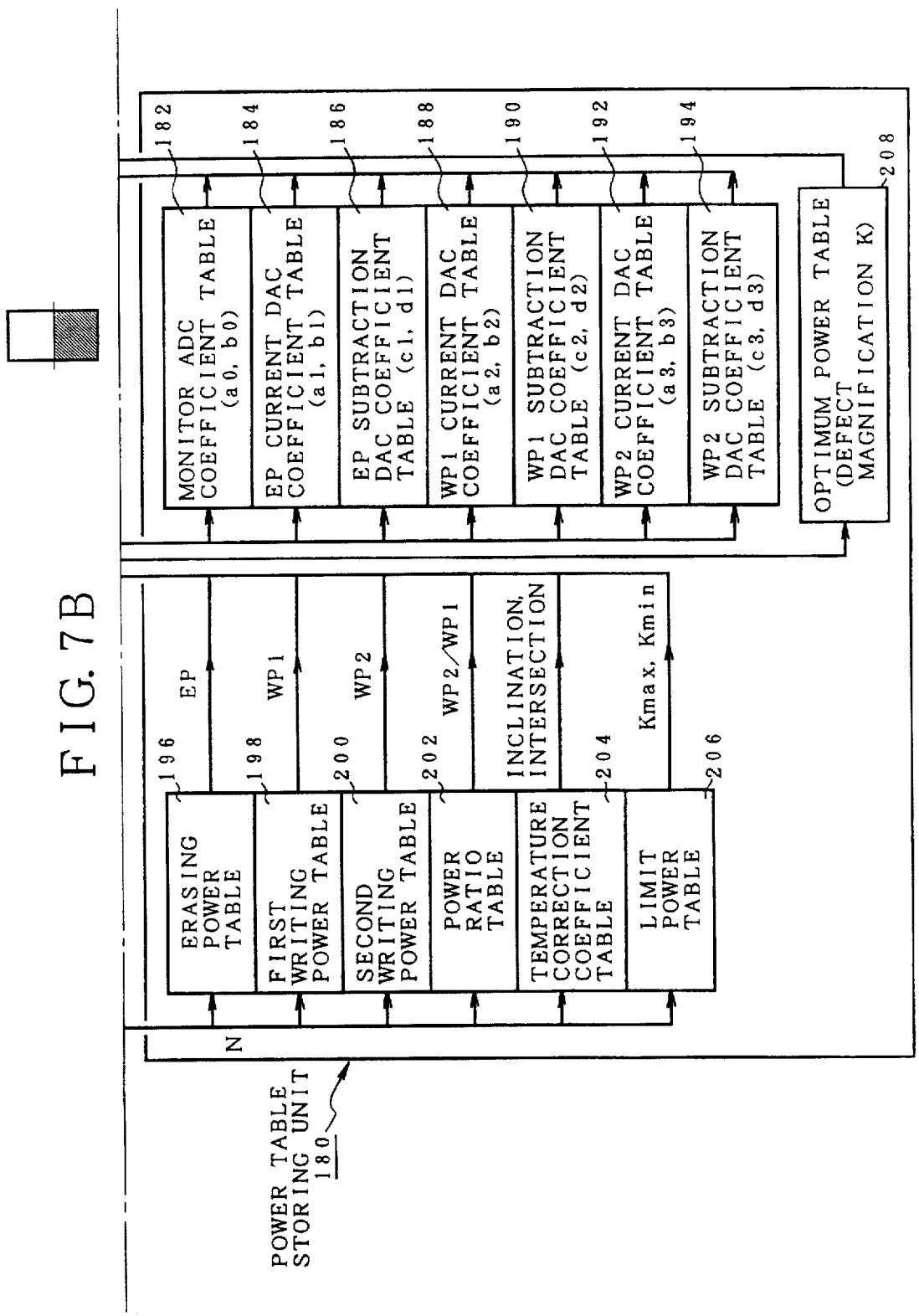

FIGS. 7A and 7B are functional block diagrams for the light emission adjustment of the invention which is realized by the MPU 14 in FIG. 2A. A light emission coarse adjustment processing unit 162, a light emission fine adjustment processing unit 164, and a power set processing unit 166 are provided for an LD light emission processing unit 160. The light emission coarse adjustment processing unit 162 and light emission fine adjustment processing unit 164 construct a light emission processing unit of the invention. The kind of medium loaded, the writing or erasing mode in response to an access from an upper apparatus, the zone number obtained from the access track, and further the temperature in the apparatus by the temperature sensor 36 provided on the enclosure 12 side in FIG. 2 are set for the LD light emission processing unit 160 from the outside through registers 168, 170, 172, and 174 and are used for the light emission adjustment and a power setting process in the ordinary operation. A power table storing unit 180 is provided for the LD light emission processing unit 160. As a power table storing unit 180, a memory such as a DRAM or the like which the MPU 14 in FIG. 2A has is used. First, as shown on the right side, a monitor ADC coefficient table 182, an EP current DAC coefficient table 184, an EP subtraction DAC coefficient table 186, a WP1 current DAC coefficient table 188, a WP1 subtraction DAC coefficient table 190, a WP2 current DAC coefficient table 192, and a WP2 subtraction DAC coefficient table 194 are provided in the power table storing unit 180. A relational equation by a linear approximation of an ADC output as a power measurement value for an arbitrary power which gives an input monitor voltage in the ADC 152 for monitoring in FIG. 4 is obtained by a light emission adjusting process and an inclination a0 and an intersection b0 with the y axis of the relational equation are registered in the monitor ADC coefficient table 182. With respect to a relational equation in which the relations of register instruction values for an arbitrary power in each of the DACs 140, 142, 144, 146, 148, and 150 in FIG. 4 is obtained by a linear approximation of the measurement results by the light emission adjustment, an inclination and an intersection with the y axis of such a relational equation are stored in each of the tables 184, 186, 188, 190, 192, and 194. With respect to the coefficient tables 184, 188, and 192 of the light emission current, since the relational equation of the linear approximation is set by ($y=ax+b$), coefficients a1, a2, and a3 and intersections b1, b2, and b3 with the y axis are registered. On the other hand, with regard to the coefficient tables 186, 190, and 194 for the subtraction current, since a relational equation ($y=cx+d$) of the linear approximation is defined, inclinations c1, c2, and c3 and the intersections b1, b2, and b3 with the y axis are registered. On the other hand, an erasing power table 196, a first writing power table 198, a second writing power table 200, a power ratio table 202, a temperature correction coefficient table 204, and a limit power table 206 are provided in the power table storing unit 180. Although peculiar power values corresponding to all of the zones of the medium have inherently been stored in those tables, in the invention, in the initial state in which the medium has been loaded, they don't have the powers of all of the zones but only the power values of at least two zones which are necessary for the light emission adjustment have been stored. Therefore, the light emission coarse adjustment processing unit 162 obtains a relational equation to linearly approximate each power for the zone number by the light emission adjustment using the power values of two zones which have been initially set in each table, calculates the corresponding powers of all zones from such a relational equation, and registers the powers into the tables. Specifically speaking, the light emission fine adjustment processing unit 164 executes the measuring process by the light emission adjustment using the light emitting powers of two zones which were initially set and the setting of each power every zone according to the relational equation of the linear approximation based on the measurement results by using the adjustment results of the ADC and DAC by the light emission coarse adjustment processing unit 162. Further, an optimum power table 208 is provided in the power table storing unit 180. An optimum power of each zone corresponding to the temperature in the apparatus at that time is obtained by the test write using each power which was adjusted in the state after completion of the light emission adjustment. The optimum power of each zone is registered into the optimum power table 208. Upon registration into the optimum power table 208 in this case, the optimum power itself is not registered but a default magnification K (default ratio) derived by dividing the obtained optimum power by using an adjustment value in each of the power tables obtained by the light emission adjustment as a reference is registered in each power table. Therefore, when setting the power by using the default magnification in the optimum power table 208, the power to be actually set can be obtained by multiplying the default magnification K to the power adjustment value of the corresponding power table. The setting of the optimum power using the optimum power table 208 is executed by the power set processing unit 166. A ratio (WP2/WP1) between the second writing power WP2 and first writing power WP1 has been stored in the power ratio table 202 provided in the power table storing unit 180. When the power ratio table 202 is formed, the second writing power table 200 is unnecessary. The temperature correction coefficient table 204 to correct the power ratio by the temperature in the apparatus at that time in correspondence to the power ratio table 202 is provided. Further, upper and lower limits when the corresponding default magnification K is read out from the optimum power table 208 and multiplied to the adjusted default value are set by the power set processing unit 166 and are registered into the limit power table 206. In a manner similar to the case of the optimum power table 208, the upper and lower limits in the power table 206 have been registered as default magnifications. When the default magnification in the optimum power table is deviated from limit magnifications Kmax and Kmin in the limit power table, the default magnification is limited by the limit ratio.

Figure 8:
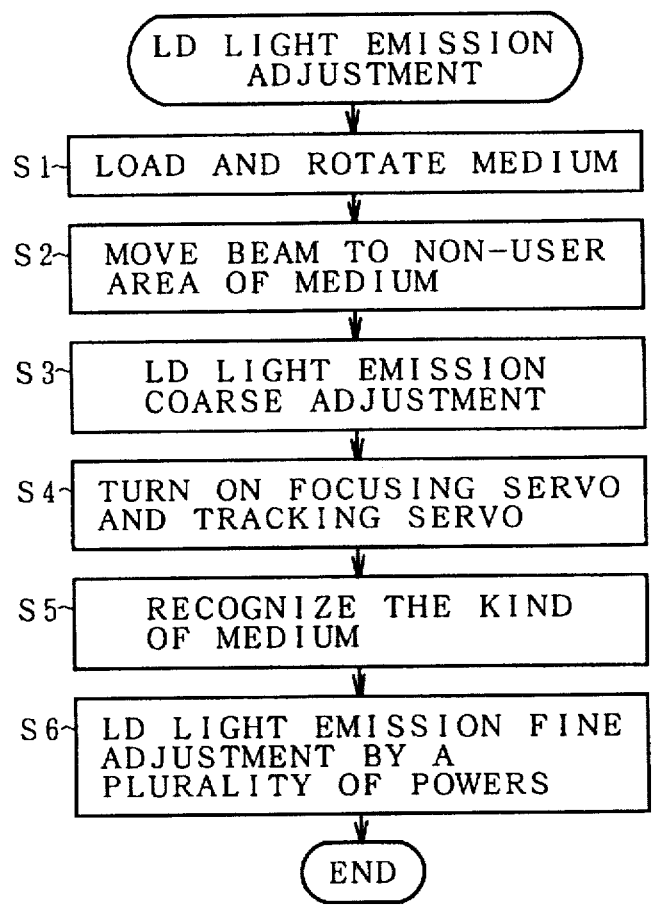
FIG. 8 is a generic flowchart for an LD light emission adjusting process according to FIGS. 7A and 7B.

FIG. 8 shows a generic flowchart for a laser diode light emission adjusting process by the LD light emission processing unit 160 in FIGS. 7A and 7B. First in step S1, the medium is loaded and rotated. In step S2, the beam is moved to, for example, a non-user area on the outermost side of the medium by the driving of the carriage 76 in FIG. 3. In this state, step S3 follows and a light emission coarse adjustment of the laser diode is executed. When the light emission coarse adjustment of the laser diode is performed, a focusing servo is turned off and the APC 138 is also turned off. In step S4, the focusing servo and tracking servo are turned on and, further, the APC 138 is also turned on. In this state, the kind of medium is recognized in step S5. Upon recognition of the kind of medium, by recognizing a pit interval from read data of the ID portion of the track, a process of the medium, namely, whether the loaded medium is a medium of 128 MB, a medium of 230 MB, a medium of 540 MB, or a medium of 640 MB can be recognized. When the kind of medium is recognized in step S5, a fine adjustment by the light emission of the laser diode is performed by a plurality of reading, erasing, and writing powers in step S6. In this case, when the medium is a medium of 128 MB or 230 MB, the light emission fine adjustment according to the PPM recording is performed. When the medium is a medium of 540 MB or 640 MB, the light emission fine adjustment according to the PWM recording is performed.

Figure 9:
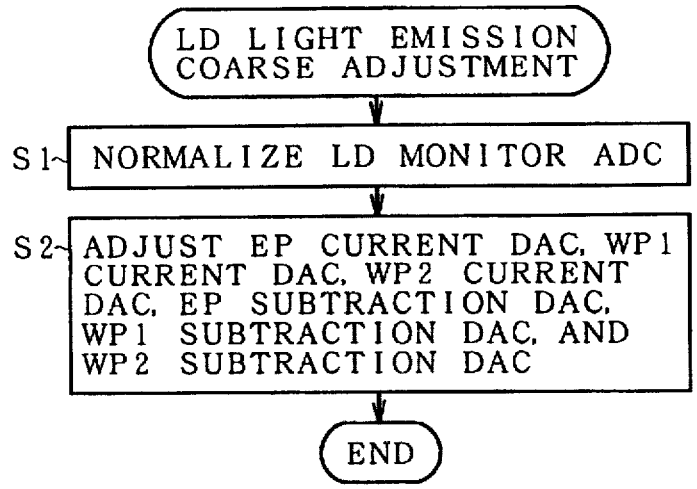
FIG. 9 is a generic flowchart for an LD light emission coarse adjusting process in FIG. 8.

FIG. 9 is a generic flowchart for the LD light emission coarse adjustment in step S3 in FIG. 8. In the LD light emission coarse adjustment, first in step S1, the ADC 152 for monitoring in FIG. 4 is normalized. In step S2, the DACs 136, 140, 142, and 144 for the light emission current and the DACs 146, 148, and 150 for the subtraction current in FIG. 4 are adjusted.

Figure 10:
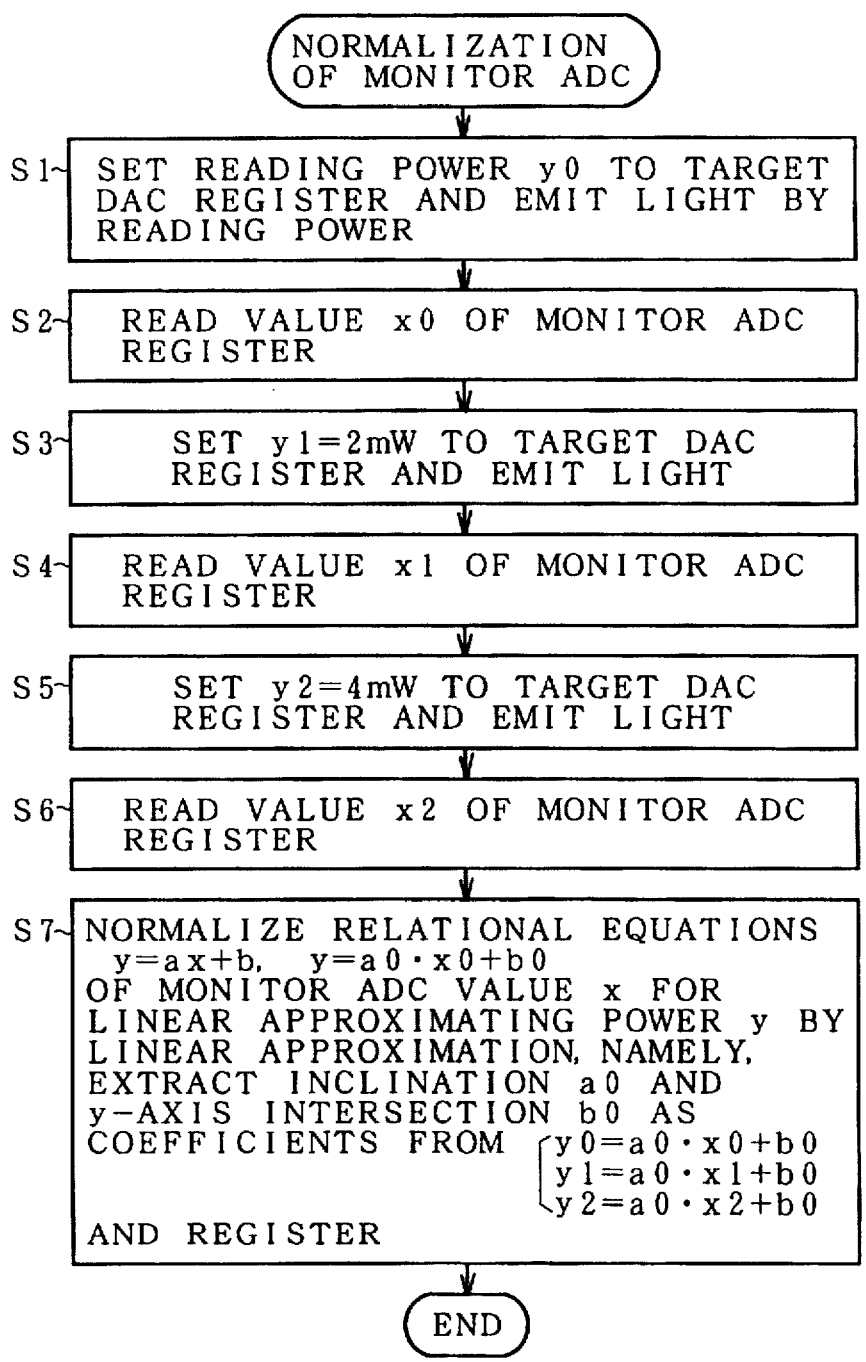
FIG. 10 is a flowchart for a monitor ADC normalizing process in FIG. 9.

FIG. 10 is a flowchart for the normalizing process of the monitor ADC in step S1 in FIG. 9. In the normalizing process of the monitor ADC, in step S1, a specified reading power is set as an instruction value y0 into the target DAC register 120 in FIG. 4 and the laser diode 100 is driven by the reading power so as to emit the light. In this state, a value x0 in the monitor ADC register 134 is read out in step S2. In step S3, an instruction value y1 (=2 mW) is set into the target DAC register 120. In step S4, a value x1 in the monitor ADC register 134 is read out. In a manner similar to the above, an instruction value y2 (=4 mW) is set into the target DAC register 120 in step S5. In step S6, a value x2 in the monitor ADC register 134 is read out. By the processes in steps S1 to S6, measurement values of the ADC 152 corresponding to the powers at three points of the reading powers of 2 mW and 4 mW are obtained. In step S7, therefore, the inclination a0 and the intersection b0 with the y axis are calculated as coefficients from the three relational equations and registered into the monitor ADC coefficient tables 182 in FIGS. 7A and 7B. Therefore, after completion of the normalization, a measurement power y is subsequently calculated by substituting a measurement value x obtained from the monitor ADC register 134 into a relational equation (y= a0×x+b0).

Figure 11:
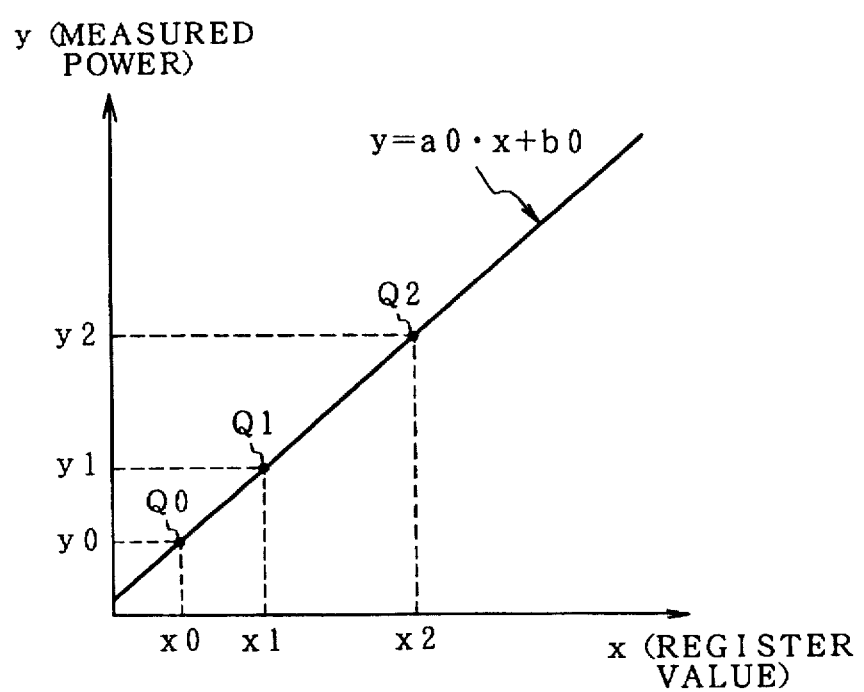
FIG. 11 is an explanatory diagram of a relational equation of a linear approximation by the process in FIG. 10.

FIG. 11 shows a relational equation of a linear approximation in the ADC normalization for monitoring in FIG. 10. Namely, since the measurement powers on the axis of ordinate y indicate the reading powers of 2 mW and 4 mW, three points of Q0, Q1, and Q2 are determined from the register values x0, x1, and x2 on the axis of abscissa which are obtained with respect to those powers. It is sufficient to obtain the coefficients a0 and b0 from the relational equation of the straight line (y=a0×x+b0) connecting those three points. In this case, although three points Q0, Q1, and Q2 are obtained and a precision of the relational equation is raised, two points can be also measured.

Figure 12:
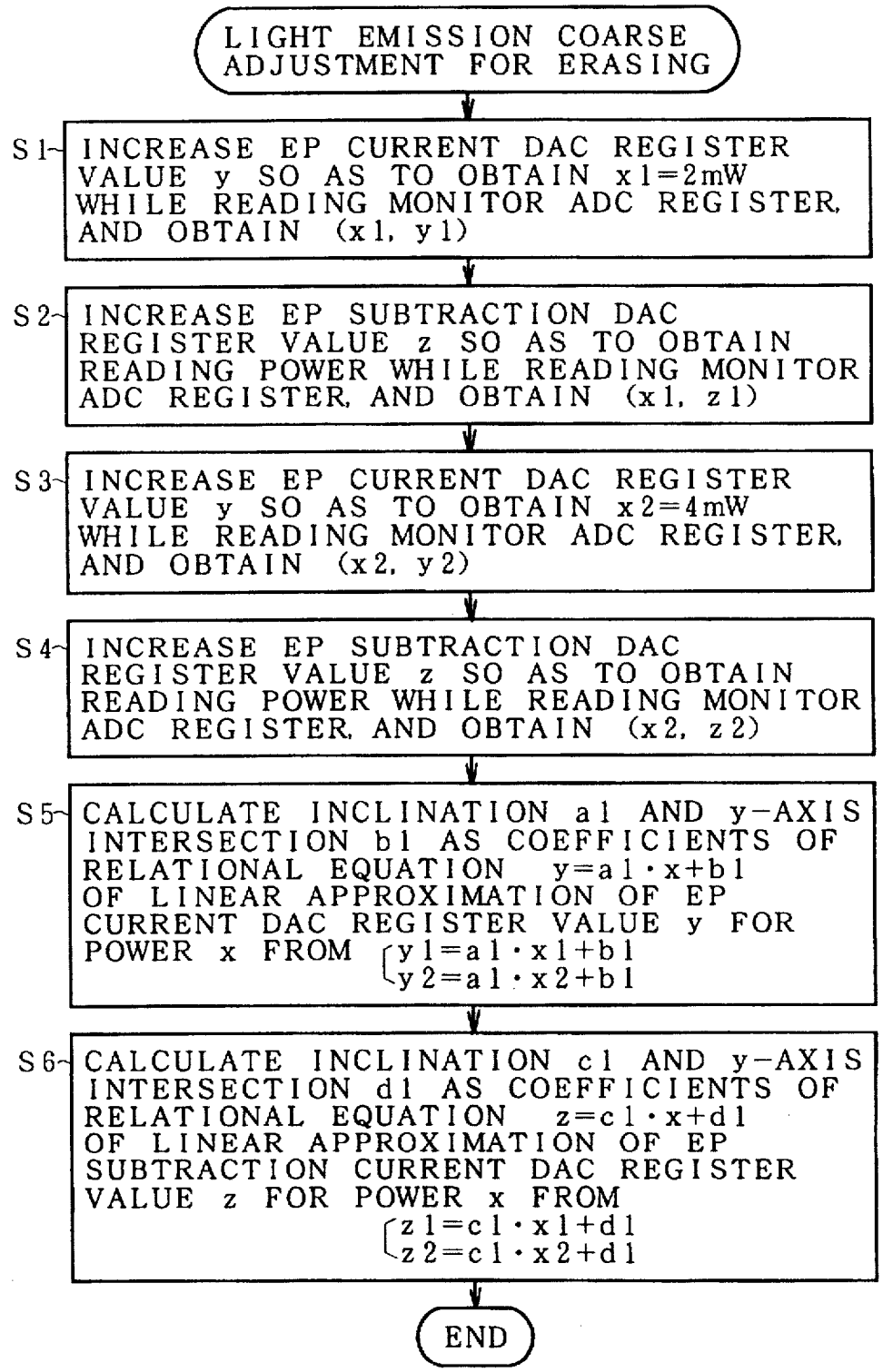
FIG. 12 is a flowchart for a light emission coarse adjusting process for erasing in FIG. 9.

FIG. 12 is a flowchart for a light emission coarse adjustment of the DAC 140 to instruct the light emission current for erasing and the DAC 146 for instructing the subtraction current for erasing in FIG. 4. First in step S1, while reading the monitor ADC 134, the register value y for the EP current DAC register 122 is increased so as to obtain the measurement power x1 (=2 mW), thereby getting (x1, y1). In step S2, while reading the monitor ADC register 134, a register value z in the EP subtraction DAC register 128 is increased so that the measurement power is set to the reading power, thereby getting (x1, z1).

Figure 13:
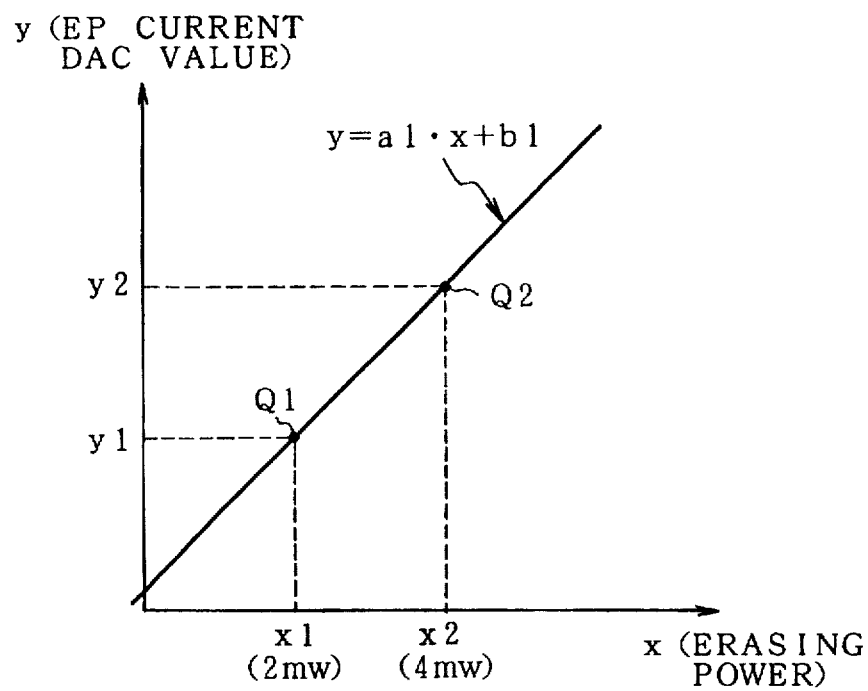
FIG. 13 is an explanatory diagram of a relational equation of a linear approximation in an erasing light emission current in FIG. 12.
Figure 14:
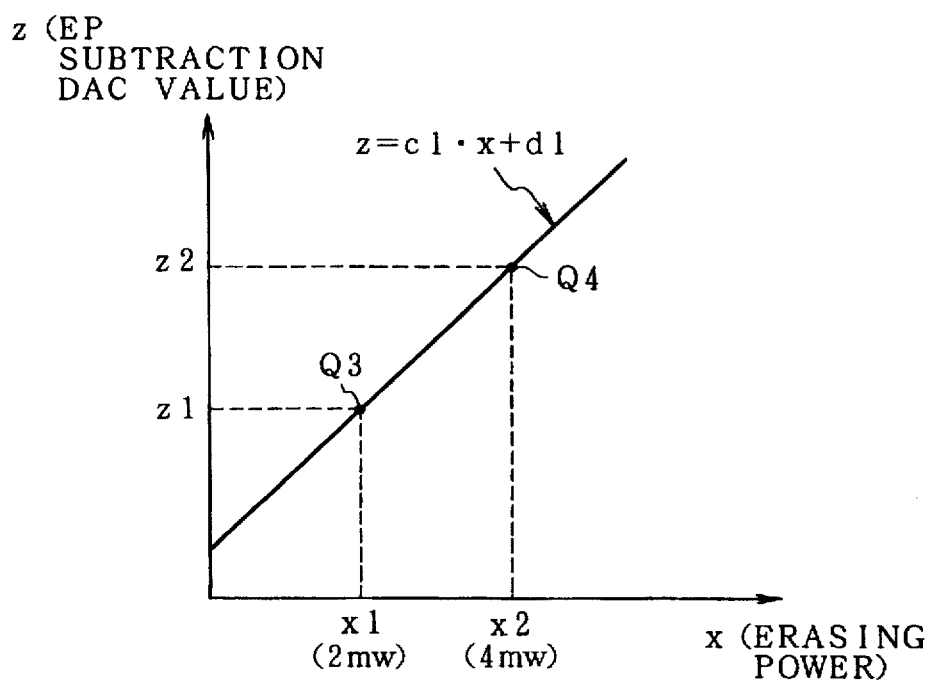
FIG. 14 is an explanatory diagram of a relational equation of a linear approximation in an erasing subtraction current in FIG. 12.

In step S3, while reading the monitor ADC register 134, a register value y in the EP current DAC register 122 is increased so as to obtain the measurement power x2 (=4 mW), thereby getting (x2, y2). Further in step S4, while reading the monitor ADC register 134, the register value z in the EP subtraction DAC register 128 is increased so that the measurement power is set to the reading power, thereby getting (x2, z2). After completion of the measurement of the power by the light emission mentioned above, in step S5, with respect to two points (x1, y1) and (x2, y2) obtained in steps S1 and S3, the value y in the EP current DAC register for the power x is substituted into a relational equation (y=a1·x+b1) of the linear approximation, thereby calculating the inclination a1 and the intersection b1 with the y axis from those two substitution equations. Specifically speaking, as shown in FIG. 13, a relational equation (y=a1·x+b1) of a straight line connecting Q1 (x1, y1) and Q2 (x2, y2) is approximated and the inclination a1 and the intersection b1 with the y axis are obtained as coefficients. In step S6, with respect to two points (x1, z1) and (x2, z2) obtained in steps S2 and S4, Q3 and Q4 are set as shown in FIG. 14, a straight line connecting those two points is approximated, a relational equation (z=c1·x+d1) is obtained, and the values of Q3 and Q4 are substituted into this equation, thereby calculating the inclination c1 and an intersection d1 with the y axis. An inclination a and an intersection b with the y axis of the relational equation of the linear approximation of the register instruction value for an arbitrary power of the DAC 140 to instruct the erasing power light emission current in FIG. 4 calculated in step S5 are registered into the EP current DAC coefficient table 184 in FIGS. 7A and 7B. An inclination c and the intersection b with the y axis of a relational equation of the linear approximation to obtain the register value y for the subtraction current DAC 146 for the arbitrary power calculated in step S6 are registered into the EP subtraction DAC coefficient table 186 in FIGS. 7A and 7B.

FIG. 15 is a flowchart for a light emission coarse adjustment of the DAC 142 for the light emission by the first writing power and the DAC 148 for instructing the subtraction current in FIG. 4. The first writing power light emission coarse adjustment is fundamentally the same as the light emission coarse adjustment for erasing in FIG. 12 except a different point that instructing powers to the WP1 current DAC register 124 are set to two points of 4 mW and 8 mW. By setting the subtraction current so as to obtain the reading powers for the light emission of 4 mW and 8 mW in steps S1 to S4, two points of (x1, y1) and (x2, y2) are obtained with respect to the writing power light emission current and two points of (x1, z1) and (x2, z2) are obtained with regard to the subtraction current. In step S5, the inclination a2 and the intersection b2 with the y axis of the relational equation of the linear approximation of the register value y for the arbitrary first writing power x are calculated in step S5. In step S6, the inclination c2 and an intersection d2 with the y axis of the relational equation of the linear approximation of the register value z of the subtraction current for the arbitrary first writing power x are calculated. The above calculated values are registered into the WP1 current DAC coefficient table 188 and WP1 subtraction DAC coefficient table 190 in FIGS. 7A and 7B, respectively.

Figure 16:
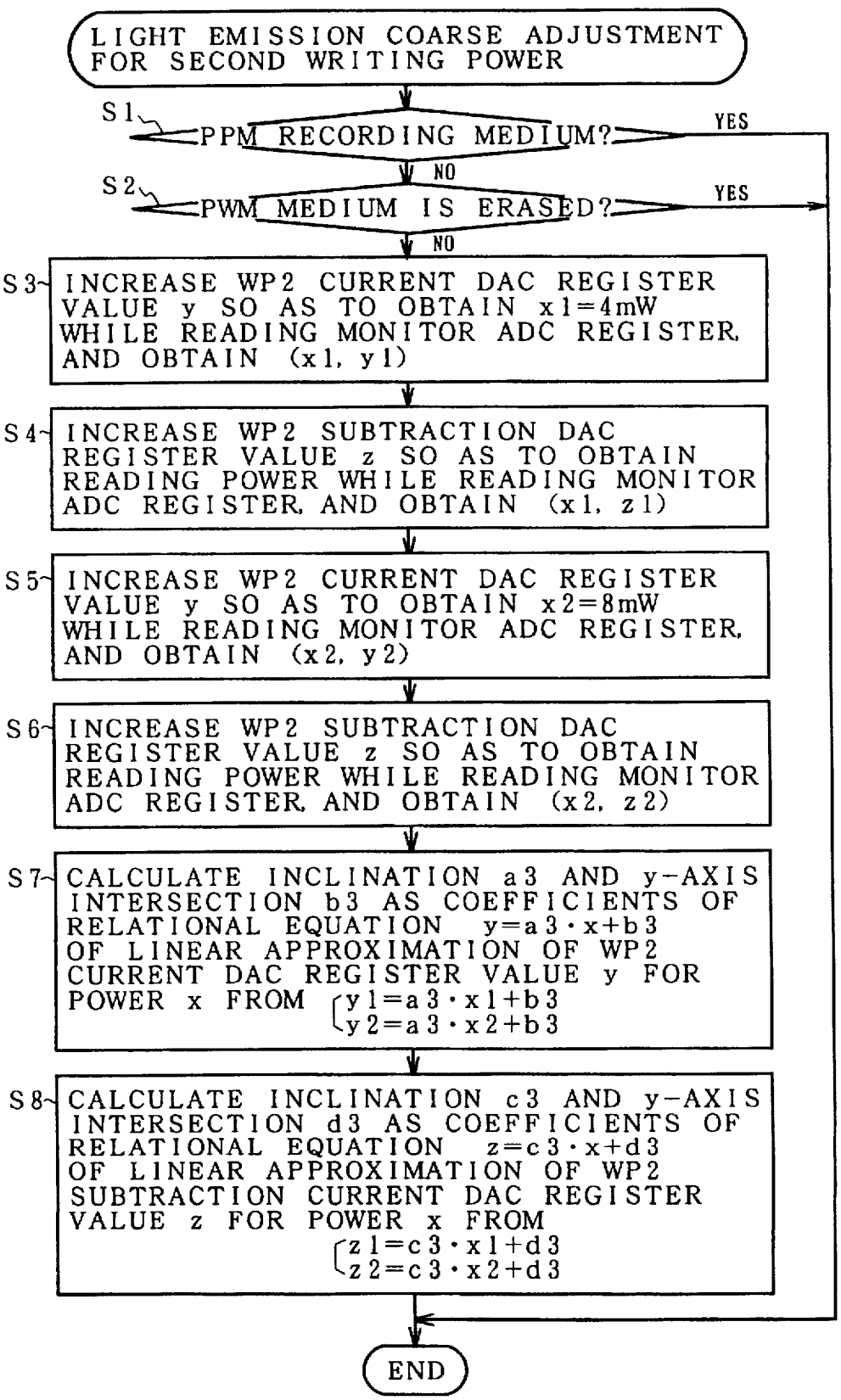
FIG. 16 is a flowchart for a light emission coarse adjustment for a second writing power in FIG. 9.

FIG. 16 is a flowchart for a second writing power coarse adjusting process with respect to the DAC 144 for instructing the current of the light emission by the second writing power and the DAC 150 for instructing the subtraction current in FIG. 4. In the second writing power coarse adjusting process, first in step S1, a check is made to see if the loaded medium is a PPM recording medium. In case of the PPM recording medium, the adjusting process of the second writing power is skipped. In step S2, a check is made to see if the PWM medium is erased. If YES, since the second writing power is not used, in this case as well, the process of the writing power coarse adjustment is skipped. It will be obviously understood that the second writing power coarse adjustment can be always performed without discriminating the erasing operation of the PPM medium or PWM medium. The light emission adjustment in steps S3 to S6 is substantially the same as the erasing light emission coarse adjustment in FIG. 12. In this case as well, the light emission adjustment is performed at two points of 4 mW and 8 mW and the subtraction current is subsequently adjusted so as to obtain the reading power. In steps S7 and S8, an inclination a3 and the intersection b3 with the y axis of the relational equation of the linear approximation with respect to the DAC 144 for instructing the current by the second writing power light emission are calculated. In step S8, the inclination c3 and an intersection d3 with the y axis of the relational equation of the linear approximation with respect to the DAC 150 to instruct the subtraction current at the time of the light emission by the second writing power are calculated. The above calculated values are registered into the WP2 current DAC coefficient table 192 and WP2 subtraction coefficient table 194 in FIGS. 7A and 7B, respectively.

FIG. 17 shows registration contents in the coefficient tables 182 to 194 in the power table storing unit 180 in FIGS. 7A and 7B registered by the above light emission coarse adjustment. By forming the relational equation of the linear approximation by using the values of the inclination and the intersection with the y axis among them, the conversion from an arbitrary monitor voltage measurement value into the measurement power and the conversion from an arbitrary power into the current instruction value to the ADC can be realized.

FIG. 18 is a generic flowchart for a laser diode light emission fine adjustment by the light emission fine adjustment processing unit 164 in FIGS. 7A and 7B. In the light emission fine adjusting process, in step S1, the inclination and the intersection with the y axis are read out from the coefficient table by the light emission coarse adjustment which has already been finished and relational equations are obtained with respect to the ADC 152 for measuring the monitor current which is necessary for the light emission adjustment, DACs 140 to 144 for instructing the current to control the current to obtain each power, and DACs 146 to 150 for instructing the subtraction current. In step S2, a power table for the zones of the medium is formed. In step S3, a power ratio table for the zones and the temperature is formed. In final step S4, a power limit is calculated.

FIG. 19 is a flowchart for a erasing power fine adjustment which is executed in the forming process of the power table for the zones in step S2 in FIG. 18. In the erasing power fine adjustment, first in step S1, a relational equation (y=a1·x+c1) regarding the current instructing DAC 140 obtained by the light emission coarse adjustment of the erasing power and a relational equation (z=c1·x+d1) of the corresponding subtraction current instructing DAC 146 are set. In step S2, by substituting x1 (=3 mW) into the relational equation, the corresponding current DAC register value y1 is calculated and the laser diode 100 is driven so as to emit the light. In this state, the subtraction DAC register value x1 of (x1=3 mW) is likewise calculated and the subtraction current is supplied, thereby forming a state in which it is subtracted from the monitor current. In such a state of the light emission and subtraction current by the power of 3 mW, the processing routine advances to step S3. While reading by using the register value of the monitor ADC 152 as a measurement value y, the register value x1 for the EP current DAC register 122 is changed so as to obtain the reading power, thereby adjusting the light emitting power by the DAC 140. Thus, the adjustment value (x1, y1) can be obtained. In step S4, the light emitting power is increased to 5 mW, the corresponding subtraction current is likewise set and subtracted from the monitor current, and the register value x2 for the register 122 of the EP current DAC 140 is changed so that the monitor ADC value y is set to the reading power, thereby adjusting the light emission current in step S5. Thus, the second point (x2, y2) is derived. In final step S6, by substituting the two points obtained by the adjustment into the relational equation of the DAC 140 for the EP current, the coefficient a1 and the intersection b1 with the y axis of the relational equation are calculated and they are registered as an erasing power fine adjustment result into the EP current DAC coefficient table 184 in FIGS. 7A and 7B and corrected.

FIG. 20 is a flowchart for the fine adjusting process of the first writing power which is executed in the forming process of the power table for the zones in step S2 in FIG. 18. In the first writing power fine adjusting process, since two currents of the light emission current of the erasing power and the light emission current of the first writing power are used, in step S1, the relational equation of the current DAC value obtained by the coarse adjustment with respect to the erasing power and the relational equation of the subtraction DAC are set and the relational equation of the current DAC value regarding the second writing power obtained likewise in the coarse adjustment and the relational equation of the corresponding subtraction DAC value are set. In step S2, for the light emission of the first writing power of 5 mW, the first writing power is set to WP1=3 mW, the erasing power is set to EP=2 mW, and the current DAC value and the subtraction DAC value are calculated from the relational equations set in step S1, thereby performing the light emission control. In this state, in step S3, the monitor ADC value is read out as a measurement value y and the current ADC register value x1 of the first writing power PW1 is changed so as to obtain the reading power, thereby adjusting the light emitting power by the DAC 142. At this time point, (x1, y1) is obtained. In step S4, the first writing power is set to 9 mw. The first writing power of 9 mW is realized by the first writing power WP (=7 mW) and the erasing power EP (=2 mW). Therefore, with respect to each of 7 mW and 2 mW, the current DAC value and the subtraction DAC value regarding the first writing power and the erasing power are calculated from the relational equations in step S1, thereby performing the light emission control. In the state of the light emission control, while reading out the monitor ADC value y as shown in step S5, the WP1 current DAC value x2 is changed so as to obtain the reading power, thereby adjusting the light emitting power. At this time point, (x2, y2) is obtained. In final step S6, the coefficient a2 and the intersection b2 with the y axis in the relational equation of the DAC 142 for instructing the current of the first writing power WP1 at the time of the light emission by the second writing power are calculated from the substitution equation of the relational equations at two points of the adjustment data and are registered into the WP1 current DAC coefficient table 188 in FIGS. 7A and 7B and corrected.

FIG. 21 is a flowchart for the fine adjusting process of the second writing power which is executed in the forming process of the power table for the zones in step S2 in FIG. 18. First in step S1, the relational equations obtained by the coarse adjustment with respect to the second writing power are set, the light emission is performed at two points of 5 mW and 9 mW on the basis of the relational equations, the coefficient a3 and intersection b3 with the y axis of the relational equations are calculated from the measurement result, and the WP2 current DAC coefficient table 192 in FIGS. 7A and 7B is corrected. The other points are fundamentally the same as those of the first writing power light emission adjusting process in FIG. 20.

Figure 23:
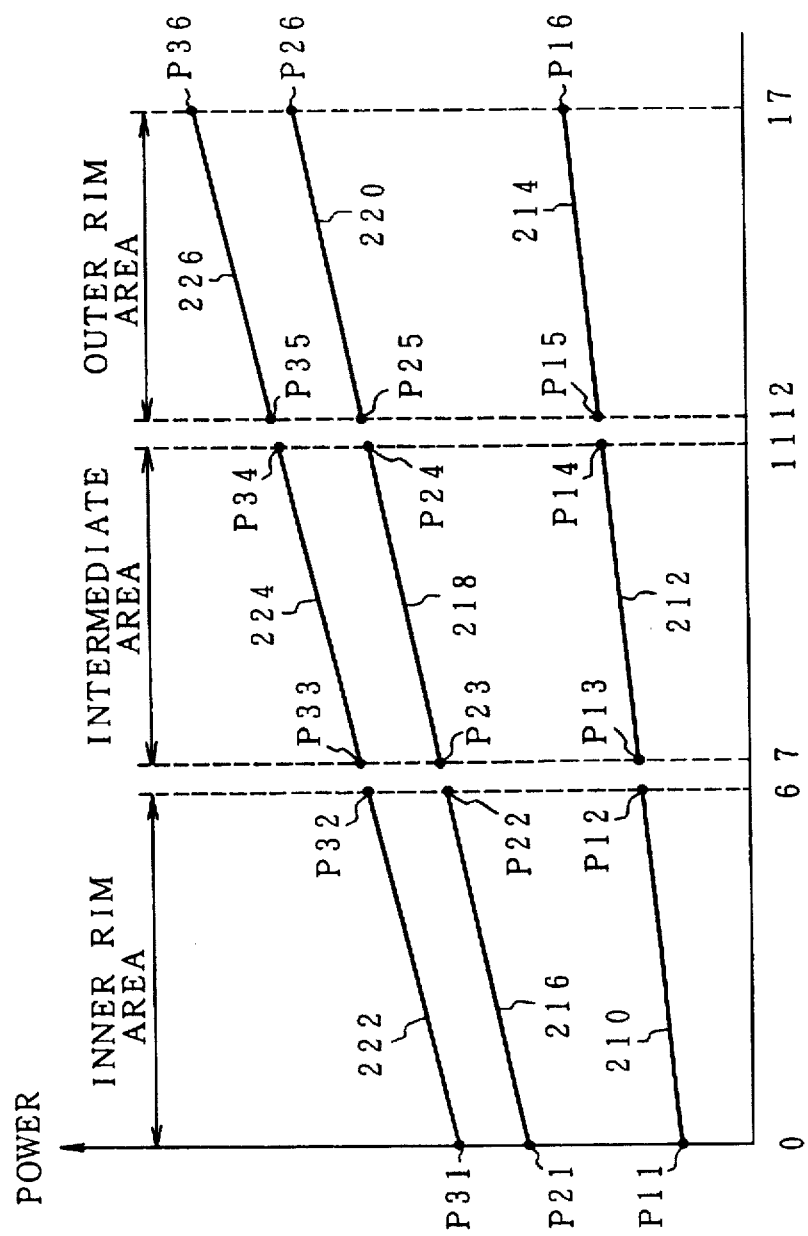
FIG. 23 is an explanatory diagram of the zone area division and a linear approximation in FIG. 22.

FIG. 22 is a flowchart for a zone division power table forming process to obtain the erasing power table 196, first writing power table 198, and second writing power table 200 provided in the power table storing unit 180 in FIGS. 7A and 7B from the relational equations of the linear approximation for the zone number. First in step S1, as shown in FIG. 23, for example, with respect to 18 zones of the zone numbers 0 to 17 of the medium of 540 MB, they are divided into three areas of the inner rim area, intermediate area, and outer rim area. In step S2, the value of the erasing power in the erasing modes of the zones at both ends of each area, namely, powers P11 to P16 in FIG. 23 are set. Values P21 to P26 of the first writing power WP1 in the erasing mode are set. In step S3, for the zone numbers of each of the inner rim, intermediate, and outer rim areas, the erasing power and the first writing power WP1 in step S2 are linearly approximated and the inclination and the intersection with the y axis are derived from the relational equations. Specifically speaking, for example, with respect to the erasing power, they are approximated by straight lines 210, 212, and 214 with regard to each of the inner rim, intermediate, and outer rim areas, thereby deriving the inclinations and the intersections with the y axis from the relational equations of the straight lines 210, 212, and 214, respectively. In this case, as intersections with the y axis, the power values P11, P13, and P15 at the zone numbers 0, 7, and 12 of the inner rim edge of each area are used. Similarly, as for the first writing power as well, they are linearly approximated by straight lines 216, 218, and 220 with respect to the first writing power, thereby deriving the inclinations and the intersections with the y axis from the relational equations. In step S3, with respect to the writing mode, the erasing power, first writing power WP1, and second writing power WP2 of the zones at both ends in each of the inner rim, intermediate, and outer rim areas in FIG. 23 are set. In this case, in addition to the erasing power and the first writing power in the erasing mode, the second writing power WP2 is newly set, so that second writing powers P31 to P36 are set into the zones of both ends of each of the inner rim, intermediate, and outer rim areas in FIG. 23. In step S4, with respect to each of the erasing power EP, first writing power WP1, and second writing power WP2, the linear approximation is performed like straight lines 210 to 226 in FIG. 23, thereby deriving the inclinations and the intersections with the y axis from the relational equations. After completion of the above processes, as for the three inner rim, intermediate, and outer rim areas, with respect to each of the erasing mode and the writing mode, the table registration of the inclinations and the intersections with the y axis of the relational equations of the erasing power EP, first writing power WP1, and second writing power WP2 (excluding the erasing mode) is performed to the erasing power table 196, first writing power table 198, and second writing power table 200 in FIGS. 7A and 7B. Now, assuming that each power was obtained with respect to all of the 18 zones, since (18 zones)×(3 powers)=54 powers are needed in the two modes of the erasing mode and writing mode, it is necessary to store 108 powers into the table. On the other hand, in the registration of the coefficients of the relational equations of the linear approximation by the area division of the zones of the invention, since it is sufficient to register six coefficients per area, it is sufficient to store only (3 areas)×(6 coefficients)×(2 modes)=36 powers. The data amount in the table registration can be remarkably reduced. FIG. 24 shows registration contents of the coefficients of the relational equations by the linear approximation to the erasing power table 196, first writing power table 198, and second writing power table 200 in FIGS. 7A and 7B obtained as mentioned above.

FIG. 25 is a flowchart for a writing power ratio temperature correcting process in the light emission fine adjusting process. The writing power ratio temperature correcting process is applied to a case where the power ratio table 202 to register a power ratio with the first writing power is used in place of the second writing power table 200 in FIG. 7. The temperature correction coefficient table 204 is prepared in correspondence to the power ratio table 202. First in step S1, for example, in case of the medium of 540 MB, four points of power ratios (WP2/WP1) at two different temperatures T1 and T2, for example, 10° C. and 55° C. of the innermost rim zone and power ratios (WP2/WP1) at the different temperatures T1 and T2 which are the same as those temperatures, namely, 10° C. and 55° C. in the outermost rim zone are set.

Figure 26:
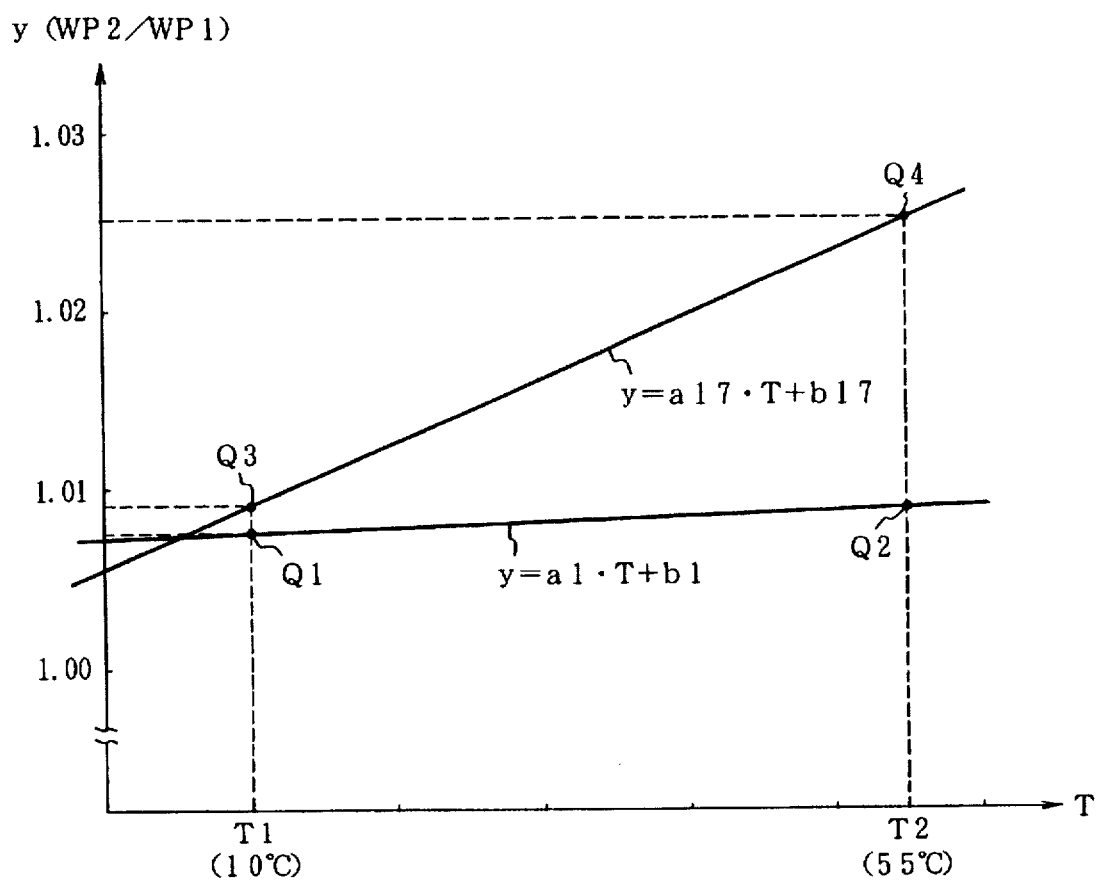
FIG. 26 is an explanatory diagram of a linear approximation of a power ratio to a temperature in FIG. 25.

FIG. 26 is a diagram in which the temperatures T (axis of abscissa) and the power ratios (WP2/WP1) (axis of ordinate y) at two points Q1 and Q2 in the innermost rim zone and two points Q3 and Q4 in the outermost rim zone in step S1 in FIG. 25 are plotted. In step S2, the values of Q1 and Q2 are substituted into a relational equation (y=a1·T+b1) by each power ratio at the temperatures T1 and T2 of the innermost rim zone, namely, by the linear approximation of the straight line connecting two points Q1 and Q2 in FIG. 26, thereby calculating the inclination a1 and the intersection b1 with the y axis. Similarly, in step S3, the values of Q3 and Q4 in the outermost rim zone are substituted into a relational equation (y=a17·T+b17) of the straight line in which both of them are linearly approximated, thereby calculating an inclination a17 and an intersection b17 with the y axis. In step S4, the inclination a1 of the innermost rim zone and the inclination a17 of the outermost rim zone in the two relational equations in FIG. 26 are substituted into a relational equation (a=α·N+β) of the linear approximation for the zone number N, thereby calculating an inclination α and an intersection β with the y axis. Similarly, in step S5, the intersection b1 with the y axis of the innermost rim zone and the intersection b17 of the outermost rim zone are substituted into a relational equation (b=γ·N+δ) of the linear approximation for the zone number N, thereby calculating an inclination γ and an intersection δ with the y axis. In final step S6, coefficients (α, β) and (γ,δ) using the zone number N as an index are registered into the table as shown in FIG. 27. The contents in the table in FIG. 27 construct the power ratio table 202 and temperature correction coefficient table 204 shown in FIGS. 7A and 7B. From the power table of FIG. 27, when the zone number N and the temperature T in the apparatus at that time are given, the power ratio of the designated zone number N can be obtained. For example, now assuming that the zone number N=2 is designated, coefficients α02 and β02 are obtained from the table and substituted into the inclination calculating equation (a=α·N+β), thereby obtaining an inclination a of the power ratio calculating equation. At the same time, coefficients γ02 and δ02 are read out from the zone number N=2 and substituted into the intersection calculating equation (b=γ·N+δ), thereby calculating the intersection b2 with the y axis of the power ratio calculating equation. The inclination a and the intersection b with the y axis calculated are set into the power ratio calculating equation. Further, by substituting the temperature T in the apparatus at that time, the power ratio (WP2/WP1) can be calculated. The calculation of the power ratio based on the temperature in the apparatus and the zone number N can be executed each time or the calculation value based on the temperature T in the apparatus at that time can be also previously registered into the power ratio table 202 in correspondence to the zone number N. Further, in a manner similar to the case where the zones in FIG. 23 are divided into the inner rim, intermediate, and outer rim areas and the inclinations by the linear approximation are registered into the table, it is also possible to construct in a manner such that the power ratios of the zones at both ends of the inner rim, intermediate, and outer rim at the apparatus temperature at that time are obtained from the contents in the table in FIG. 27 and with respect to them, similarly to the case of FIG. 23, the inclination and the intersection with the y axis of each straight line in the linear approximation of three inner rim, intermediate, and outer rim areas are obtained with respect to the power ratios and are registered into the power ratio table 202.

Figure 29:
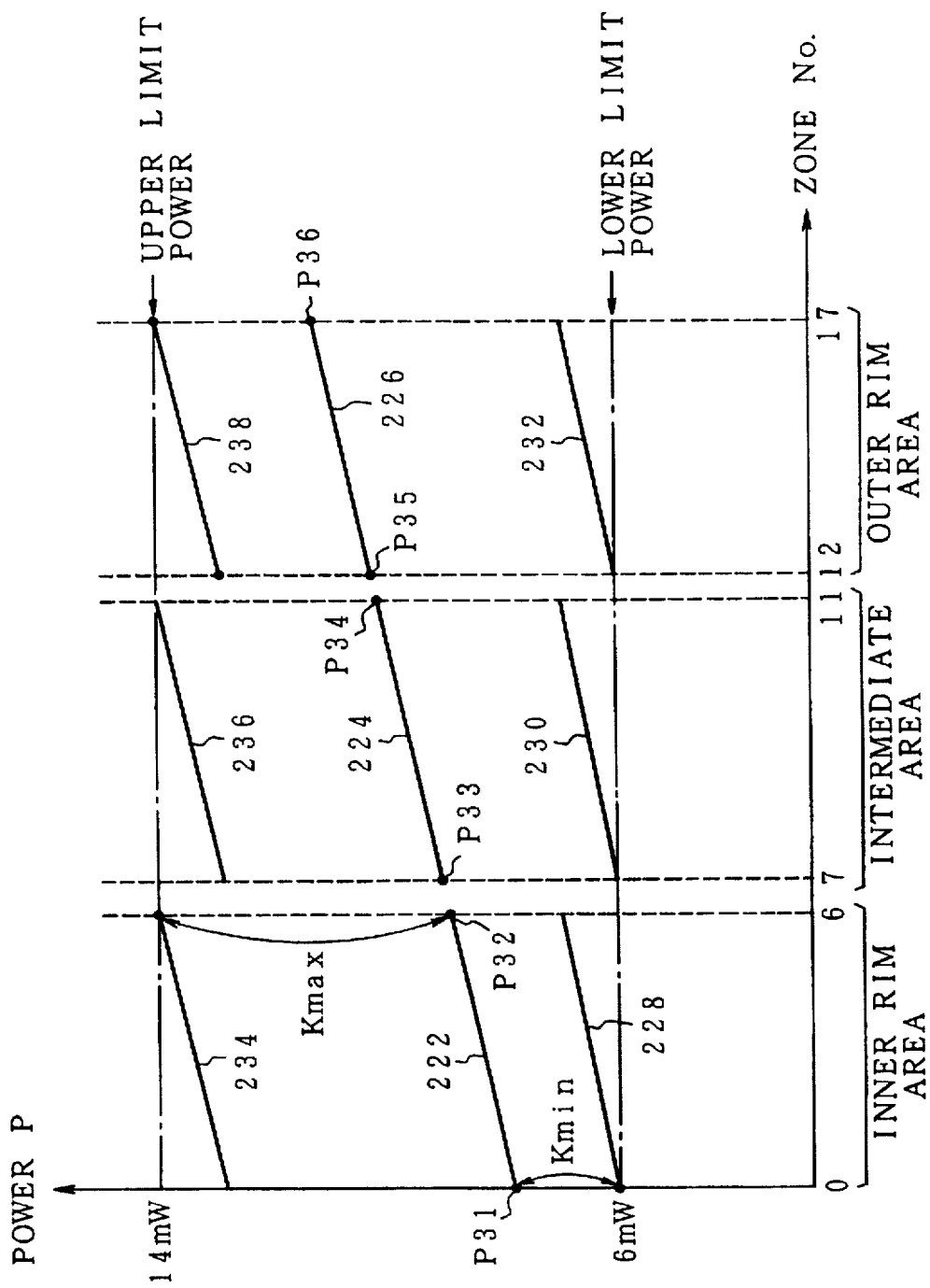
FIG. 29 is an explanatory diagram of a linear approximation in the calculation of the power limit in FIG. 28.

FIG. 28 is a flowchart for a calculating process of a power limit which is executed in the light emission adjusting process. In the calculating process of the power limit, first in step S1, the zones are divided into the three inner rim, intermediate, and outer rim areas as shown in FIG. 29 and the temperature is divided into temperature ranges every 8° C. For example, the temperature is divided into eight temperature ranges of 0°–7° C., 8°–15° C.,...., and 64°–71° C. In step S2, a power upper limit Pmax and a power lower limit Pmin are set every temperature range. With respect to a temperature range of FIG. 29, the power upper limit Pmax and power lower limit Pmin are set. In step S3, with respect to each temperature range, the maximum power Pmax and minimum power Pmin in each of the three areas of the inner rim, intermediate, and outer rim areas are set. FIG. 29 relates to an example of the calculation of the power limits of the PWM recording. In this case, the power (RP+EP+WP2) obtained by adding the reading power RP, erasing power EP, and second writing power WP2 is used when setting the maximum power and minimum power of each area. Namely, with respect to the power (RP+EP+WP2), powers P32, P34, and P36 of outer rim edge zones 6, 11, and 17 of each of the inner rim, intermediate, and outer rim areas are set to the maximum powers and powers P31, P33, and P35 of inner rim edge zones 0, 7, and 12 are set to the minimum powers Pmin. In case of the PPM recording medium, the maximum power and minimum power of each area are set by the power (RP+EP+WP1) obtained by adding the reading power RP, erasing power EP, and first writing power WP1. In step S4, with respect to each temperature range, the magnification Kmax for the power upper limit in which the maximum powers Pmax of three inner rim, intermediate, and outer rim areas are set to the default values is calculated. Similarly, a magnification Kmin for the power lower limit using the minimum powers Pmin as default values is calculated. In final step S5, the limit power table 206 in FIGS. 7A and 7B in which the temperature range and zone area of every 8° C. are used as indices and the default magnifications of the power upper and lower limits have been registered is formed. According to such a limit power table, from the temperature T° C. in the apparatus and the zone number, the default magnification Kmax of the corresponding power upper limit and the default magnification Kmin of the corresponding power lower limit are obtained with reference to the limit power table 206. For example, in case of the PWM medium in which the maximum power of the area is given, by multiplying the power of (EP+WP2) to those magnifications Kmax and Kmin, the power upper limit and power lower limit can be obtained. The above operations are substantially the same as that the setting by the linear approximation of power upper limits 234, 236, and 238 and the setting by the linear approximation of power lower limits 228, 230, and 232 are executed every area in FIG. 29. Such power upper and lower limits which were set as mentioned above are compared with a default magnification to obtain the optimum writing power that is given when performing the writing operation after completion of the light emission adjustment. When the default magnification to obtain the optimum writing power is out of the power upper limit or power lower limit set as shown in FIG. 29, the default magnification which gives the optimum power is limited to the power upper limit or power lower limit and is used. FIG. 30 shows registration contents of the limit power table formed by the calculating process of the power limits in FIG. 28.

Figure 31:
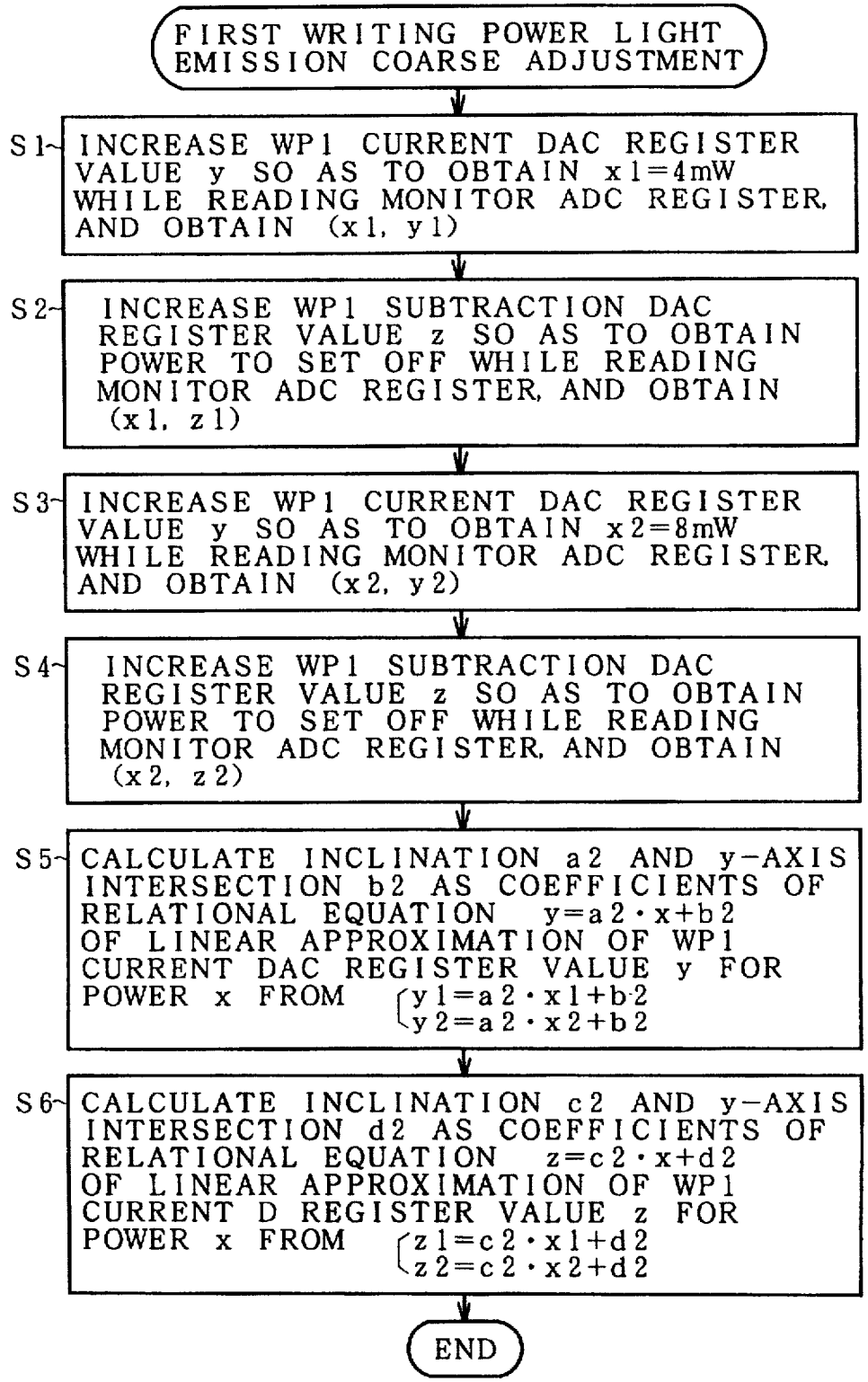
FIG. 31 is a flowchart for explaining a drift of a writing power which occurs by an automatic power control of a PWM recording.

A flowchart of FIG. 31 shows another embodiment of the first writing power light emission coarse adjusting process of the invention. The embodiment is characterized in that a drift occurring in the automatic light emission control of the writing power of the PWM recording in the APC 138 in FIG. 4 is adjusted at the time of the light emission coarse adjustment and can be compensated.

Figure 32A:
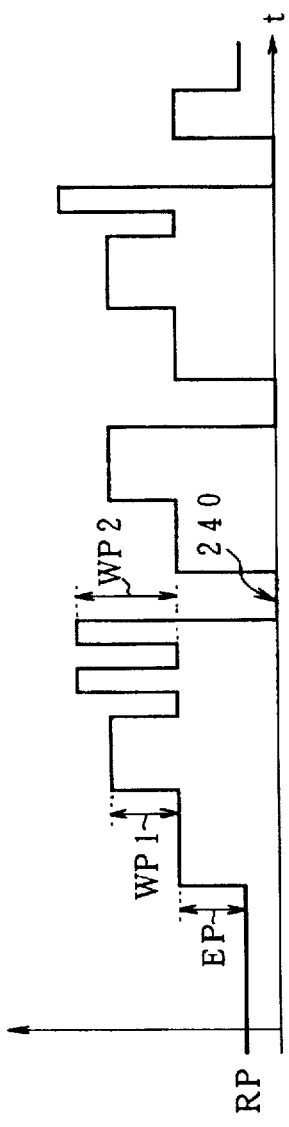
FIGS. 32A to 32C are time charts for explaining a subtraction current adjustment to compensate the drift of the writing power in FIG. 31.
Figure 32B:
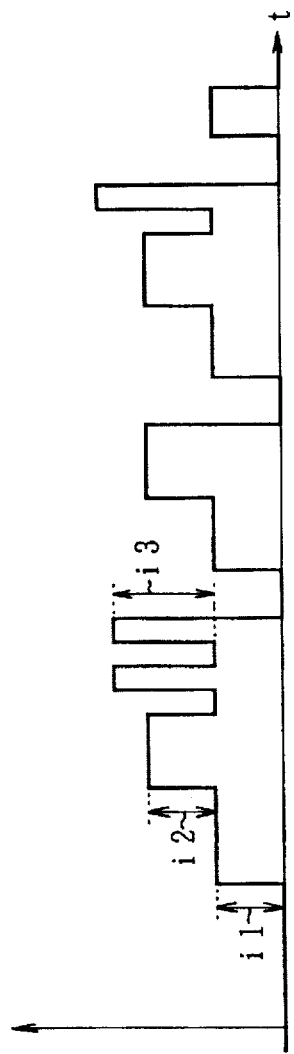
Figure 32C:
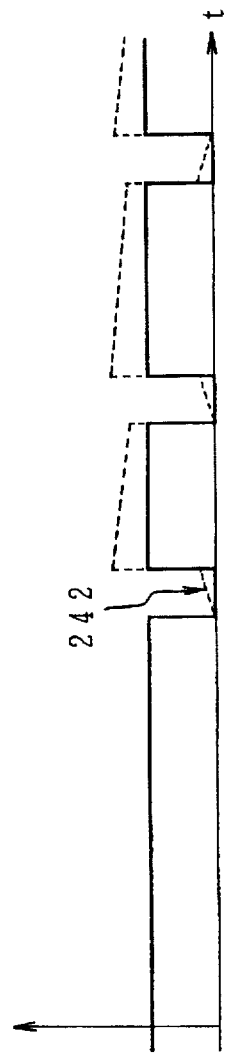

FIGS. 32A to 32C show power drifts occurring by the light emission by the writing power in the PWM recording. With respect to the light emission by the writing power in the PWM recording, as shown in FIG. 32A, a combination of the light emissions of three stages by the erasing power EP, first writing power WP1, and second writing power WP2 and, when the light emitting pulse train of the first time is finished, the light emitting power is set to zero and the operation is shifted to the light emission by the next pulse. In correspondence to the light emitting power in FIG. 32A, a subtraction current shown in FIG. 32B is formed. By subtracting the subtraction current from the photosensitive current i0 of the monitor photodiode 102, the monitor current im corresponding to the reading power P1 is formed. The monitor current im is fed back to the APC 138 in FIG. 4 and the automatic power control to maintain the target reading power is performed. However, since the last light emitting power of the light emitting pulse train of the PWM recording in FIG. 32A is dropped to a zero power 240, the light emitting power is reduced to a value lower than the target reading power in the APC 138. In the portion of the zero power 240, the actual light emitting power lacks as compared with the target reading power of the APC 138. Therefore, in order to supplement the insufficient power, the APC 138 performs a correction by a feedback to increase the power as shown by dotted lines. Thus, the subsequent light emitting pulse train is shifted as shown by broken lines. Namely, since the monitor current im in FIG. 32C fluctuates in such a direction that the power always lacks, a drift such that the light emitting pulse train is shifted in such a direction as to increase the writing power as a whole occurs.

Therefore, in the invention, in order to obtain the same light emitting power in FIG. 33A as that in FIG. 3A, as shown in FIG. 33B, the subtraction current i2 corresponding to the first writing power WP1 in which one power is certainly generated per pulse in the PWM recording is decreased so as to compensate the power lack amount in which the monitor current in FIG. 33C is equal to or less than the target reading power. FIG. 33D shows an area 246 corresponding to a time of a monitor current ia of the first writing power WP1 in which the target reading power RP in the monitor current in FIG. 33C is set to a reference and an area 248 of a time width of a monitor current ib corresponding to the insufficient power which is caused since the light emitting power is set to 0 at the end of the pulse train. A pulse interval Ta of the first writing power WP1 and an interval Tb during which an insufficient power is caused keep a fixed relation Ta:Tb=3:2 because Ta=1.5 clocks and Tb=1 clock when considering the timing of the write clock in FIG. 5C with respect to a light emitting power in FIG. 5H. The first writing power WP1 has a relation such that one power is certainly generated every pulse width data in FIG. 5D like a first writing pulse of FIG. 5F. Therefore, if a time product of the power increasing area 246 and a time product of the power insufficient area 248 when the reading power RP in FIG. 33D is seen as a reference are equalized, the drifts of the writing powers due to the insufficient powers as shown in FIGS. 32A to 32C can be prevented. Namely, it is sufficient to set as follows.

$$(Ta \times ia) = (Tb \times ib)$$

Since Ta is fixedly set to 3 and Tb is fixedly set to 2, the monitor current ia of the power increasing area 246 having the same time product as that of the insufficient area 248 is $$ia = ib \times \tfrac{2}{3}$$

To obtain such a monitor current ia, it is sufficient to set the first writing power subtraction current i2 in the subtraction current of FIG. 33B to (i1−ia) that is smaller than i2 by only ia. Namely, so as to obtain $$(i2 - ia) = i2 - \{ib \times (\tfrac{2}{3})\},$$

at the timing of the first writing power WP1, the value corresponding to it is set into the WP1 subtraction DAC register 130 in FIG. 4, and it is sufficient to set the subtraction current i2 of the subtraction current source 114 for the first writing power to (i2−ia) which is reduced by only ia. In the first writing power light emission coarse adjustment in FIG. 31, in order to maintain a relation as shown in FIG. 33D, the monitor current is adjusted so as to be equal to a value (ia) of the power for setting off by an increase in WP1 subtraction DAC register value z in step S2 after completion of the light emission by 4 mW in step S1, thereby obtaining (x1, z1). Similarly, with respect to the adjustment of the WP1 subtraction DAC register value z in step S4 in a state in which the light emission was performed by 8 mW in step S3, the monitor current is adjusted so as to be equal to the monitor current ia which gives the same power to set off, thereby obtaining (x2, z2). On the basis of (x1, z1) and (x2, z2) in which the subtraction current was adjusted so as to be equal to ia corresponding to the power to set off in step S5, the inclination c2 and intersection d2 with the y axis is calculated from the relational equation of the linear approximation of the WP1 subtraction current DAC register Z in step S6 and registered into the table. By the setting of the WP1 current DAC register value y using the inclination c2 and intersection d2 with the y axis, the compensation of the insufficient power due to a decrease in subtraction current at the timing of the first writing power WP1 in the subtraction current in FIG. 33B is executed. Thus, as shown in FIG. 33C, at the timing of the first writing power WP1, the monitor current ia increases over the target reading power RP and the APC 138 feeds back the current so as to suppress the increased power as shown by a broken line. Therefore, when the light emitting pulse train is finished and the power is set to 0, the APC 138 performs a feedback control in such a direction as to suppress the power. At the zero power, even if the monitor current that is fairly smaller than the target reading power RP is fed back and the power is raised, since the power has already been suppressed at the previous stage, even if the power is increased due to the lack of feedback amount, the insufficient amount at the previous stage is set off. A fluctuation of the writing power in the next light emitting pulse train can be absorbed. Therefore, even if the power is set to 0 at the time point of the end of the pulse train of the PWM recording, the drift in such a direction as to increase the power by the APC 138 doesn't occur and the stable writing operation can be realized.

In FIGS. 33A to 33D, although the case of setting the power to 0 at the end of the power pulse train of the PWM has been shown and described as an example, the power is not always necessary to set to 0 but the invention can be also quite similarly applied to a case of reducing the power to the target reading power RP or less.

Figure 34:
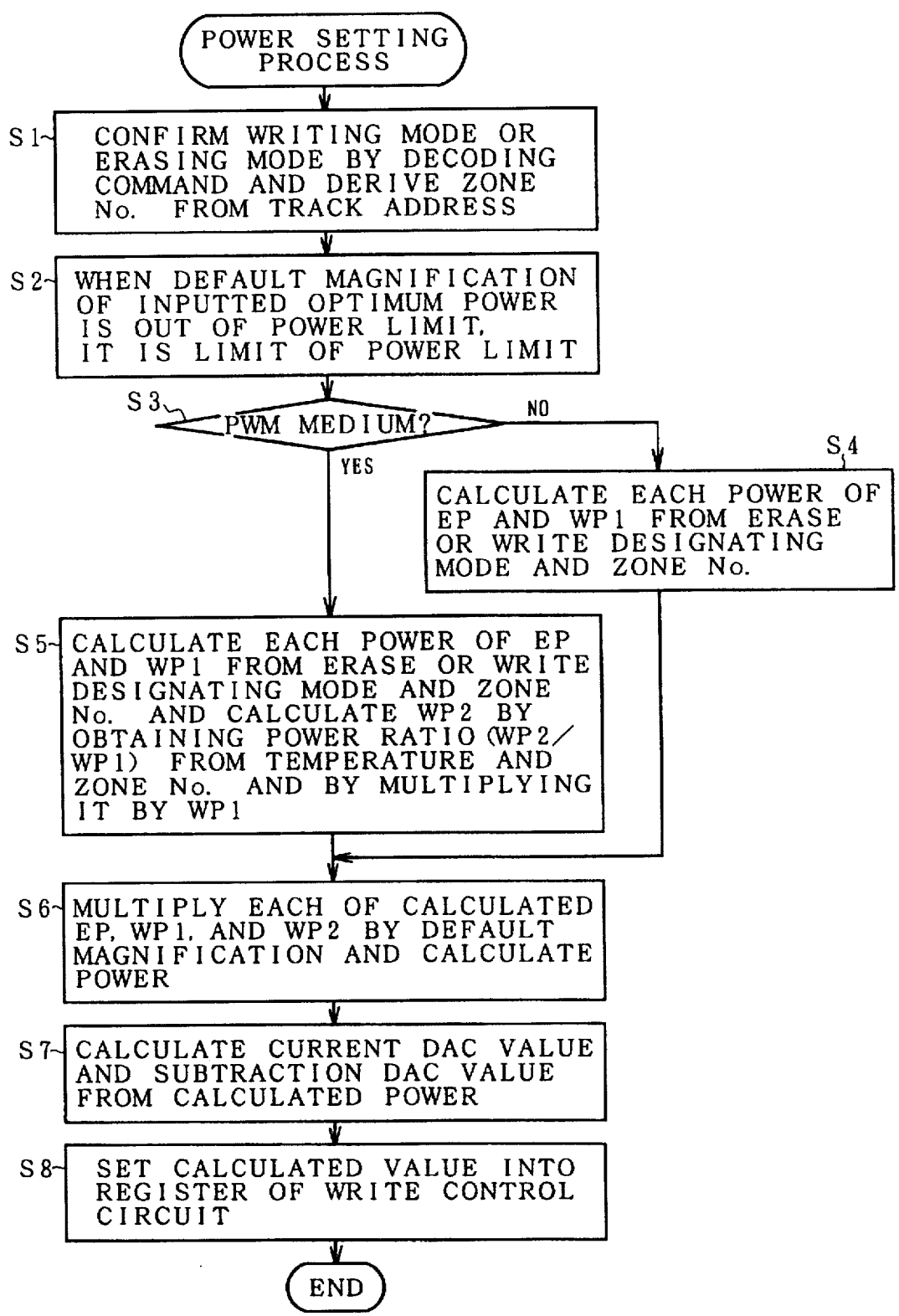
FIG. 34 is a flowchart for a power setting process using a power table after completion of the light emission adjustment.

FIG. 34 is a flowchart for a setting process of the writing power which is executed by the power set processing unit 166 after completion of all of the light emission adjustments by the light emission coarse adjustment processing unit 162 and light emission fine adjustment processing unit 164 in FIG. 7. In the power setting process, first in step S1, whether the operating mode is the writing mode or erasing mode is recognized by decoding a command from an upper apparatus and, further, the zone number is derived from the track address. In step S2, the default magnification of the optimum power given in this instance is read out from the limit power table 206 by using the temperature in the apparatus at that time obtained by reading the register 174 and the zone number obtained in step S1 as indices. If the default magnification of the optimum power is out of the power limit, the power limit is corrected to the limited value. In step S3, a check is made to see if the loaded medium is a PWM recording medium. In case of the PPM recording medium, in step S4, each power of the corresponding erasing power EP and first writing power WP1 is calculated from the designated erasing or writing mode and the zone number with reference to the erasing power table 196 and first writing power table 198. In case of the PWM medium, the processing routine advances to step S5. In a manner similar to the case of the PPM medium, each of the erasing power EP and first writing power WP1 is calculated from the designated erasing or writing mode and the zone number. Further, with respect to the second writing power WP2, the power ratio (WP2/WP1) is obtained from the temperature T in the apparatus and the zone number at that time with reference to the power ratio table 202. By multiplying the first writing power WP1 which has already been calculated to the power ratio obtained, the second writing power WP2 is calculated. When each of the above powers can be calculated, in step S4, the default magnification of the optimum writing power given at that time is multiplied to each of the calculated erasing power EP, first writing power WP1, and second writing power WP2, thereby calculating the power to be set. In step S7, the instruction values of the DAC to instruct the light emission current and optimum current are calculated from the calculated powers. In the calculation of the DAC instruction values, the inclinations and the intersections with the y axis of the relational equations of the linear approximation are read out from the coefficient tables 184 to 194 in FIGS. 7A and 7B and the relational equations are formed. By substituting the powers calculated in step S6 into the relational equations, the current DAC register value and the subtraction DAC register value are calculated. In final step S8, the calculated register values are set into the corresponding register in the laser diode control circuit shown in FIG. 4 and a series of power setting processes are finished.

Figure 35:
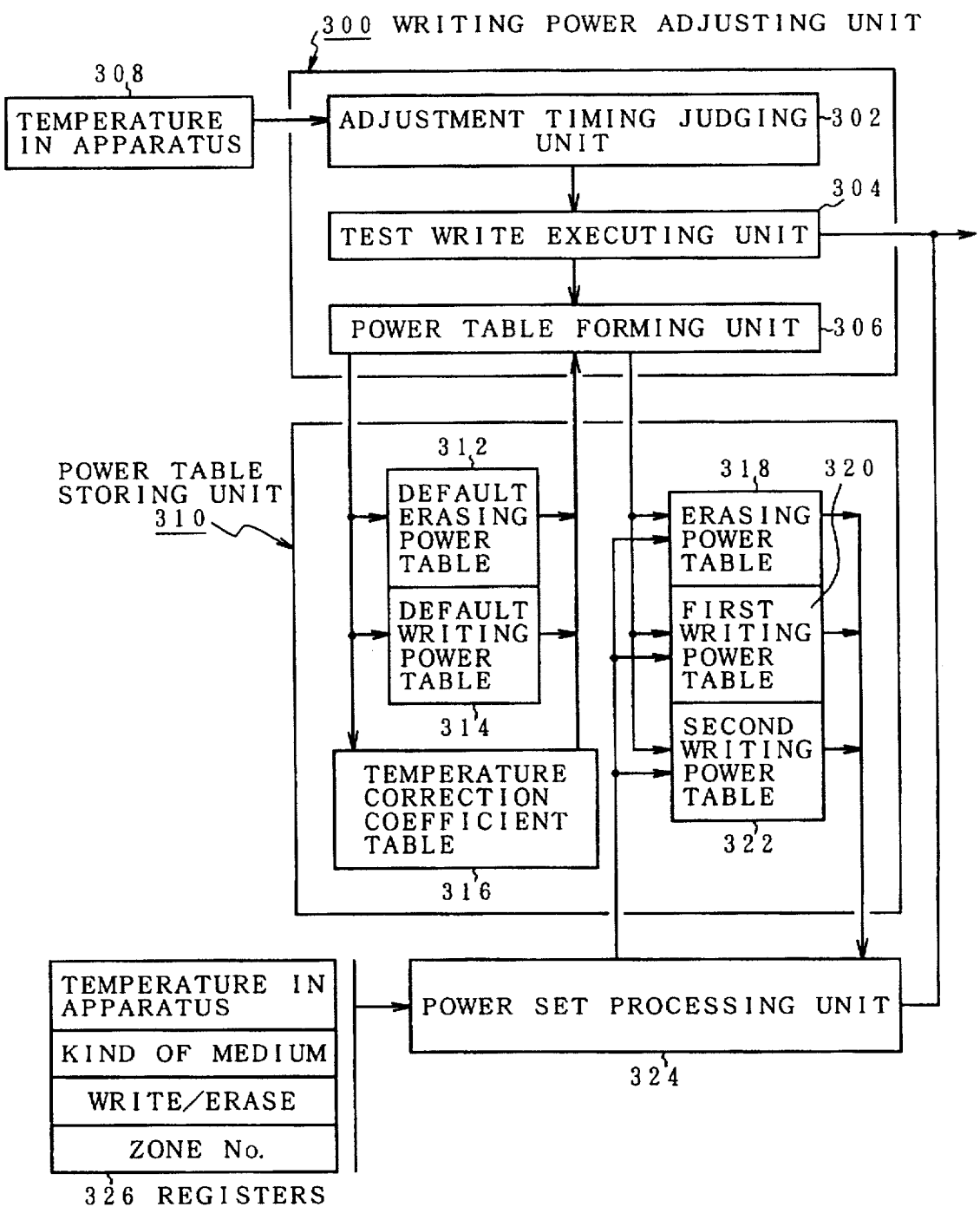
FIG. 35 is a functional block diagram of an optimum writing power adjusting unit which is realized by the MPU in FIG. 2.

[Optimum writing power adjustment]FIG. 35 is a functional block diagram of a writing power adjusting function to set the writing power by the laser diode to the optimum value which is realized by the MPU 14 of the optical disk drive in FIG. 2A. A writing power adjusting unit 300 is constructed by the MPU 14. An adjustment timing judging unit 302, a test write executing unit 304, and a power table forming unit 306 are provided for the writing power adjusting unit 300.

Figure 37:
FIG. 37 is an explanatory diagram of the default writing power table in FIG. 35.

The temperature in the apparatus is inputted to the writing power adjusting unit 300 by a register 308. A power table storing unit 310 is provided for the writing power adjusting unit 300. A default erasing power table 312, a default writing power table 314, and a temperature correction coefficient table 316 are provided in the power table storing unit 310. For example, as a default erasing power table 312, as shown in FIG. 36, default erasing powers (=3.0 to 4.5 mW) have been stored in correspondence to the zone numbers i (=1 to 11). As shown in FIG. 37, in correspondence to the zone numbers i (=1 to 11), default writing powers (=6.0 to 11.0 mW) have been stored in the default writing power table 314. Further, as shown in FIG. 38, in correspondence to the zone numbers i (=1 to 11), temperature correction coefficients Kt (=−0.1 to 0.10) have been stored in the temperature correction coefficient table 316. The temperature correction coefficients Kt in the temperature correction coefficient table 316 in FIG. 38 correspond to values when the temperature T in the apparatus is equal to (T=25° C.). Further, an erasing power table 318, a first writing power table 320, and a second writing power table 322 are provided in the power table storing unit 310. Therefore, the default magnification to give the optimum writing power determined by the writing power adjusting unit 300 is multiplied to the default erasing power table 312 and default writing power table 314 corresponding to the zone numbers, so that each power of an erasing power table 318 and a first writing power table 320 can be calculated and registered. With respect to a second writing power table 322, since a power ratio of the second writing power using the first writing power as a reference has been predetermined, by multiplying the power ratio to the first writing power obtained from the default writing power table 314 in correspondence to the zone number, the second writing power can be obtained. Further, with respect to each of the erasing power and the first and second writing powers, the value which was temperature corrected by using the temperature correction coefficient in the temperature correction coefficient table 316 based on the temperature T in the apparatus at that time is used. The formation of the erasing power table 318, first writing power table 320, and second writing power table 322 using the default values of the optimum writing power decided by the writing power adjusting unit 300 as mentioned above is executed by the power table forming unit 306. A power set processing unit 324 is provided for the power table storing unit 310. The power set processing unit 324 is accessed from the upper apparatus after completion of the adjustment of the optimum writing power and sets the power by the light emission control of the laser diode on the basis of the temperature in the apparatus, medium kind, writing or erasing accessing mode, and further, zone number indicative of the accessing track shown in a group of registers 326. When the power is set, the power set processing unit 324 refers to the erasing power table 318, first writing power table 320, second writing power table 322, and temperature correction coefficient table 316 in the power table storing unit 310 on the basis of the temperature in the apparatus, medium kind, writing or erasing accessing mode, and further, zone number, calculates a current instruction value for each register of the laser diode control circuit 24 shown in FIG. 4 on the basis of the data searched from the tables, and generates the calculated current instruction values. The Adjustment timing judging unit 302 provided for the writing power adjusting unit 300 determines the writing power adjustment timing by the test write executing unit 304 and activates. Just after the medium was loaded into the optical disk drive, the adjustment timing judging unit 302 doesn't activate the adjusting process of the optimum writing power. When the first write command is generated from the upper apparatus after completion of the initializing process of the optical disk drive, the adjustment timing judging unit 302 discriminates the write command, thereby allowing the test write executing unit 304 to execute a test write for execution by the optimum writing power. After the writing power adjusting process by the test write executing unit 304 was once finished, a valid time of the writing power adjustment result is calculated. When the elapsed time from the end of the adjustment reaches the calculated valid time, a process of the test write executing unit 304 for the next writing power adjustment is activated. For a period of time during which the elapsed time reaches the valid time, when the temperature T in the apparatus which is inputted from the register 308 exceeds, for example, ±3° C., the writing power adjustment by the activation of the test write executing unit 304 is forcedly performed. The test write executing unit 304 repeats processes such that an arbitrary test area in a non-user area of the loaded medium is designated and, after a predetermined test pattern was written to the medium while gradually reducing the writing power step by step, the test pattern is read out and compared with the original test pattern, thereby counting the number of times of dissidence of data. In the above test writing process, the writing power when the counted number of times of dissidence exceeds a predetermined maximum number, for example, 1000 is detected as a limit writing power. As mentioned above, when the limit writing power is detected while reducing the writing power step by step, the value obtained by adding a predetermined offset to the limit writing power is determined as an optimum writing power. The setting of the writing power in the test write executing unit 304 is executed by using the default magnification using the writing power default value at that time as a reference. Therefore, the limit writing power is also detected as a default magnification indicative of the limit writing power. A value obtained by adding a predetermined offset ratio to the default magnification is determined as a default ratio of the optimum writing power.

Figure 39:
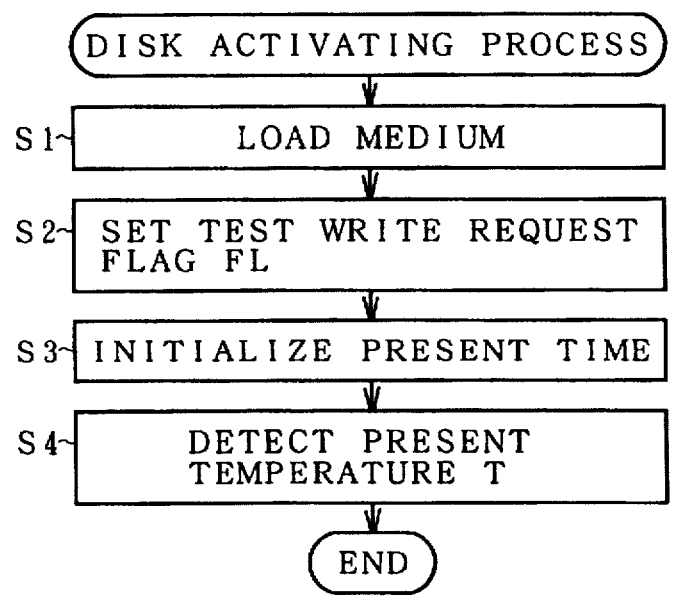
FIG. 39 is a flowchart for a disk activating process prior to the optimum writing power adjustment in FIG. 35.

The details of an adjusting process to decide the optimum writing power by the writing power adjusting unit 300 in FIG. 35 will now be described with reference to a flowchart. FIG. 39 is a flowchart for a disk activating process when the medium is loaded into the optical disk drive of the invention. As a medium which is used as an optical disk drive according to the invention, there are four kinds of media comprising media of 128 MB and 230 MB as PPM recording media and media of 540 MB and 640 MB as PWM recording media. In FIG. 39, the medium is loaded in step S1 and set to the spindle motor 40 as shown in FIG. 3 and is rotated at a constant velocity. In step S2, a test write request flag FL is set. Further, in step S3, the present time is initialized. In step S4, the present temperature T in the apparatus is detected and the processes necessary for adjustment of the writing power upon activation are finished. In the disk activating process, as processes other than the preparing process to decide the optimum writing power, a formation of each coefficient table of the DACs for the current instruction provided for the laser diode control circuit by the function of the LD light emission processing unit 160 shown in FIGS. 7A and 7B and a formation of a power table to store the default values of the light emitting power are executed. Thus, the default erasing power table 312, default writing power table 314, and temperature correction coefficient table 316 shown in FIGS. 36, 37, and 38 are prepared.

Figure 40:
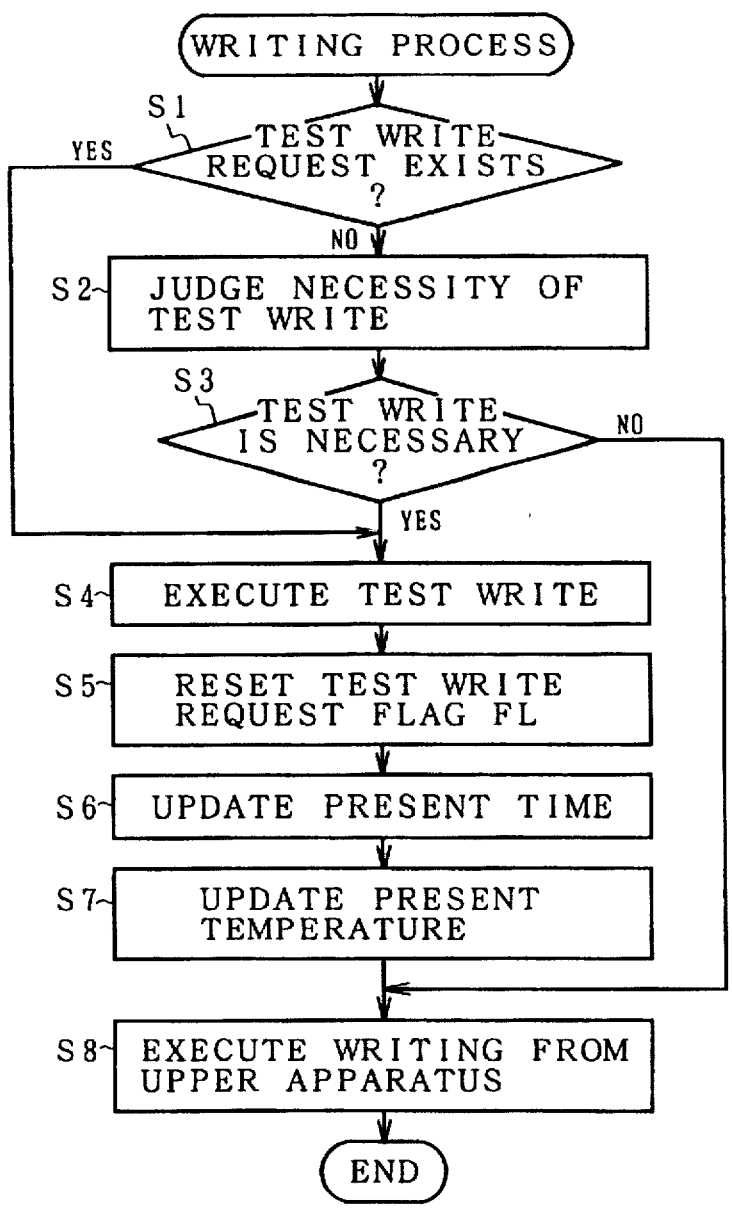
FIG. 40 is a flowchart for a writing process including the optimum writing power adjustment in FIG. 35.
Figure 41A:
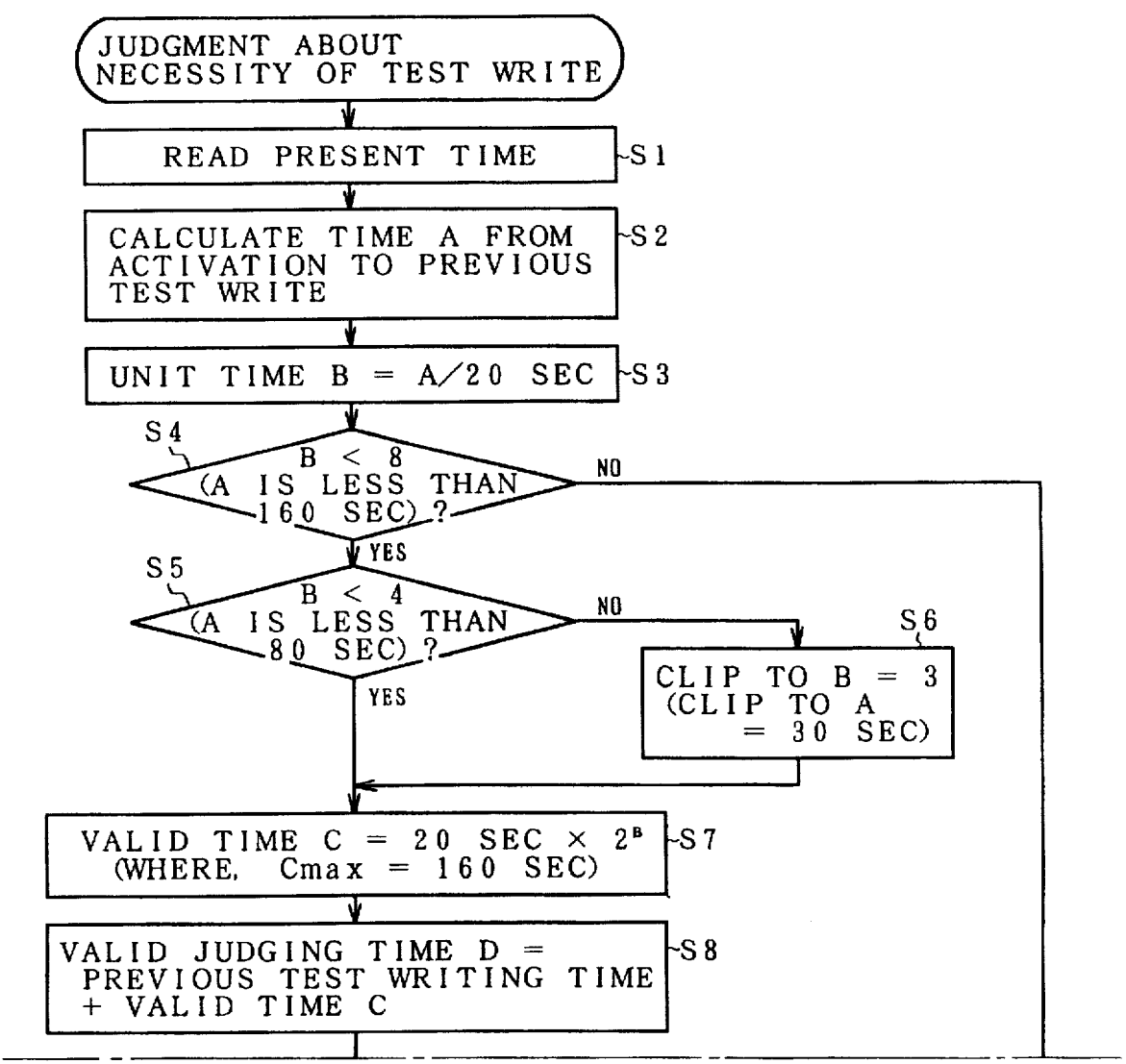
FIGS. 41A and 41B are flowcharts for a judgment about the necessity of a test write in FIG. 40.
Figure 41B:
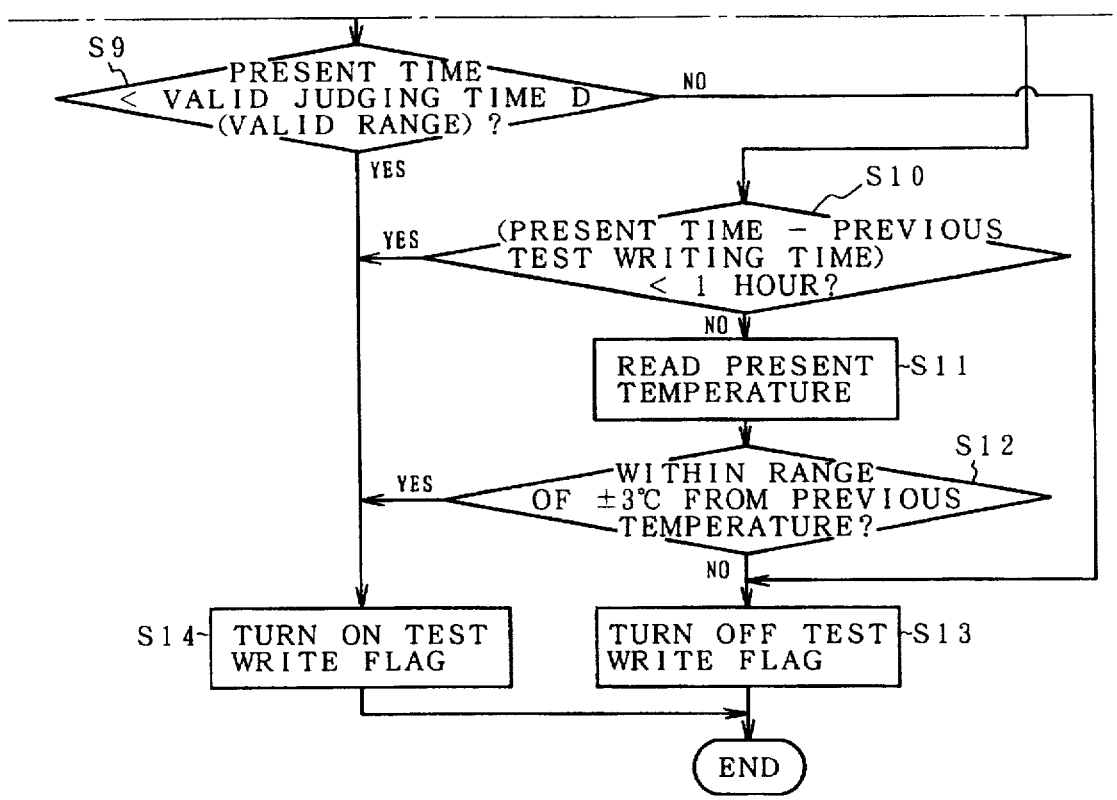

FIG. 40 is a generic flowchart for a writing process after the optical disk drive was activated. In the writing process, the presence or absence of a test write request from the upper apparatus is discriminated in step S1. If there is a test write request, step S4 follows and the test write is executed. In the ordinary state, since there is no test write request from the upper apparatus, the processing routine advances to step S2 and the necessity about the test write is discriminated. The discrimination about the necessity of the test write is performed by the adjustment timing judging unit 302 in FIG. 35. When the necessity of the test write is determined in step S3, step S4 follows, the test write executing unit 304 executes the test write and decides the optimum writing power. When the optimum writing power is determined, the test write request flag FL is reset in step S5. In step S6, the present time is updated and the time when the optimum writing power is decided by the execution of the test write is held. In step S7, the present temperature is updated and the temperature in the apparatus when the optimum writing power is decided by the execution of the test write is likewise held. In step S8, when a write access is requested from the upper apparatus in this instance, the writing operation from the upper apparatus is executed. FIGS. 41A and 41B are flowcharts for a process to discriminate the necessity about the test write in step S3 in FIG. 40. In the process to discriminate the necessity of the test write, first in step S1, the present time is read. In step S2, a time A from the activation of the optical disk drive to the previous test write is calculated. In step S3, by dividing the time A from the activation by a predetermined time, for example, 20 seconds, the time A is converted into unit times B. In step S4, a check is made to see if the number of unit times B is less than 8, namely, whether the time A from the activation to the first test write is less than 160 seconds or not. When the time A is less than 160 seconds, step S5 follows and a check is made to see if the number of unit times B is less than 4, namely, whether the time A is less than 80 seconds or not. When the time A lies within a range from 80 to 160 seconds, the number of unit times B is clipped to 3, namely, the time A is clipped to 30 seconds in step S6 and the processing routine advances to step S7. When the time A is less than 80 seconds in step S5, the processing routine advances to step S7 as it is. In step S7, a valid time C during which the use of the optimum writing power decided by the previous test write is guaranteed is calculated. In this case, the valid time C is set to [20 seconds×$2^B$ (the number of unit times)]. The maximum value of the valid time is limited to 160 seconds. Thus, the valid time C during which the optimum writing power decided by the test write is guaranteed is set to a time corresponding to $2^B$ so long as the time A from the activation to the test write is less than 160 seconds. When the time A exceeds 160 seconds, the valid time C is fixed to a predetermined time (C=160 seconds). When such a valid time C is calculated, it is varied in accordance with a time that is required until the temperature of the medium loaded in the optical disk drive is settled to the temperature in the apparatus. Namely, at the time of the initialization just after the medium was loaded, since there is a difference between the medium temperature and the temperature in the apparatus, the adjustment of the optimum writing power based on the temperature in the apparatus cannot be effectively performed at this stage. Therefore, the adjustment of the writing power is not executed upon activation. When a time of about one to two minutes elapses, the temperature of the loaded medium is balanced to the temperature in the apparatus. Therefore, the first writing power adjustment is performed synchronously with the timing when the write command is generated from the upper apparatus for the first time after the optical disk drive was activated. After the activation, since the timing when the write command is generated from the upper apparatus is various, in steps S1 to S7 in FIG. 41A, the time A from the activation to the first test write is obtained and the valid time C to discriminate the next and subsequent test write timings is decided from the time A. When the valid time C can be calculated in step S7, a valid judging time D is calculated as a time obtained by adding the calculated valid time C to the time of the previous test write in step S8. In step S9 in FIG. 41B, a check is made to see if the present time exceeds the valid judging time D. When the present time exceeds the valid judging time D, step S14 follows and a test write flag is turned on. The processing routine advances to the execution of the next test write. When the present time doesn't reach the valid judging time D in step S9, the test write flag is turned off in step S17. When the unit time B is equal to or larger than 8, namely, when the valid time is equal to or longer than 160 seconds in step S4, step S10 follows and a check is made to see if the time obtained by subtracting the previous test write time from the present time is less than one hour. If YES, the present temperature is read in step S11. In step S12, a check is made to see if the present temperature lies within a range of ±3° C. for the previous temperature. If YES, in step S13, the test write flag is turned off and the test write is not performed. When there is a temperature fluctuation exceeding the range of ±3° C. for the previous temperature, the test write flag is turned on and the test write is executed in step S14. When the difference between the present time and the previous test write time is equal to or longer than one hour in step S10, the test write flag is forcedly turned on in step S14 and the test write is executed. Each threshold time settled in the judging process about the necessity of the test write can be properly decided as necessary.

Figure 42B:
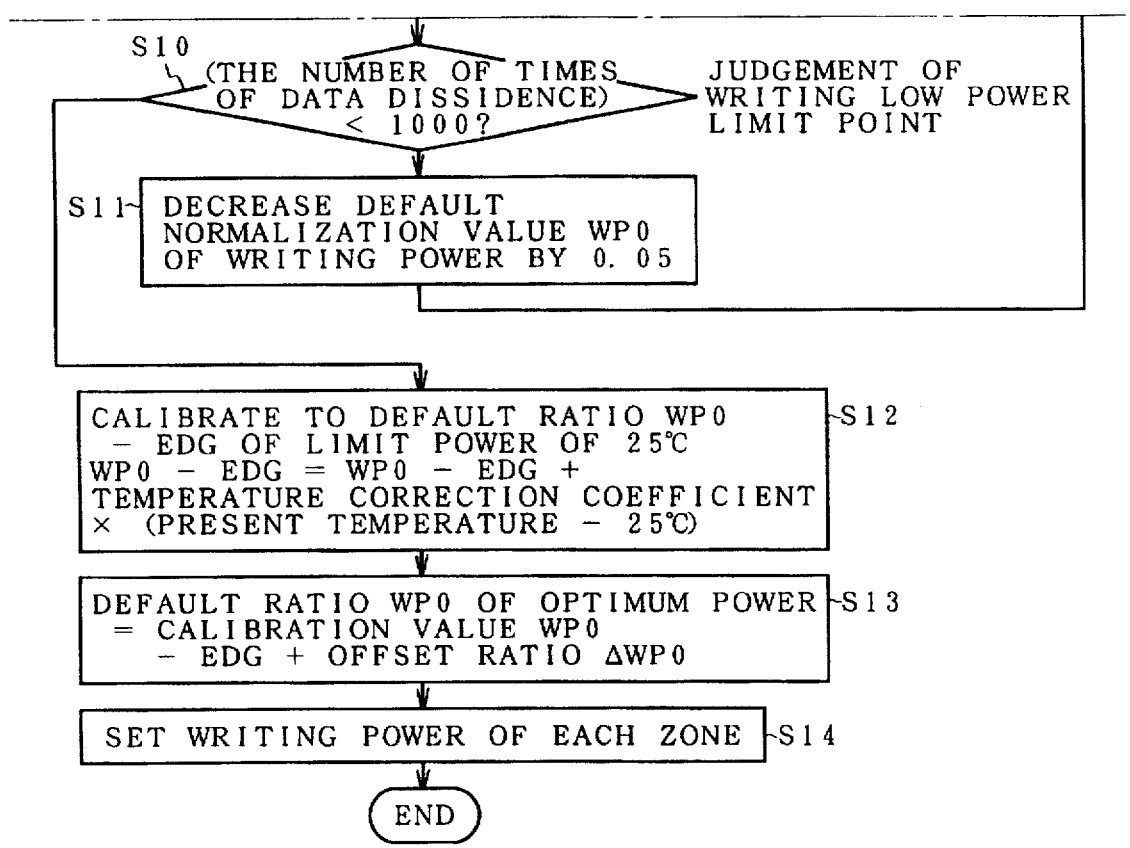

FIGS. 42A and 42B show a flowchart for a test write executing process which is executed in step S4 in FIG. 40A and this process is executed by the test write executing unit 304 in FIG. 35. First in step S1, the temperature T in the apparatus is measured. In step S2, test patterns of hexadecimal notation of write patterns "596595" and "FEDC, . . . 3210" are formed in the buffer memory 20 provided for the controller 10 in FIG. 2. The test pattern "596595" is a worst pattern in which it is presumed that the error occurrence is largest. "FEDC, . . . 3210" is a whole pattern of each word of the hexadecimal notation. In step S3, a test write execution sector is formed. As will be obviously explained hereinlater, as for the test write execution sector, a test area decided in the non-user area of the medium is designated and a sector address is generated. In step S4, the default ratio WPO of the start writing power WP is calculated from the temperature in the apparatus. In step S5, the writing power WP is calculated by multiplying a default writing power DWP at that time to the default writing power ratio WPO. In step S6, the erasing power EP is calculated by using the default ratio WPO. When calculating the default erasing power EP, a default ratio of the erasing power of a value obtained in a manner such that a value in which a coefficient 0.7 is multiplied to a value obtained by subtracting 1.0 from the default ratio WPO of the writing power is added to 1 is used, and such a default ratio is multiplied to a default erasing power DEP, thereby calculating the erasing power EP. Namely, a fluctuation ratio of the erasing power is suppressed as compared with the writing power. In step S7, by using the calculated writing power WP and erasing power EP, the two kinds of write patterns formed in the buffer memory in step S2 are written into the test area of the medium. In this instance, when the medium is a medium of 128 MB or 230 MB, the PPM recording is executed. When the medium is a medium of 540 MB or 640 MB, the PWM recording is executed. After completion of the data writing operation, the data reading operation of the test pattern is executed in step S8. In step S9, the read pattern is compared with the original write pattern in the buffer memory and the number of times of dissidence of data is counted on a word unit basis. In step S10, when the number of times of dissidence of data is less than 1000, this means that the power doesn't reach the writing power lower limit point, the processing routine advances to step S11. The default ratio WPO of the writing power is reduced by a predetermined value 0.05. The processing routine is again returned to step S5 and the test write using the default ratio WPO which was reduced by only 0.05 is executed. The data writing operation is repeated while reducing the default ratio WPO of the writing power as mentioned above. When the number of times of dissidence of data is equal to or larger than 1000 in step S10, it is judged that the power has reached the writing power lower limit point. In step S12, the default ratio is calibrated to a default ratio (WPO-EDG) of the limit power at 25° C. Namely, a value obtained by multiplying the temperature correction coefficient to a value in which 25° C. is subtracted from the present temperature is added to the writing power lower limit point WPO-EDG decided in step S10, thereby calibrating. In step S13, a predetermined offset ratio ΔWPO is added to the temperature calibration value, thereby calculating the default ratio WPO of the optimum power. In step S14, the writing power of each zone on the basis of the default ratio WPO of the optimum writing power determined is set.

Figure 43:
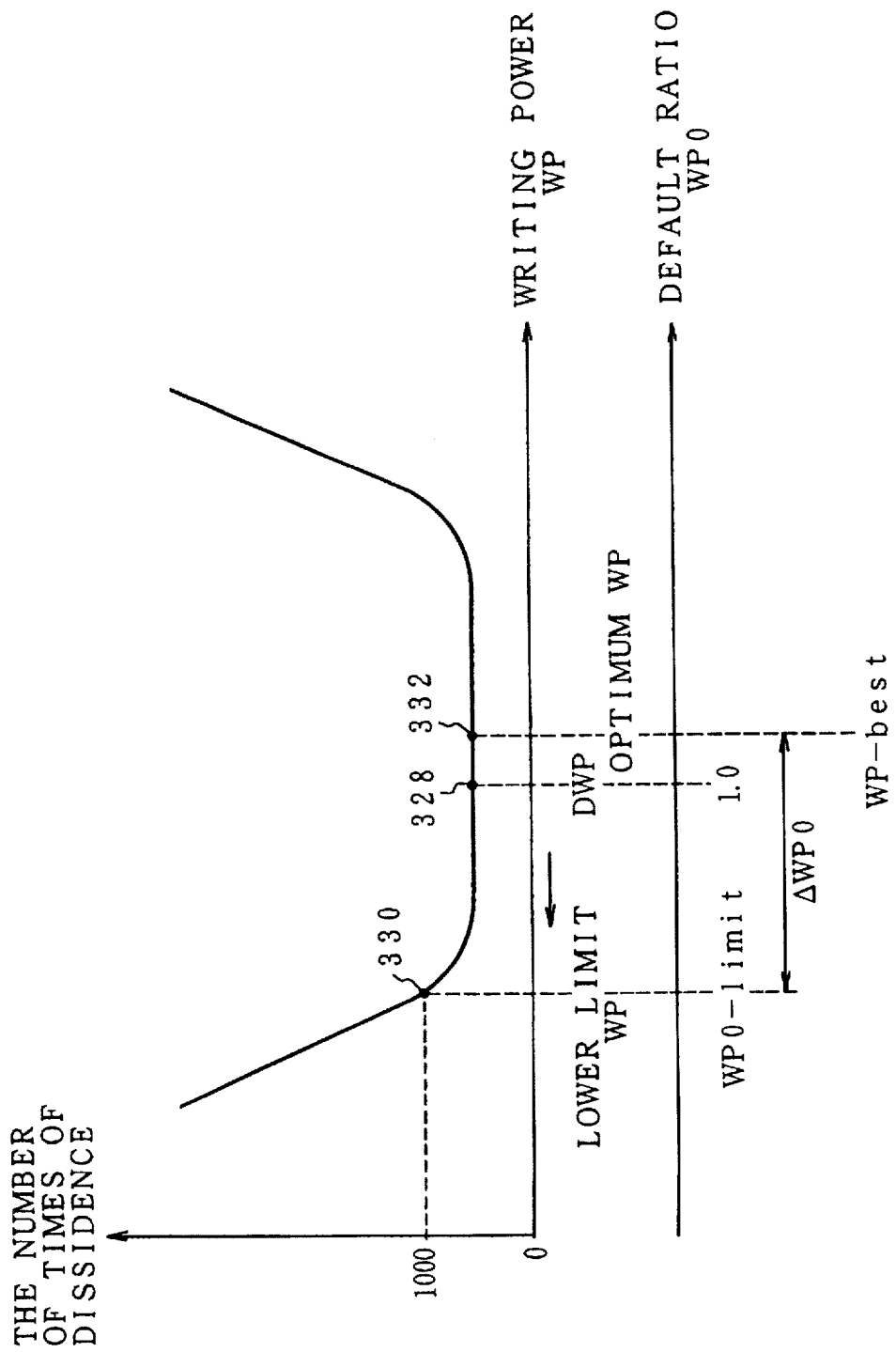
FIG. 43 is an explanatory diagram of the detection of a limit power and the setting of an optimum power in the test write in FIG. 42.

FIG. 43 shows a test write in which the testing power in the execution of the test write in FIGS. 42A and 42B is reduced step by step. First, the test write is started by the setting of the default writing power DWP at a start point 328. The number of times of dissidence is obtained by performing the test write while decreasing from the start default ratio of 1.0 by 0.05 at a time. When the writing power WP approaches the lower limit writing power WP, the number of times of dissidence increases. When the number of times of dissidence reaches a predetermined threshold value, for example, 1000, it is detected as a limit point 330. By adding the predetermined offset ratio ΔWPO to a default ratio WPO-limit corresponding to the lower limit writing power WP at the limit point 330 in this instance, a default ratio WP-best which gives the optimum writing power WP is decided.

Figure 44:
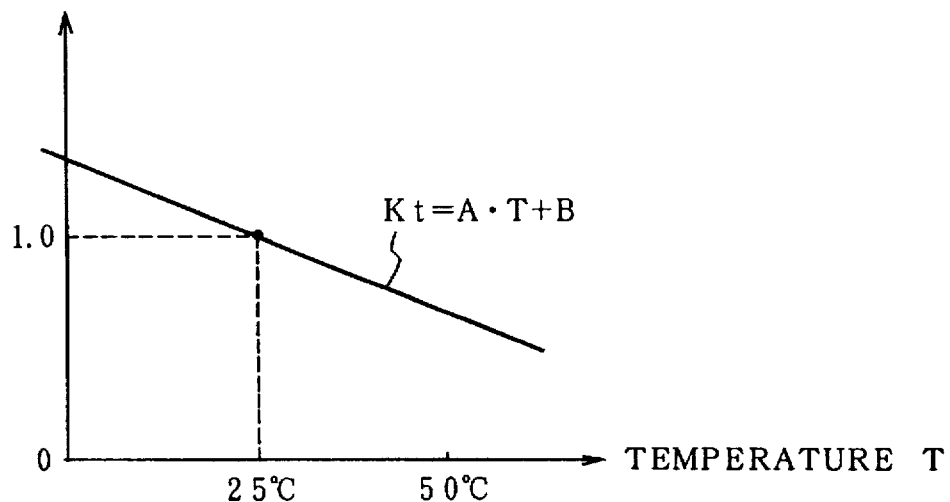
FIG. 44 is an explanatory diagram of a temperature correction coefficient to correct a temperature of an offset ratio to obtain an optimum power by adding to the limit power in FIG. 42.

FIG. 44 is a graph showing characteristics of the temperature correction coefficient Kt to the temperature T of the offset ratio ΔWPO which is added to the default ratio of the limit power in step S13 in FIG. 42B. The temperature correction coefficient Kt to correct the offset ratio ΔWPO for the temperature T is determined by an inclination A and an intersection B with the y axis as coefficients of a relational equation (Kt=A·T+B) of the linear approximation in which the correction coefficient Kt at the temperature T (=25° C.) is set to (Kt=1.0). Therefore, by substituting the temperature T in the apparatus at that time into the relational equation, the value of the corresponding temperature coefficient Kt is obtained. By multiplying the default offset ratio ΔWPO obtained at the temperature T (=25° C.) to the value of Kt, the offset ratio ΔWPO which is used for calculation of the optimum writing power can be obtained.

Figure 45:
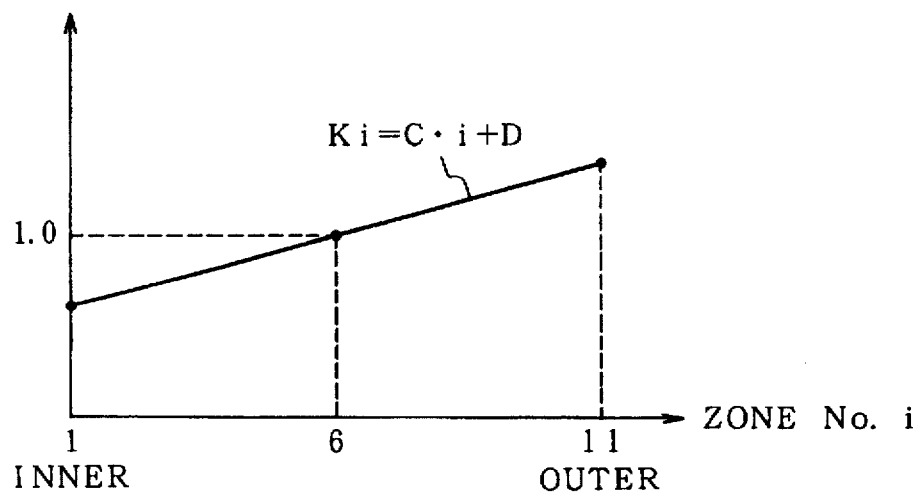
FIG. 45 is an explanatory diagram of a correction coefficient for a zone position of the offset ratio to obtain an optimum power by adding the limit power in FIG. 42.

FIG. 45 shows a relational equation of the linear approximation of a zone correction coefficient Ki for the zone number of the offset ratio ΔWPO which is used in step S13 in FIG. 42B. This relational equation is determined by (Ki=C·i+D) and an inclination C and an intersection D with the y axis are prepared as coefficients of the relational equation. Since the zone correction coefficient Ki is set to 1.0 at the center zone number i=6, the default offset ratio ΔWPO at the zone number 6 is prepared. Therefore, the zone correction coefficient Ki is obtained from the relational equation (Ki=C·i+D) for an arbitrary zone number i and is multiplied to the default offset ratio ΔWPO of the zone number i, so that the offset ratio ΔWPO which is used for calculation of the optimum writing power in step S13 can be obtained.

Figure 46A:
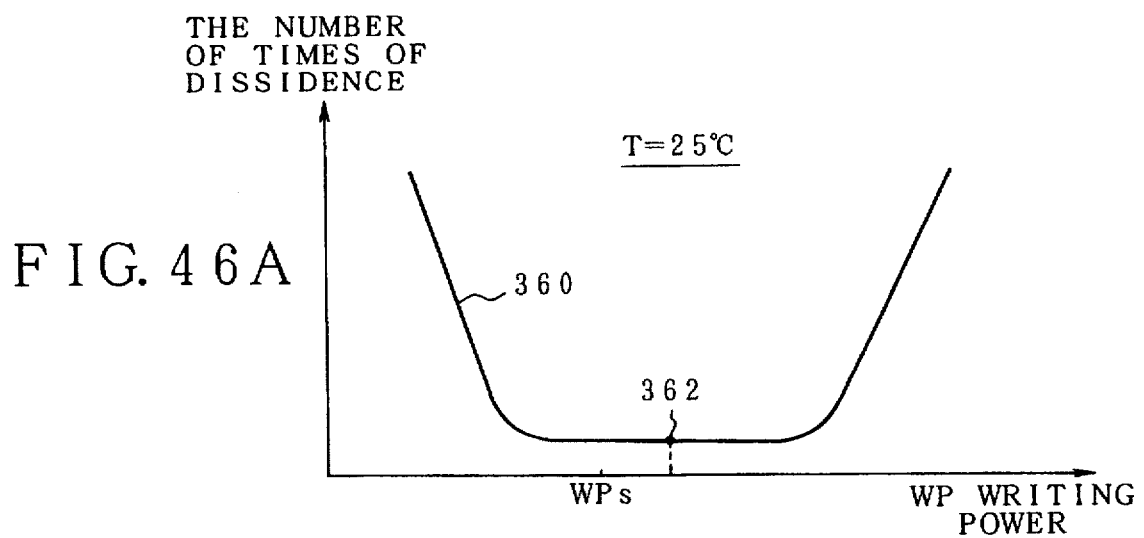
FIGS. 46A to 46C are explanatory diagrams showing a shift of an optimum writing power by the temperature.
Figure 46B:
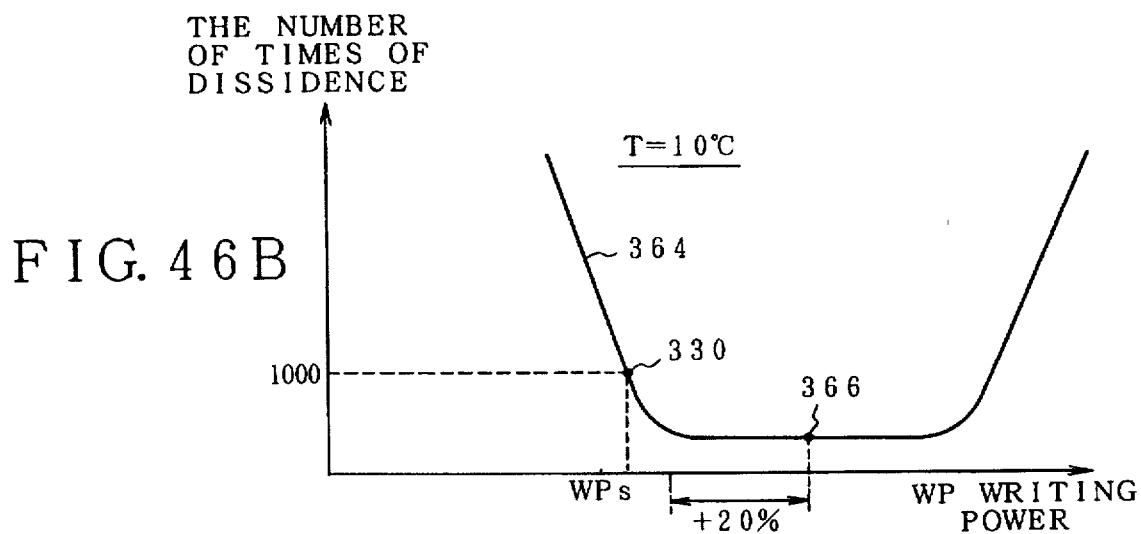
Figure 46C:
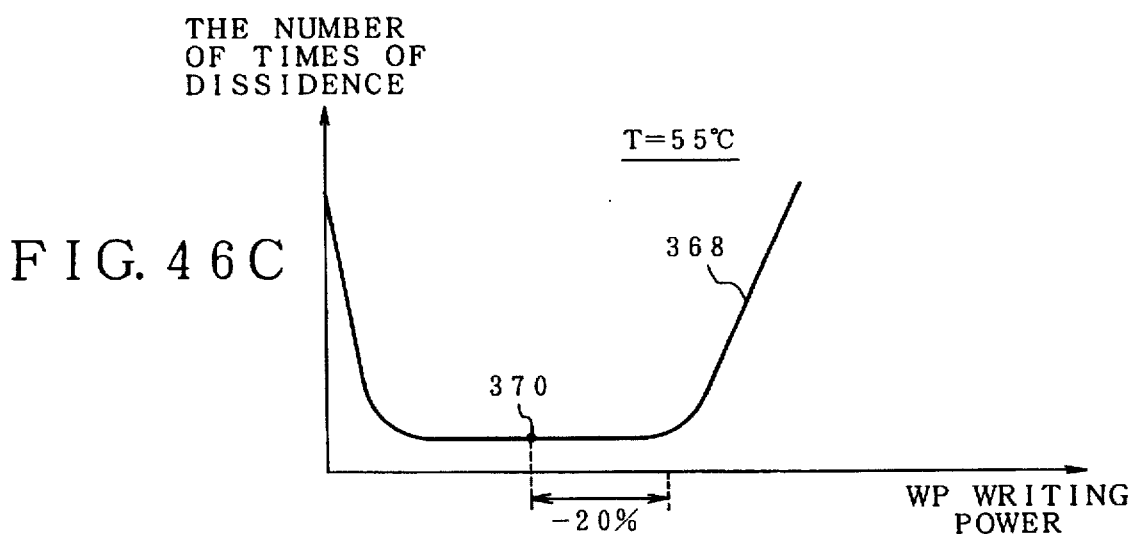

FIGS. 46A to 46C are graphs showing characteristics of the number of times of dissidence for the writing power WPO corresponding to the temperature in the apparatus in the test write in FIGS. 42A and 42B. FIG. 46A relates to the case where the temperature in the apparatus is equal to 25° C. FIG. 46B relates to the case where the temperature is reduced to T=10° C. FIG. 46C relates to the case where the temperature is increased to T=55° C. For T =25° C. in FIG. 46A, when the temperature in the apparatus decreases, as shown at T=10° C. in FIG. 46B, a characteristics curve 360 of the number of times of dissidence to the writing power is shifted to characteristics 364 in such a direction as to increase the writing power due to a decrease in temperature. On the contrary, when the temperature is increased to T=55° C. as shown in FIG. 46C, the curve 360 is shifted to characteristics 368 in such a direction as to reduce the writing power. Therefore, an optimum writing power point changes as shown at 362, 366, 370 in accordance with the temperature. For the characteristics between the writing power and the number of times of dissidence depending on the temperature in the apparatus as mentioned above, for instance, it is assumed that the starting power of the test write is fixed to a starting power WPs on the low power side at T=25° C. In this state, when the temperature decreases to T=10° C. as shown in FIG. 46B, the writing power lower than the writing power at the limit point 330 exceeding the number of times of dissidence of 1000 is set to the starting power. Therefore, in the execution of the test write in FIGS. 42A and 42B, if the number of times of dissidence of data exceeds the threshold value 1000 at the limit point on the low power side in the first test write, a process to increase the default ratio ΔWPO of the writing power in step S11 by only a predetermined ratio is executed. Thus, even if the temperature dropped, by shifting the starting power to the power side higher than that at the limit point 330, the normal test write can be performed. It will be obviously understood that when a predetermined default value is set to the start writing power, by performing the temperature correction based on the temperature T in the apparatus, an optimum starting power of the test write can be also set in accordance with the shift of the characteristics corresponding to the temperature as shown in FIGS. 46A to 46C. Even by such a method, if the starting power of the test power is lower than the limit point on the low power side, it is sufficient to add an offset ratio so as to increase the starting power by a similar process.

Figure 47:
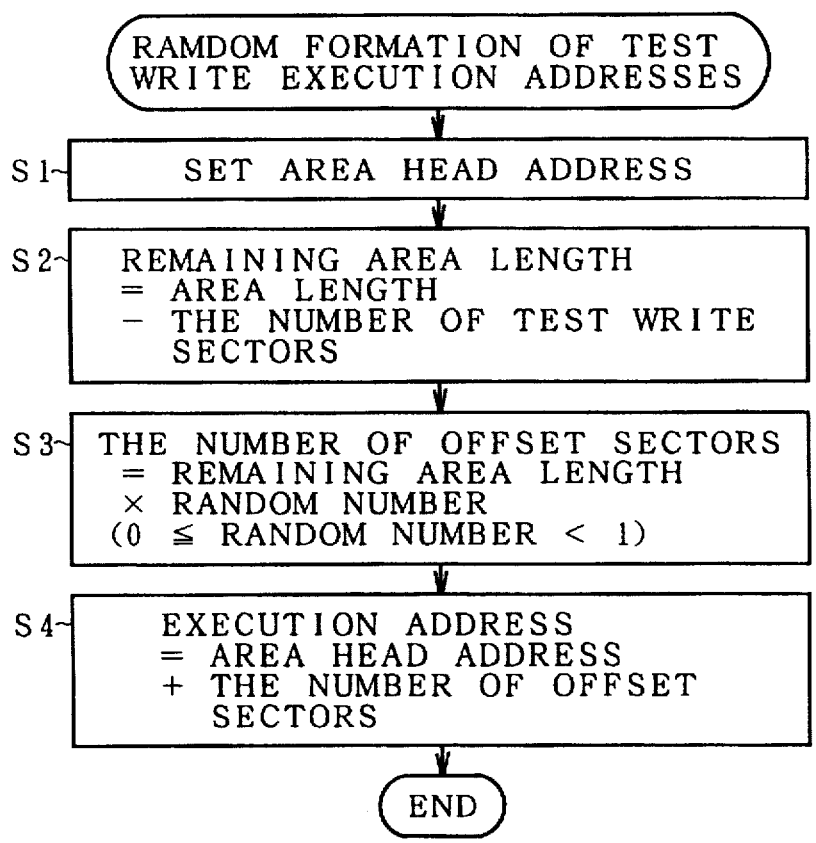
FIG. 47 is a flowchart for forming write addresses of the test write in FIG. 42 at random.
Figure 48:
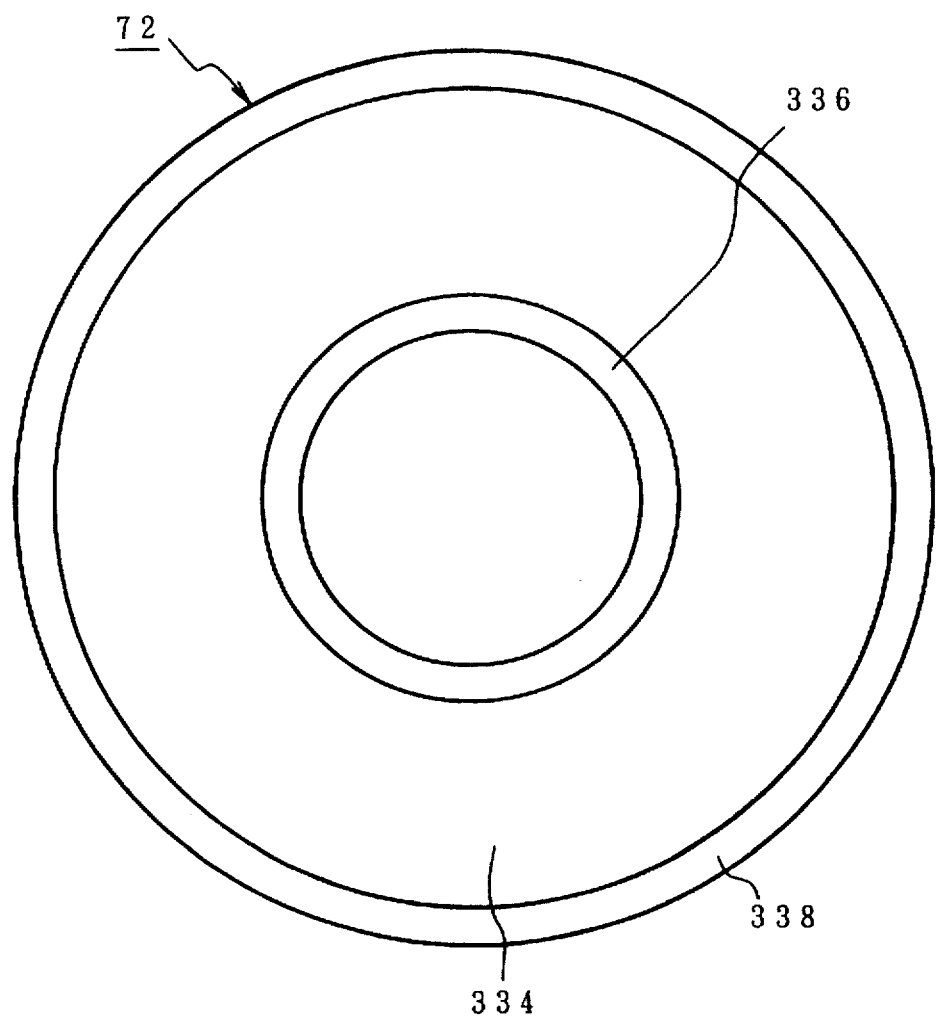
FIG. 48 is an area explanatory diagram of a medium.
Figure 49:
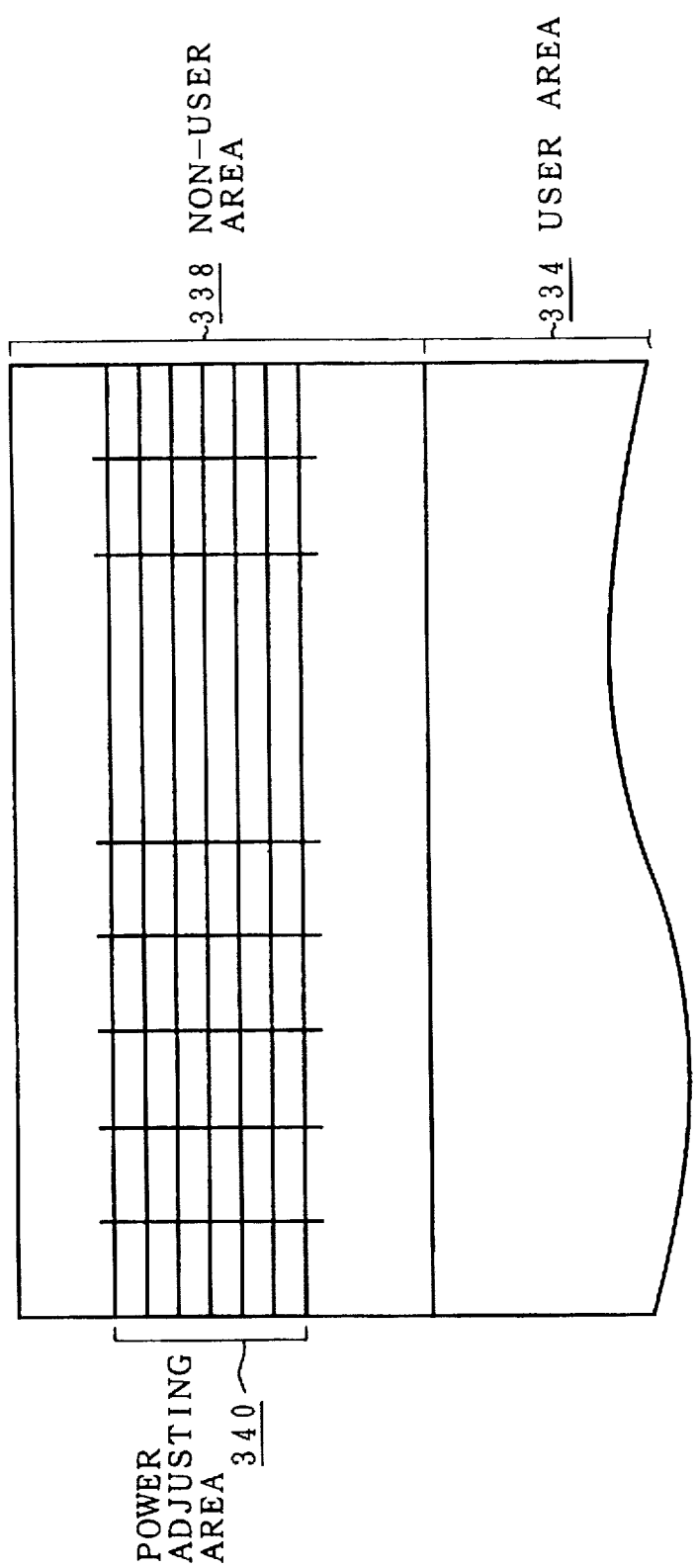
FIG. 49 is an explanatory diagram of a power adjusting area allocated to a non-user area in FIG. 48.
Figure 50:
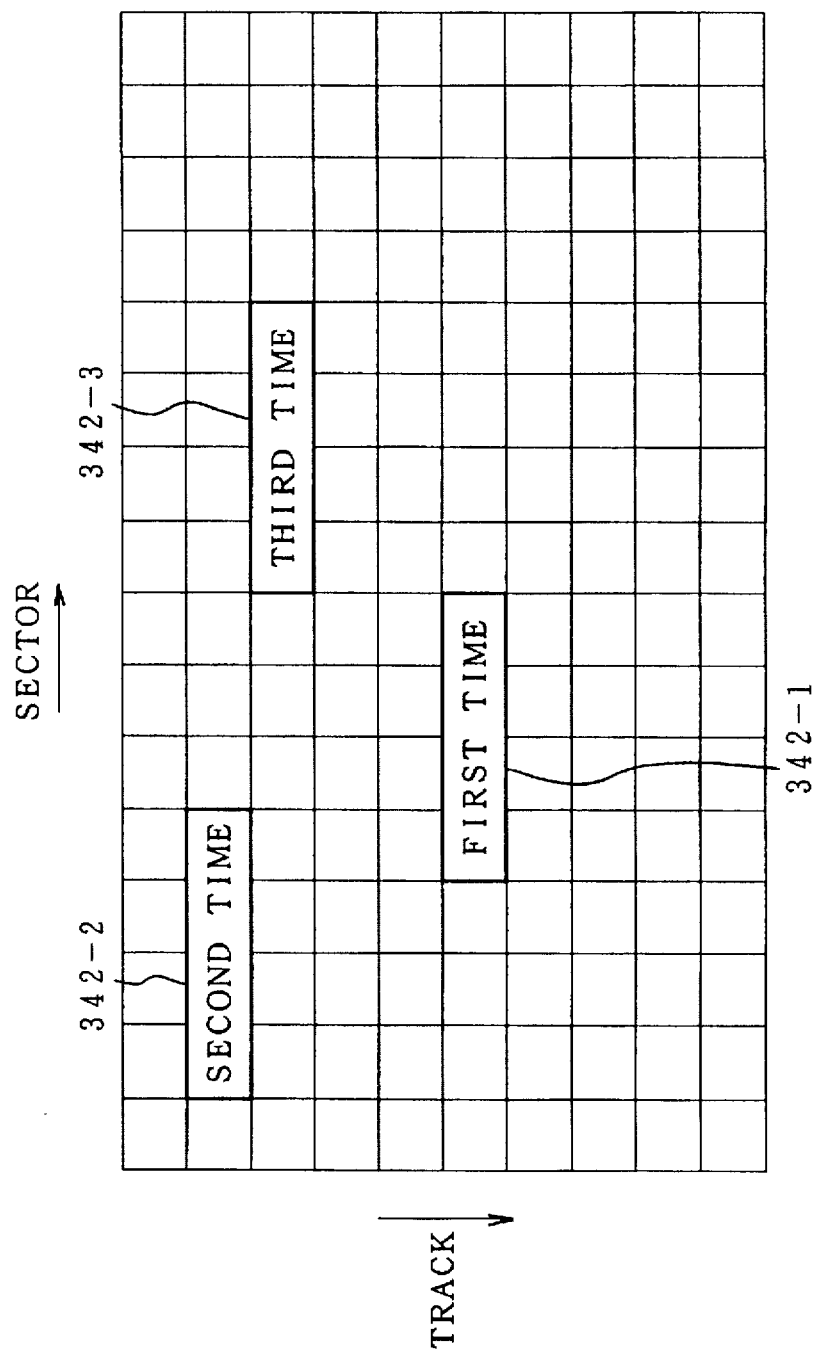
FIG. 50 is an explanatory diagram of the test write by the random addresses in FIG. 47.

FIG. 47 is a flowchart for formation of an address of the test write execution sector which is executed in step S3 of the test write execution in FIGS. 42A and 42B. The formation of the test write execution address relates to an example of the generation of random sector addresses. First in step S1, an area head address of the medium is set. In the test write of the invention, a non-user area 336 on the inside or a non-user area 338 on the outside for a user area 334 of the medium 72 in FIG. 48 is allocated to a power adjusting area. FIG. 49 shows the non-user area 338 on the outside in FIG. 48 and a power adjusting area 340 is set with respect to a predetermined track range in the non-user area 338. Therefore, in step S1, an area head address, namely, a track address of an arbitrary test write in the power adjusting area 340 and a sector number are set. In step S2, the number of sectors in which the test write has already been finished is subtracted from an area length of one track, thereby obtaining a remaining area length. This is because the test write is not continuously performed with respect to the sectors in which the test write was once performed. In step S3, the number of offset sectors is obtained by multiplying a random number to the remaining area length. As a random number, an arbitrary value in a range from 0 to 1 is generated in accordance with a predetermined random number routine. When the number of offset sectors is obtained as mentioned above, in step S4, an execution address is obtained by adding the number of offset sectors to the area head address. FIG. 50 shows a test write by the formation of the random test write addresses in FIG. 47. Test writes 342-1, 342-2, and 342-3 of three times are executed at random by using four sectors as one unit.

Figure 51:
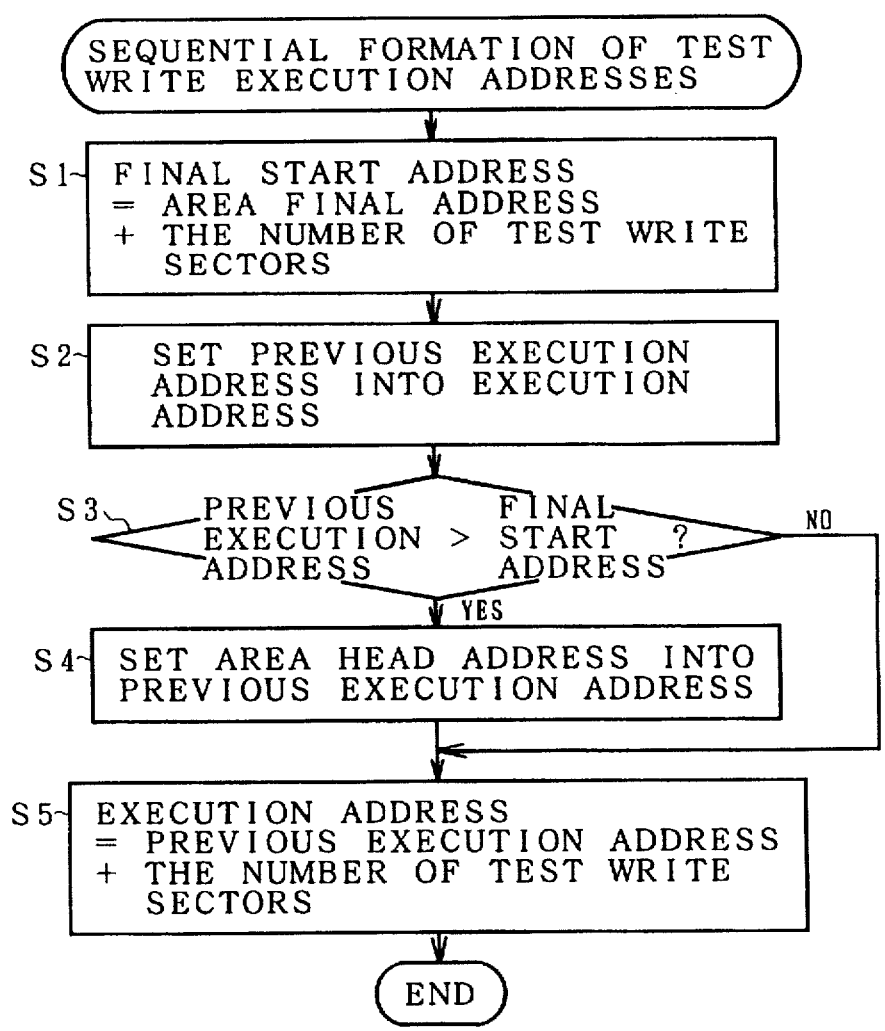
FIG. 51 is a flowchart for sequentially forming write addresses in the test write in FIG. 42.
Figure 52:
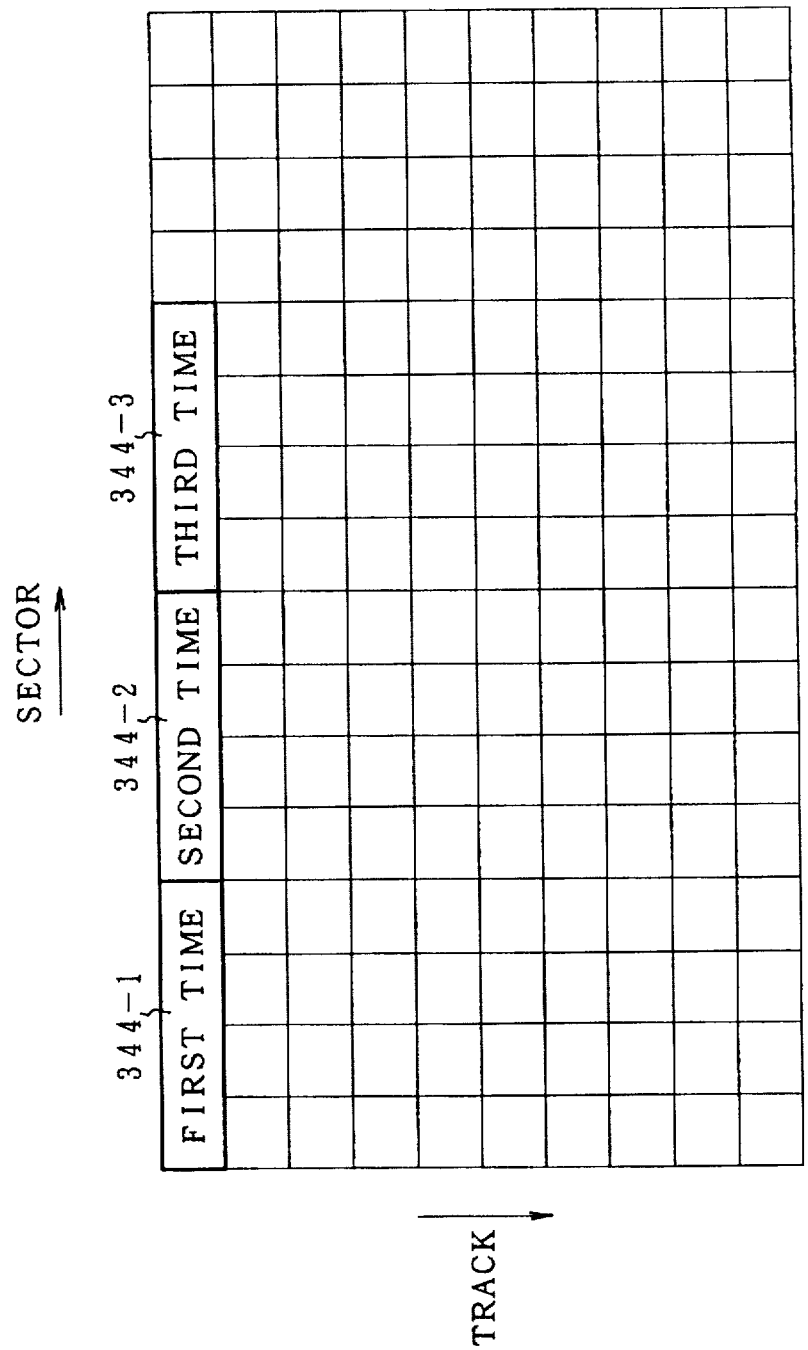
FIG. 52 is an explanatory diagram of the test write according to the sequential addresses in FIG. 51.

FIG. 51 shows another embodiment of the address formation of the test write execution sector which is executed in step S3 of the test write execution in FIGS. 42A and 42B and is characterized in that the test write execution addresses are sequentially formed. First in step S1, the final start address of the power adjusting area is obtained by subtracting the number of test write sectors which have already been tested from the area final address. In step S2, the previous execution address is set into the execution address. In step S3, the previous execution address and the final start address are compared. When the previous execution address doesn't reach the final start address, step S5 follows and the execution address is set to [(the previous execution address)+(the number of test write sectors)] and the test write is executed. When the previous execution address exceeds the final start address, the area head address is set into the execution address in step S4 and the test write is executed. FIG. 52 shows a state of the test write of the power adjusting area by the sequential formation of the test write addresses in FIG. 51 and test writes 344-1,344-2, and 344-3 are executed on a 4-sector unit basis.

Figure 53:
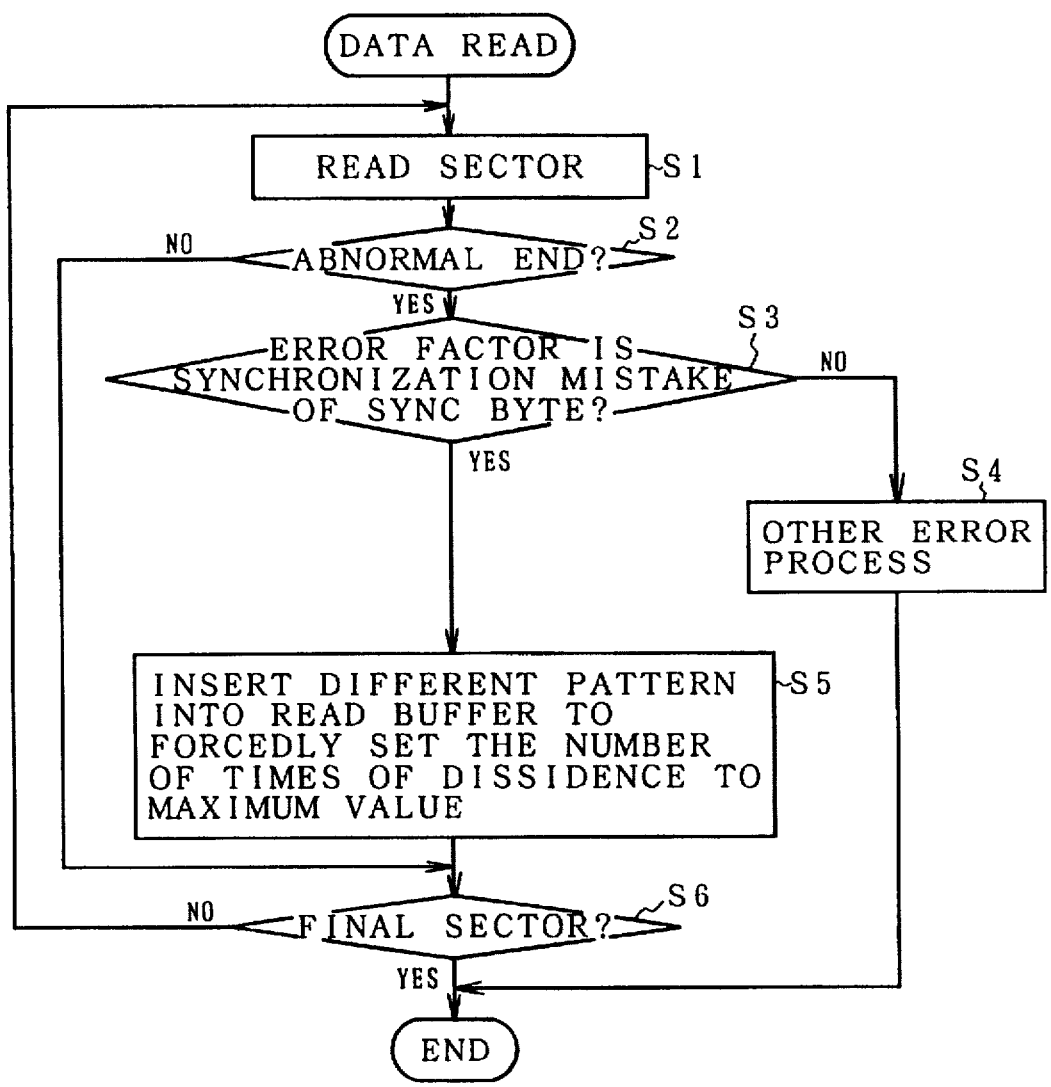
FIG. 53 is a flowchart for a reading process of test data by the test write in FIG. 42.
Figure 54:
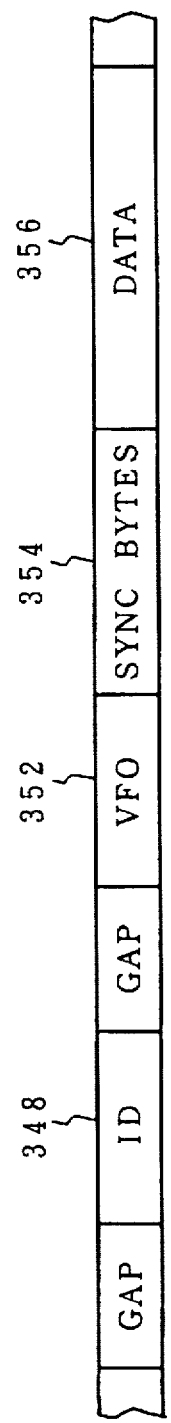
FIG. 54 is an explanatory diagram of a track format as a target of the data reading operation in FIG. 53.

FIG. 53 is a flowchart for a data reading process in step S8 in FIGS. 42A and 42B. In the data reading operation after the end of the test write, the sector is first read in step S1. With respect to the sector reading operation, the presence or absence of an abnormal end is discriminated in step S2. In case of the abnormal end, a check is made to see if a factor of an error is based on a synchronization mistake of sync bytes in step S3. As shown in a track format of FIG. 54, sync bytes 354 are important information indicative of a start position of data 356. If the error factor is based on the synchronization mistake by the sync bytes 354, since the subsequent data 356 cannot be read out, the processing routine advances to step S5. In order to forcedly set the number of times of dissidence to the maximum value, a pattern that is exactly different from the test pattern is stored into the read buffer. Thus, the number of times of dissidence of data is maximum by the comparison between the different pattern in the read buffer and the test pattern. In case of an error other than the synchronization mistake of the sync bytes in step S3, another error process is executed as necessary in step S4. In step S6, a check is made to see if the sector is a final sector in the power adjusting area. The processes from step S1 are repeated until the sector reaches the final sector. In case of the final sector, the processing routine advances to the next judging process of the number of times of dissidence.

Figure 55:
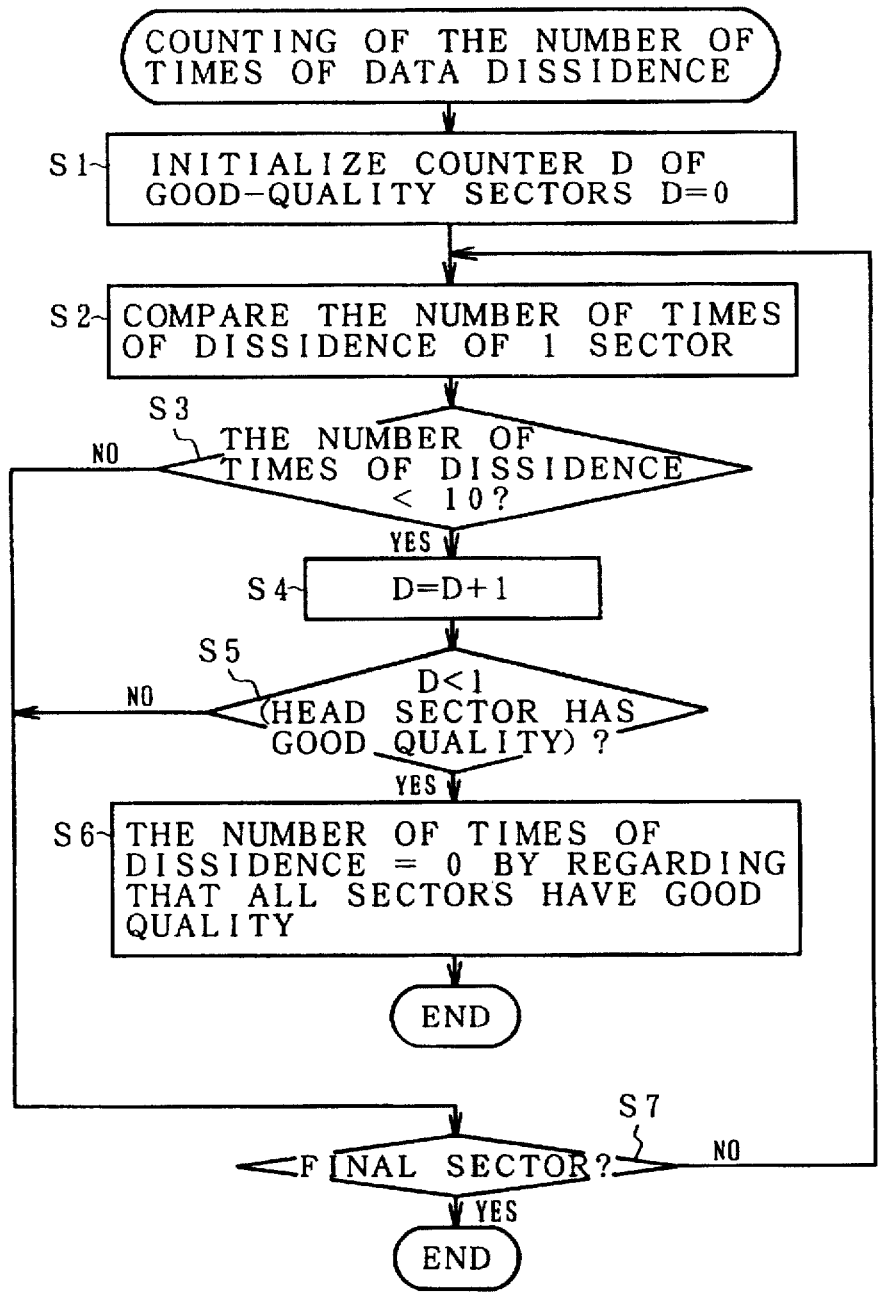
FIG. 55 is a flowchart for a process to count the number of times of dissidence of data in the test write in FIG. 42.

FIG. 55 is a flowchart for a process to count the number of times of dissidence of data on a word unit basis in step S9 in FIGS. 42A and 42B. First in step S1, D=0 is set into a counter D which is used for discrimination of a good quality sector and is initialized. In step S2, the number of times of dissidence of one sector is obtained by comparing the test pattern with the read pattern. In step S3, a check is made to see if the number of times of dissidence of one sector is less than a predetermined threshold value, for example, 10. If it is less than 10, the sector is determined to be a good quality sector. In step S4, the counter D indicative of the good quality sector is increased by "1". When the number of times of dissidence is equal to or larger than 10, the number of times of dissidence is counted up. When the final sector is not discriminated in step S7, the processing routine is again returned to step S2 and the number of times of dissidence of next one sector is obtained by the comparing process. In step S4, when the counter D of the good quality sector is increased by "1", step S5 follows and a check is made to see if the counter D is less than 1 or not. Namely, a check is made to see if the head sector in the read data has a good quality. When D is less than 1, namely, when it is equal to 0, the processing routine advances to step S6 and all of the sectors are regarded as good quality sectors. The number of times of dissidence is set to 0. Thus, when the head sector read out by the test write is regarded as a good quality sector, the comparison of the number of times of dissidence is not performed with respect to the subsequent sectors but the next test write is performed. Thus, the high processing speed of the test write is realized and the adjusting time can be reduced.

Figure 56:
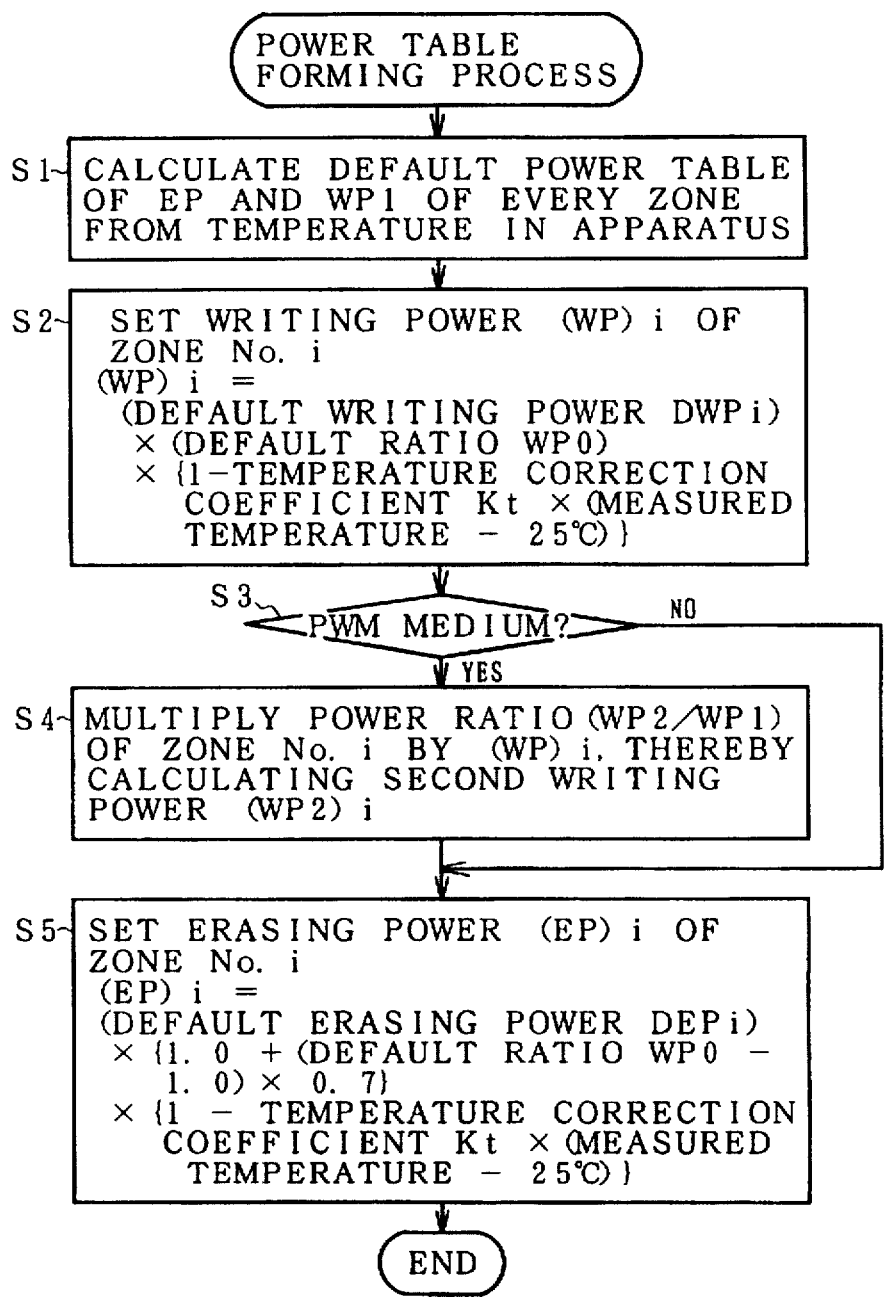
FIG. 56 is a flowchart for a power table setting process using an adjustment result of an optimum writing power.

FIG. 56 is a flowchart for a writing power setting process of each zone, namely, a power table forming process which is finally executed in step S14 in FIGS. 42A and 42B. In the power table forming process, the default power table of the erasing power EP and first writing power WP1 of every zone is calculated from the temperature in the apparatus in step S1. In step S2, a writing power (WP)i of a zone number i is set, the optimum default ratio WPO obtained in the writing power adjustment is multiplied to a default writing power DWPi, and further, a temperature correction is executed, thereby calculating the writing power. In step S3, a check is made to see if the medium is a PWM medium. In case of the PWM medium, step S4 follows and a writing power (WP1)i corresponding to the first writing power obtained in step S2 is multiplied to the power ratio (WP2/WP1) of the zone number i, thereby calculating a second writing power (WP2) i. In final step S5, an erasing power (EP)i of the zone number i is set. When calculating the erasing power, a coefficient 0.7 to suppress a fluctuation amount is multiplied to a value in which 1.0 is subtracted from the default ratio WPO of the optimum writing power derived by the writing power adjustment and the resultant multiplication value is added to 1.0. The resultant addition value is further multiplied to a default erasing power DPi. The temperature correction by the measurement temperature at that time is obviously performed. By such a power table forming process in FIG. 56, the erasing power table 318, first writing power table 320, and second writing power table 322 shown in the power table storing unit 310 in FIG. 35 are formed. In response to the subsequent write access from the upper apparatus, the power corresponding to the zone number is read out and the temperature correction according to the temperature in the apparatus at that time is performed. After that, DAC instruction values for the registers in the laser diode control circuit in FIG. 4 are calculated and set and the light emission of the laser diode 100 is controlled.

According to the invention as mentioned above, by executing the light emission adjustment of the laser diode by the powers at two points which are low powers such as not to damage the laser diode, the light emission adjustment can be executed in a short time without deteriorating the apparatus. Even if the number of zones is increased, for example, they are divided into three areas, the powers at two points in each area are designated, the light emission adjustment is performed, and adjustment values at an arbitrary power in all of the zones can be set by the linear approximation by the adjustment result. Even if the number of zones increases, the light emission adjustment can be performed in a short time. Further, even if the number of zones is changed in association with the change in format of the medium, the apparatus can easily cope with it.

According to the invention, a process to decide the optimum writing power by the test write can be properly executed in a short time without exerting a burden on the laser diode. Namely, as an adjusting process to decide the optimum writing power, it is sufficient to merely gradually reduce the writing power from the starting power and to detect the limit power on the lower limit side. As compared with the conventional case of detecting the upper and lower limit powers at two points, it is sufficient to take the half time. Since a high power is not needed for the test write, no damage is exerted on the laser diode and the durability of the apparatus can be improved.

The present invention is not limited to the foregoing embodiments but many modifications and variations are possible within the spirit and scope of the appended claims of the invention without losing its 101 advantage. The invention is not limited by the numerical values disclosed in the foregoing embodiments of the invention.

What is claimed is:

1. An optical storage apparatus comprising:

a laser diode for emitting a laser beam;

a light emission current source circuit for supplying a drive current according to a plurality of powers to said laser diode;

an automatic power control unit for controlling a light emitting power of said laser diode to a specified target power;

a monitor photosensitive device for receiving a part of the laser beam of said laser diode and outputting a photosensitive current;

a subtraction current source circuit for subtracting a specified subtraction current corresponding to a difference between a specified light emitting power and said target power from said photosensitive current and converting into a monitor current and feeding back said monitor current to said automatic power control unit;

a measuring unit for monitoring to read the monitor current derived from said subtraction current source circuit as a power measurement value; and a light emission adjustment processing unit for sequentially instructing a light emission by predetermined test powers at two points to said light emission current source circuit, light emission driving said laser diode, instructing said subtraction current source circuit of specified subtraction currents corresponding to said test powers at two points, measuring each test power from said measuring unit for monitoring, and obtaining a relation between the instruction values to said light emission current source circuit and said subtraction current source circuit in an arbitrary power by a linear approximation on the basis of results of said measurement.

2. An apparatus according to claim 1, wherein said light emission adjustment processing unit comprises:

a light emission coarse adjustment processing unit for sequentially instructing said light emission current source circuit of a light emission by predetermined test powers at two points in a state in which an on-track control is cancelled, light emission driving said laser diode, instructing said subtraction current source circuit of specified subtraction currents corresponding to said test powers at two points, measuring each test power from said measuring unit for monitoring, obtaining a relation of a power measurement value of said measuring unit for monitoring to an arbitrary light emitting power, a relation of said instruction value for the light emission to the arbitrary light emitting power, and a relation of said instruction value for subtraction to the arbitrary light emitting power by a linear approximation on the basis of results of said measurement, and registering said relations into a power table; and a light emission fine adjustment processing unit for sequentially instructing a light emission by predetermined test powers at two points to said light emission current source circuit in a state in which the on-track control is made valid, light emission driving said laser diode, instructing said subtraction current source circuit of specified subtraction currents corresponding to said test powers at two points, adjusting the instruction value to said light emission current source circuit so that a measurement power of said measuring unit for monitoring is equal to said target power, obtaining a relation of the instruction value to said light emission current source circuit to the arbitrary light emitting power by a linear approximation on the basis of the results of said adjustment, and correcting said power table.

3. An apparatus according to claim 2, wherein said light emission adjustment processing unit divides zones of a medium obtained by dividing tracks in the radial direction on a plural unit basis into a plurality of areas, instructs said test powers with respect to each of an innermost rim zone and an outermost rim zone of each of said divided areas, adjusts the light emitting powers while measuring the light emitting powers, calculates an adjustment value of the zone between said innermost rim zone and an outer rim edge of said outermost rim zone from a relational equation of a linear approximation of said test powers and a measurement power, and sets said adjustment value.

4. An apparatus according to claim 3, wherein said light emission coarse adjustment processing unit and said light emission fine adjustment processing unit individually designate and adjust an erasing power and a writing power as said test powers.

5. An apparatus according to claim 2, wherein on the basis of the adjustment value of said power table adjusted by said light emission coarse adjustment processing unit, said light emission fine adjustment processing unit calculates instruction values for said light emission current instructing unit and said subtraction current instructing unit corresponding to said test powers and sets said instruction values.

6. An apparatus according to claim 5, wherein when the optimum writing power decided by a test write of said medium is given as a correction coefficient in which the writing power registered in said power table is shown by a ratio using the adjustment value as a reference, said light emission fine adjustment processing unit multiplies said correction coefficient to said test power, thereby correcting said test power to an optimum test power.

7. An apparatus according to claim 6, wherein when said correction coefficient of said optimum power is given, said light emission fine adjustment processing unit compares said correction coefficient with a coefficient limit range having an upper limit value and a lower limit value of a predetermined correction coefficient and limits said power correction coefficient by said upper limit value or said lower limit value when said power correction coefficient is out of said coefficient limit range.

8. An apparatus according to claim 6, wherein as for said upper limit value and said lower limit value, when the zones of the medium obtained by dividing the tracks in the radial direction on a plural unit basis are divided into a plurality of areas, said light emission fine adjustment processing unit obtains a lower limit ratio for said lower limit value by setting the writing power of the innermost rim zone of each of said divided areas to a minimum power, obtains an upper limit ratio for said upper limit value by setting the writing power of the outermost rim zone to a maximum power, calculates the upper limit ratio and the lower limit ratio from a relational equation of a linear approximation of said lower limit ratio and said upper limit ratio with respect to an arbitrary zone between the innermost rim zone and an outer rim edge of the outermost rim zone, and sets said upper limit ratio and said lower limit ratio.

9. An apparatus according to claim 2, wherein:
when a medium loaded into said apparatus is a recording medium of a pit position modulation (PPM) and a recording medium of a pulse width modulation (PWM), said light emission coarse adjustment processing unit adjusts an erasing power and a first writing power and registers the adjusted powers into said power table with respect to any one of said recording media; and
when the loaded medium is a recording medium of the pulse width modulation (PWM), said light emission fine adjustment processing unit registers a power ratio of a second writing power in which said first writing power is set to a reference in addition to the erasing power and the first writing power and calculates said second writing power by multiplying said power ratio to the designated first writing power and sets said second writing power.

10. An apparatus according to claim 9, wherein said light emission fine adjustment processing unit registers each of said powers and said power ratio into said power table every zone number and calculates said second writing power by multiplying the power ratio of a designated zone to the first writing power of the same designated zone and sets said second writing power.

11. An apparatus according to claim 10, wherein said power ratio is a value which changes depending on a temperature of the apparatus.

12. An apparatus according to claim 11, wherein said light emission fine adjustment processing unit obtains two relational equations (y=a1·T+b1) and (y=a1·T+b1) by a linear approximation of power ratios for two temperatures T1 and T2 from four points of power ratios y1and y2at each of the temperatures T1 and T2 at two different points of the inner rim side zone and power ratios y3 and y4 at each of the temperatures T1 and T2 at two different points of the outer rim side zone, obtains two relational equations (a=α·N+β) and (b=γ·N+δ) by said linear approximation for two zone numbers N1 and N2 on said inner rim side and said outer rim side with respect to each of two inclinations a1 and a2 and intersections b1 and b2 with a y axis of the power ratios of said two linear relational equations, and registers inclinations α and γ and intersections β and δ with the y axis into said power table.

13. An apparatus according to claim 12, wherein said light emission fine adjustment processing unit reads out the inclinations α and γ and the intersections β and δ with the y axis of said relational equations of the power ratios for a designated zone number N, calculates the inclinations a1 and a2 and the intersections b1 and b2 with the y axis of the relational equations for a temperature T, and finally calculates the power ratio from a measurement temperature.

14. An apparatus according to claim 2, wherein said light emission coarse adjustment processing unit and sail light emission fine adjustment processing unit set said test powers to two points on the low power side.

15. An apparatus according to claim 2, wherein said automatic power control unit controls the light emitting power of said laser diode to a specified target reading power.

16. An apparatus according to claim 1, wherein:
said light emission current source circuit comprises a reading power current source for supplying a reading power current for allowing said laser diode to emit the light at a first power level at the time of the light emission by a reading power, an erasing power, a first writing power, and a second writing power by said laser diode, an erasing power current source for adding an erasing power current for allowing said laser diode to emit the light at a second power level to said reading power current at the time of the light emission by the erasing power, first writing power, and second writing power by said laser diode and supplying a resultant addition current, a first writing power current source for adding a first writing power current for allowing said laser diode to emit the light by the first writing power to said reading power current and said erasing power current at the time of the light emission by the first writing power by said laser diode and supplying a resultant addition current, a second writing power current source for adding a second writing power current for allowing said laser diode to emit the light at a third power level to said reading power current and said erasing power current at the time of the light emission by the second writing power by said laser diode and supplying a resultant addition current, and a light emission current instructing unit individually having D/A converters for instructing a current value of each of said reading power current source, said first writing power current source, and said second writing power current source;

and wherein said subtraction current source circuit comprises an erasing power subtraction current source for subtracting a photosensitive current of an erasing power from the photosensitive current of said photosensitive device at the time of the light emission by said erasing power, said first writing power, and said second writing power, a first writing power subtraction current source for subtracting a photosensitive current of said first writing power from the photosensitive current of said photosensitive device at the time of the light emission by said first writing power, a second writing power subtraction current source for subtracting a photosensitive current of said second writing power from the photosensitive current of said photosensitive device at the time of the light emission by said second writing power, and a subtraction current instructing unit individually having D/A converters for instructing a current value of each of said reading power subtraction current source, said first writing power subtraction current source, and said second writing power subtraction current source.

17. An apparatus according to claim 16, wherein in case of recording by a pulse width modulation such that a light emission is performed by a pulse train of pulses of the second writing power of the number corresponding to the erasing power, the first writing power, and a pulse width and the power is reduced to a value lower than a target power of said automatic power control unit at the end of said light emitting pulse train and the pulse train is shifted to a next light emitting pulse train, said light emission fine adjustment processing unit decreases the instruction value of the subtraction current for said D/A converter for subtraction of the first writing current so as to set off by equalizing a time product of an insufficient power for said target power and a time product of the first writing power exceeding said target power.

18. An optical storage apparatus comprising:

a laser diode for emitting a laser beam;

a light emission current source circuit for supplying a drive current according to a plurality of powers to said laser diode;

an automatic power control unit for controlling a light emitting power of said laser diode to a specified target power;

a monitor photosensitive device for receiving a part of the laser beam of said laser diode and outputting a photosensitive current;

a subtraction current source circuit for subtracting a specified subtraction current corresponding to a difference between a specified light emitting power and said target power from said photosensitive current and converting into a monitor current and feeding back said monitor current to said automatic power control unit; and a measuring unit for monitoring to read the monitor current derived from said subtraction current source circuit as a power measurement value, wherein when a medium loaded into said apparatus is a recording medium of a pit position modulation (PPM), said light emission coarse adjustment processing unit and said light emission fine adjustment processing unit adjust each of said erasing power and said first writing power, and when the medium loaded into said apparatus is a recording medium of a pulse width modulation (PWM), said light emission coarse adjustment processing unit and said light emission fine adjustment processing unit adjust each of said erasing power, said first writing power, and said second writing power.

19. An optical storage apparatus comprising:

a laser diode for emitting a laser beam; and a writing power adjusting unit for writing a predetermined test pattern to a medium while gradually reducing a writing power of said laser diode step by step, reading out said test pattern after that and comparing with an original test pattern, counting the number of times of dissidence of data, detecting the writing power in which said number of times of dissidence exceeds a predetermined threshold value as a limit writing power, and determining a value obtained by adding a predetermined offset to said limit writing power as an optimum writing power.

20. An apparatus according to claim 19, wherein said writing power adjusting unit has at least two powers of a first power to erase recording pits of the medium and a second power to form recording pits as a writing power and changes said first and second powers with a predetermined proportional relation when said writing power is gradually reduced step by step.

21. An apparatus according to claim 19, wherein said writing power adjusting unit has at least two powers of a first power to erase recording pits of the medium and a second power to form recording pits as a writing power and changes said writing power so that a fluctuation ratio of said second power is smaller than a fluctuation ratio of said first power when said writing power is gradually reduced step by step.

22. An apparatus according to claim 19, wherein when the number of times of dissidence exceeds a predetermined threshold value indicative of a power limit by the writing and reading operations of the test pattern by a writing power which was first set, said writing power adjusting unit increases a test power by a predetermined value and again tries the writing and reading operations.

23. An apparatus according to claim 19, wherein said writing power adjusting unit increases an offset to be added to said recording limit power when the temperature of the apparatus is low and decreases said offset when the temperature of the apparatus is high, thereby determining an optimum writing power according to the temperature of the apparatus.

24. An apparatus according to claim 19, wherein said writing power adjusting unit adjusts an offset which is added to said recording limit power in a manner such that when the temperature of the apparatus is low, an inner rim side is decreased and an outer rim side is increased and when the temperature of the apparatus is high, the inner rim side is increased and the outer rim side is decreased, thereby determining the optimum writing power in accordance with the temperature of the apparatus and a position in the radial direction of the medium.

25. An optical recording apparatus comprising:

a writing power adjusting unit for writing a predetermined test pattern onto a medium while changing a writing power step by step, reading out said test pattern after that, comparing said test pattern with an original test pattern, counting the number of times of dissidence of data, and deciding an optimum writing power from said number of times of dissidence and said writing power; and an adjustment timing judging unit for judging a necessity of a writing power adjusting process to optimize the writing power to said medium and activating said adjustment timing judging unit in accordance with a result of said judgment.

26. An apparatus according to claim 25, wherein said adjustment timing judging unit activates a writing power adjustment synchronously with a write command which is generated from an upper apparatus.

27. An apparatus according to claim 26, wherein after the apparatus was activated by loading the medium, when a first write command is generated from said upper apparatus, said adjustment timing judging unit activates the writing power adjustment.

28. An apparatus according to claim 27, wherein said adjustment timing judging unit determines a valid time at which a validity of a result of the writing power adjustment is guaranteed from an elapsed time from the activation of the medium to a timing when the first writing power adjustment is executed synchronously with the write command generated from the upper apparatus.

29. An apparatus according to claim 28, wherein when said elapsed time is shorter than a predetermined threshold time, said adjustment timing judging unit reduces said valid time in accordance with said elapsed time and, when said elapsed time exceeds said threshold time, said adjustment timing judging unit sets said valid time to said threshold time.

30. An apparatus according to claim 29, wherein when the elapsed time from a timing of a previous writing power adjustment exceeds said valid time, said adjustment timing judging unit activates a next writing power adjustment.

31. An apparatus according to claim 29, wherein until the elapsed time from a timing of a previous writing power adjustment exceeds said valid time, said adjustment timing judging unit activates the writing power adjustment when a present temperature of the apparatus fluctuates over a predetermined temperature range for a temperature of the apparatus at the time of the previous writing power adjustment.

32. An apparatus according to claim 31, wherein when said test power is set, said writing power adjusting unit changes the writing power by using a default ratio of the set writing power using a predetermined default writing power as a reference, and when said optimum writing power is determined, a predetermined offset ratio is added to a default ratio of said limit power, thereby determining a default ratio of the optimum writing power.

33. An apparatus according to claim 32, wherein when the adjustment of said default writing power is executed, said adjustment timing judging unit activates said writing power adjustment.

34. An optical recording apparatus comprising:
   a writing power adjusting unit for writing a predetermined test pattern onto a medium while changing a writing power step by step, reading out said test pattern after that, comparing said test pattern with an original test pattern, counting the number of times of dissidence of data, and deciding an optimum writing power from said number of times of dissidence and said writing power, wherein
   said writing power adjusting unit designates a part of a user un-used area of the disk medium as a test area and executes a writing operation and a reading operation of the test pattern.

35. An optical recording apparatus comprising:
   a writing power adjusting unit for writing a predetermined test pattern onto a medium while changing a writing power step by step, reading out said test pattern after that, comparing said test pattern with an original test pattern, counting the number of times of dissidence of data, and deciding an optimum writing power from said number of times of dissidence and said writing power, wherein
   said writing power adjusting unit executes the writing operation and the reading operation of the test pattern by using continuous partial sectors of a specified track among a plurality of tracks constructing said test area.

36. An optical recording apparatus comprising:
   a writing power adjusting unit for writing a predetermined test pattern onto a medium while changing a writing power step by step, reading out said test pattern after that, comparing said test pattern with an original test pattern, counting the number of times of dissidence of data, and deciding an optimum writing power from said number of times of dissidence and said writing power, wherein
   said writing power adjusting unit designates a proper sector among a plurality of tracks constructing said test area at random by generating a random number and executes the writing operation and the reading operation of the test pattern.

37. An optical recording apparatus comprising:
   a writing power adjusting unit for writing a predetermined test pattern onto a medium while changing a writing power step by step, reading out said test pattern after that, comparing said test pattern with an original test pattern, counting the number of times of dissidence of data, and deciding an optimum writing power from said number of times of dissidence and said writing power, wherein
   when a data sync pattern cannot be detected upon reading of the test pattern, said writing power adjusting unit counts the maximum number of times of dissidence.

38. An optical recording apparatus comprising:
   a writing power adjusting unit for writing a predetermined test pattern onto a medium while changing a writing power step by step, reading out said test pattern after that, comparing said test pattern with an original test pattern, counting the number of times of dissidence of data, and deciding an optimum writing power from said number of times of dissidence and said writing power, wherein
   when the number of times of dissidence in a range from a head sector to a predetermined number of sectors is equal to or less than a predetermined threshold value upon reading of the test pattern, said writing power adjusting unit regards that all of the sectors are good quality sectors, interrupts a data comparison, and counts a predetermined minimum value as the number of times of dissidence.

39. An optical recording apparatus comprising:
   a writing power adjusting unit for writing a predetermined test pattern onto a medium while changing a writing power step by step, reading out said test pattern after that, comparing said test pattern with an original test pattern, counting the number of times of dissidence of data, and deciding an optimum writing power from said number of times of dissidence and said writing power, wherein
   said writing power adjusting unit determines the writing power to be set first from a temperature of the apparatus.

40. An optical storage apparatus comprising:
   a writing power adjusting unit for writing a predetermined test pattern to a medium while gradually changing a writing power step by step, reading out said test pattern after that, comparing said test pattern with an original test pattern, counting the number of times of dissidence of data, and deciding an optimum writing power from said number of times of dissidence and said writing power; and
   a test executing unit for designating a part of a user un-used area of a disk medium as a test area and executing a writing operation and a reading operation of the test pattern at the time of the adjustment by said writing power adjusting unit.

41. An apparatus according to claim 40, wherein said writing power adjusting unit executes the writing and reading operations of the test pattern by using continuous partial sectors of a specified track among a plurality of tracks constructing said test area.

42. An apparatus according to claim 40, wherein said writing power adjusting unit designates a proper sector among a plurality of tracks constructing said test area at random by generating a random number and executes the writing and reading operations of the test pattern.

* * * * *